US007710551B2

(12) United States Patent
Hersch et al.

(10) Patent No.: US 7,710,551 B2
(45) **Date of Patent: *May 4, 2010**

(54) MODEL-BASED SYNTHESIS OF BAND MOIRE IMAGES FOR AUTHENTICATION PURPOSES

(75) Inventors: Roger D. Hersch, Epalinges (CH); Sylvain Chosson, Ecublens (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 1028 days.

This patent is subject to a terminal disclaimer.

(21) Appl. No.: 11/349,992

(22) Filed: Feb. 9, 2006

(65) Prior Publication Data

US 2006/0129489 A1 Jun. 15, 2006

Related U.S. Application Data

(63) Continuation-in-part of application No. 10/879,218, filed on Jun. 30, 2004.

(51) Int. Cl.
*G06K 9/74* (2006.01)

(52) U.S. Cl. ........................................ 356/71; 382/100

(58) Field of Classification Search ....................... None
See application file for complete search history.

(56) References Cited

U.S. PATENT DOCUMENTS

| | | | | |
|---|---|---|---|---|
| 4,761,253 | A | 8/1988 | Antes | 264/1.31 |
| 4,984,824 | A | 1/1991 | Antes et al. | 283/91 |
| 5,018,767 | A | 5/1991 | Wicker | 283/67 |
| 5,032,003 | A | 7/1991 | Antes | 359/567 |
| 5,396,559 | A | 3/1995 | McGrew | 380/54 |
| 5,694,229 | A | 12/1997 | Drinkwater et al. | 359/2 |
| 5,708,717 | A | 1/1998 | Alasia | 380/51 |
| 5,712,731 | A | 1/1998 | Drinkwater et al. | 359/619 |
| 5,995,638 | A | 11/1999 | Amidror et al. | 382/100 |
| 5,999,280 | A | 12/1999 | Huang | 359/2 |
| 6,249,588 | B1 | 6/2001 | Amidror et al. | 382/100 |
| 6,273,473 | B1 | 8/2001 | Taylor et al. | 283/72 |

(Continued)

FOREIGN PATENT DOCUMENTS

GB 1138011 12/1968

OTHER PUBLICATIONS

U.S. Appl. No. 09/477,544, filed Jan. 4, 2000, Ostromoukhov, et al.

(Continued)

*Primary Examiner*—Gregory J Toatley, Jr.
*Assistant Examiner*—Juan D Valentin

(57) ABSTRACT

A band moiré image layout model enables predicting the band moiré image layer layout produced when superposing a base band grating and revealing line grating of given rectilinear or curvilinear layouts. Thanks to the band moiré image layout model, one can choose the layout of two layers selected from the set of base band grating, revealing line grating and band moiré image and obtain the layout of the third layer by computation, i.e. automatically. A composed layer made of a base band grating and of a revealing line grating separated by a small gap yields thanks to the parallax effect, when tilting the composed layer, dynamically moving moiré shapes. The presented methods can be used for protecting various categories of documents (banknotes, identity documents, checks, diploma, travel documents, tickets) and valuable products (optical disks, medical drugs, products with affixed labels, watches).

44 Claims, 37 Drawing Sheets

U.S. PATENT DOCUMENTS

| | | | | |
|---|---|---|---|---|
| 6,494,491 | B1 | 12/2002 | Zeiter et al. | 283/91 |
| 6,819,775 | B2 | 11/2004 | Amidror et al. | 382/100 |

OTHER PUBLICATIONS

U.S. Appl. No. 10/995,859, filed Nov. 22, 2004, Steenblik, Hurt, Jordan.

U.S. Appl. No. 10/183,550, filed Jun. 28, 2002, Amidror.

U.S. Appl. No. 10/270,546, filed Oct. 16, 2002, Hersch, et al.

U.S. Appl. No. 10/440,355, filed May 19, 2003, Hersch, et al.

U.S. Appl. No. 11/149,017, filed Jun. 10, 2005, Hersch and Chosson.

R.L. Van Renesse, Optical Document Security, 2nd ed., 1998, Artech House, section 9.3.1 Parallax Images and section 9.3.2, Embossed Lens Patterns, pp. 207-210.

MODEL-BASED SYNTHESIS OF BAND MOIRE IMAGES FOR AUTHENTICATION PURPOSES

The present invention is a continuation in part of patent application Ser. No. 10/879,218, filed 30 Jun. 2004. The newly disclosed embodiments comprise a fixed setup of base band layer and revealing line grating layer forming a composed layer, where, thanks to the well-known parallax effect, by tilting the composed layer in respect to the eyes or to an observer, an apparent displacement between base band layer and revealing layer is generated, which yields the dynamic moiré effects described in the parent patent application Ser. No. 10/879,218. The present invention also discloses new, non-trivial moiré image effects, such as circular or elliptic rotations of moiré patterns.

BACKGROUND OF THE INVENTION

The present invention relates generally to the field of anti-counterfeiting and authentication methods and devices and, more particularly, to methods, security devices and apparatuses for authenticating documents and valuable products by band moiré patterns.

Counterfeiting of documents such as banknotes is becoming now more than ever a serious problem, due to the availability of high-quality and low-priced color photocopiers and desk-top publishing systems. The same is also true for other valuable products such as CDs, DVDs, software packages, medical drugs, watches, etc., that are often marketed in easy to falsify packages.

The present invention is concerned with providing a novel security element and authentication means offering enhanced security for devices needing to be protected against counterfeits, such as banknotes, checks, credit cards, identity cards, travel documents, valuable business documents, industrial packages or any other valuable products.

The theory on which the present invention relies has been partly published at the beginning of August 2004, as a scientific contribution: "Band Moiré Images", by R: D. Hersch and S. Chosson, SIGGRAPH'2004, ACM Computer Graphics Proceedings, Vol. 23, No. 3. pp. 239-248.

Various sophisticated means have been introduced in the prior art for counterfeit prevention and for authentication of documents or valuable products. Some of these means are clearly visible to the naked eye and are intended for the general public, while other means are hidden and only detectable by the competent authorities, or by automatic devices. Some of the already used anti-counterfeit and authentication means include the use of special paper, special inks, watermarks, micro-letters, security threads, holograms, etc. Nevertheless, there is still an urgent need to introduce further security elements, which do not considerably increase the cost of the produced documents or goods.

Moiré effects have already been used in prior art for the authentication of documents. For example, United Kingdom Pat. No. 1,138,011 (Canadian Bank Note Company) discloses a method which relates to printing on the original document special elements which, when counterfeited by means of halftone reproduction, show a moiré pattern of high contrast. Similar methods are also applied to the prevention of digital photocopying or digital scanning of documents (for example, U.S. Pat. No. 5,018,767, inventor Wicker). In all these cases, the presence of moiré patterns indicates that the document in question is counterfeit.

Other prior art methods, on the contrary, take advantage of the intentional generation of a moiré pattern whose existence, and whose precise shape, are used as a means of authenticating the document. One known method in which a moiré effect is used to make visible a hidden pattern image encoded within a document (see background of U.S. Pat No. 5,396,559 to McGrew, background of U.S. Pat. No. 5,901,484 to Seder, U.S. Pat. No. 5,708,717 to Alasia and U.S. Pat. No. 5,999,280 to Huang) is based on the physical presence of that image on the document as a latent image, using the technique known as "phase modulation". In this technique, a line grating or a random screen of dots is printed on the document, but within the predefined borders of the latent image on the document the same line grating (or respectively, the same random dot-screen) is printed at a different phase, or possibly at a different orientation. For a layman, the latent image thus printed on the document is difficult to distinguish from its background; but when a revealing layer comprising an identical, but unmodulated, line grating or grating of lenticular lenses (respectively, random dot-screen) is superposed on the document, thereby generating a moiré effect, the latent image pre-designed on the document becomes clearly visible, since within its predefined borders the moiré effect appears in a different phase than in the background. Such a latent image may be recovered, since it is physically present on the document and only filled by lines at different phases or by a different texture. A second limitation of this technique resides in the fact that there is no enlargement effect: the pattern image revealed by the superposition of the base layer and of the revealing transparency has the same size as the latent pattern image. It should be stressed the disclosed band moire image synthesizing methods completely differ from the above mentioned technique of phase modulation since no latent image is present when generating a band moire image and since the band moiré image pattern shapes resulting from the superposition of a base band grating and a revealing line grating are a transformation of the original pattern shapes embedded within the base band grating. This transformation comprises always an enlargement, and possibly a rotation, a shearing, a mirroring, and/or a bending transformation. In addition, in the present invention, base band grating and revealing line grating layers can be created where translating respectively rotating the revealing layer on top of the base layer yields a displacement of the band moiré image patterns. Phase based modulation techniques allowing to hide latent images within a base layer are not capable of smoothly displacing and possibly transforming the revealed latent image when moving the revealing layer on top of the base layer. For example, they are unable to create a continuous displacement of the band moiré image patterns, such as for example the band moiré image patterns moving towards the center of a circular band moiré image layout. A further means of distinguishing phase modulation techniques from band moirés consists in verifying, once the revealing line grating is laid out on top of the base layer, if respectively a moiré pattern is produced by sampling only a single instance (i.e. one latent pattern image) or multiple instances of a base layer pattern (i.e. multiple base bands incorporating each one an instance of the base band pattern).

U.S. Pat. No. 5,999,280, Holographic Anti-Imitation Method and Device for preventing unauthorized reproduction, inventor P. P. Huang, issued Dec. 7, 1999, discloses a holographic anti-imitation method and device where the superposition of a viewing device on top of a hidden pattern merged on a background pattern allows to visualize that hidden pattern. This disclosure relies on a technique similar to the phase modulation technique presented in the background section of U.S. Pat. No. 5,396,559 to McGrew, implemented on a holographic device. In contrast to U.S. Pat. No. 5,999,280, our invention relies on a completely different principle:

several instances of the base band patterns are sampled and produce band moire image patterns which are enlarged and transformed instances of these base band patterns. Furthermore, our invention allows to generate dynamic band moire images, i.e. animations with dynamically behaving band moire image pattern shapes, which are impossible to achieve with U.S. Pat. No. 5,999,280.

In U.S. Pat. No. 5,712,731 (Drinkwater et al.) a moiré based method is disclosed which relies on a periodic 2D array of microlenses. This last disclosure has the disadvantage of being limited to the case where the superposed revealing structure is a microlens array and the periodic structure on the document is a constant 2D array of identical dot-shapes replicated horizontally and vertically. Thus, in contrast to the present invention, that invention excludes the use of gratings of lines as the revealing layer. A similar 2D array of microlenses is disclosed in patent application Ser. No. 10/995,859 to Steenblik et. al., filed Nov. 22, 2004. Both inventions also consider a fixed setup of microlens array and dot shape array separated by a gap, where changing the observation orientation has the effect of moving and changing the size of the resulting 2D moiré patterns.

Other moiré based methods disclosed by Amidror and Hersch in U.S. Pat. No. 6,249,588 and its continuation-in-part U.S. Pat. No. 5,995,638 rely on the superposition of 2D arrays of screen dots yielding a moiré intensity profile indicating the authenticity of the document. These inventions are based on specially designed 2D periodic structures, such as dot-screens (including variable intensity dot-screens such as those used in real, gray level or color half-toned images), pinhole-screens, or microlens arrays, which generate in their superposition periodic moiré intensity profiles of chosen colors and shapes (typographic characters, digits, the country emblem, etc.) whose size, location and orientation gradually vary as the superposed layers are rotated or shifted on top of each other. In a third invention, U.S. Pat. No. 6,819,775 (Amidror and Hersch), Amidror and Hersch disclose new methods improving their previously disclosed methods mentioned above. These new improvements make use of the theory developed in the paper "Fourier-based analysis and synthesis of moirés in the superposition of geometrically transformed periodic structures" by I. Amidror and R. D. Hersch, Journal of the Optical Society of America A, Vol. 15, 1998, pp. 1100-1113 (hereinafter, "[Amidror98]"), and in the book "The Theory of the Moiré Phenomenon" by I. Amidror, Kluwer, 2000. According to this theory, said invention discloses how it is possible to synthesize aperiodic, geometrically transformed dot screens which in spite of being aperiodic in themselves, still generate, when they are superposed on top of one another, periodic moiré intensity profiles with undistorted elements, just like in the periodic cases disclosed by Hersch and Amidror in their previous U.S. Pat. No. 6,249,588 and its continuation-in-part U.S. Pat. No. 5,995,638. U.S. Pat. No. 6,819,775 further disclosed how cases which do not yield periodic moirés can still be advantageously used for anticounterfeiting and authentication of documents and valuable products. In U.S. patent application Ser. No. 10/183,550 "Authentication with build-in encryption by using moiré intensity profiles between random layers", inventor Amidror discloses how a moiré intensity profile is generated by the superposition of two specially designed random or pseudo-random dot screens. An advantage of that invention relies in its intrinsic encryption system offered by the random number generator used for synthesizing the specially designed random dot screens.

However, the disclosures above made by inventors Hersch and Amidror (U.S. Pat. No. 6,249,588, U.S. Pat. No. 5,995,638. U.S. Pat. No. 6,819,775) or Amidror (U.S. application Ser. No. 10/183,550) making use of the moiré intensity profile to authenticate documents have two limitations. The first limitation is due to the fact that the revealing layer is made of dot screens, i.e. of a set (2D array) of tiny dots laid out on a 2D surface. When dot screens are embodied by an opaque layer with tiny transparent dots or holes (e.g. a film with small transparent dots), only a limited amount of light is able to traverse the dot screen and the resulting moiré intensity profile is not easily visible. In these inventions, to make the moiré intensity profile clearly visible, one needs to work in transparent mode; both the revealing and the base layers need to be placed in front of a light source and the base layer should be preferably printed on a partly transparent support. In reflective mode, one needs to use a microlens array as master screen which, thanks to the light focussing capabilities of the lenses, make the moiré intensity profile clearly visible. The second limitation is due to the fact that the base layer is made of a two-dimensional array of similar dots (dot screen) where each dot has a very limited space within which only a few tiny shapes such as a few typographic characters or a single logo must be placed. This space is limited by the 2D frequency of the dot screen, i.e. by its two period vectors. The higher the 2D frequency, the less space there is for placing the tiny shapes which, when superposed with a 2D circular dot screen as revealing layer, produce as 2D moiré an enlargement of these tiny shapes.

In U.S. patent application Ser. No. 10/270,546 (filed 16 Oct. 2002, "Authentication of documents and articles by moiré patterns", inventors Hersch and Chosson), a significant improvement was made by the discovery that a rectilinear base band grating incorporating original shapes superposed with a revealing straight line grating yields rectilinear moiré bands comprising moiré shapes which are a linear transformation of the original shapes incorporated within the base band grating. These moiré bands form a band moiré image. Since band moiré have a much better light efficiency than moiré intensity profiles relying on dots screens, band moiré images can be advantageously used in all case where the previous disclosures relying on 2D screens fail to show strong enough moiré patterns. In particular, the base band grating incorporating the original pattern shapes may be printed on a reflective support and the revealing line screen may simply be a film with thin transparent lines. Due to the high light efficiency of the revealing line screen, the band moiré patterns representing the transformed original band patterns are clearly revealed. A further advantage of band moiré images resides in the fact that it may comprise a large number of patterns, for example one or several words, one or several sophisticated logos, one or several symbols, and one or several signs.

U.S. patent application Ser. No. 10/270,546 (Hersch and Chosson), describes the layout of rectilinear band moiré images, when the layouts of base layer and the revealing layer are known. However it does not tell in which direction and at which speed the moiré shape moves when translating the rectilinear revealing layer on top of the rectilinear base layer. Furthermore, since it does not disclose a model for predicting the layout of the moiré image that can be produced when superposing a curvilinear base layer and a curvilinear revealing layer, band moirés image relying on curvilinear base or revealing layers need to be generated by a trial and error procedure. One tries first to generate examples of curvilinear line moirés produced by the superposition of line grating (according to the theory describing prior art line grating, see the article by I. Amidror and R. D. Hersch, Fourier-based analysis and synthesis of moirés in the superposition of geometrically transformed periodic structures, Journal of the Optical Society of America A, Vol. 15, 1998; pp. 1100-1113 or the book of I. Amidror, The Theory of the Moiré Phenomenon, Kluwer, 2000, pages 249-352). Then, one replaces curvilinear lines of the line grating by bands, yielding a band grating. And finally, one verifies if the result is visually pleasing or not, and if not modifies the parameters of the base and revealing transformations and visualize again the results. When one of the layers layout is curvilinear, this trial and error method does not allow to compute a base band grating layer layout given a reference band moiré image layout and a revealing line grating layout. In addition, since the method relies on trial and error, it does not support the derivation of complicated geometric transformations, such as computing a base layer, which in superposition with a revealing layer forming a spiral shaped line grating yields a meaningful, visually pleasant band moiré image. The only reference band moiré image available with the trial and error method is the band moiré image produced by superposing the base and revealing layer derived thanks to the trial and error procedure.

Furthermore, U.S. patent application Ser. No. 10/270,546 (Hersch and Chosson) does neither give a precise technique for generating a reference rectilinear band moiré image layout with curvilinear base and revealing layer layouts nor does it give a means of generating a desired reference curvilinear band moiré image layout with a predetermined rectilinear or curvilinear revealing layer layout. Furthermore, U.S. patent application Ser. No. 10/270,546 (Hersch and Chosson) teaches a method for creating variations of the appearing moiré patterns when moving the revealing layer on top of the base layer, however these variations rely only on modifications of the shapes embedded within the base band layer and do not rely, as in the present disclosure, on the geometric transformations of the base layer and/or the revealing layer.

The present disclosure provides a band moiré image layout model allowing to compute not only the layout of a rectilinear band moiré image produced by superposing a rectilinear base band layer and a rectilinear revealing layer, but also in which direction and at which speed the rectilinear moiré shapes move when translating a the rectilinear revealing layer on top of the rectilinear base layer. For a curvilinear base layer and a curvilinear or rectilinear revealing layer, that model computes exactly the layout of the resulting rectilinear or curvilinear band moiré image obtained by superposing the base and revealing layers. Furthermore, one may specify a desired rectilinear or curvilinear band moiré image as well as one of the layers and the model is able to compute the layout of the other layer.

Let us also note that the properties of the moiré produced by the superposition of two line gratings are well known (see for example K. Patorski, The moiré Fringe Technique, Elsevier 1993, pp. 14-16). Moiré fringes (moiré lines) produced by the superposition of two line gratings (i.e. set of lines) are exploited for example for the authentication of banknotes as disclosed in U.S. Pat. No. 6,273,473, Self-verifying security documents, inventors Taylor et al.

Curved moiré fringes (moiré lines) produced by the superposition of curvilinear gratings are also known (see for example Oster G., Wasserman M., Zwerling C. Theoretical Interpretation of Moiré Patterns. Journal of the Optical Society of America, Vol. 54, No. 2, 1964, 169-175) and have been exploited for the protection of documents by a holographic security device (U.S. Pat. No. 5,694,229, issued Dec. 2, 1997, K. J. Drinkwater, B. W. Holmes).

In U.S. patent application Ser. No. 10/270,546 as well as in the present invention, instead of using a line grating as base layer, we use as base layer a band grating incorporating in each band an image made of one-dimensionally compressed original patterns of varying shapes, sizes, intensities and possibly colors. Instead of obtaining simple moiré fringes (moiré lines) when superposing the base layer and the revealing line grating, we obtain a band moiré image which is an enlarged and transformed instance of the original band image.

Joe Huck, a prepress professional, in his publication (2003) entitled "Mastering Moirés. Investigating Some of the Fascinating Properties of Interference Patterns, see also http://pages.sbcglobal.net/joehuck", created band moiré images, both for artistic purposes and for creating designs incorporating moiré shapes floating within different perceived depth planes thanks to parallax effects. His publication only reports about vertically replicated horizontal base bands and a revealing layer made of horizontal lines, thereby generating moiré shapes moving only in the vertical direction. In contrast to the present invention, he neither provided a general-purpose framework for predicting the geometry of band moiré images as a function of base and revealing layer layouts, nor did he consider geometric transformations of base and revealing layers. In addition, he didn't consider applying band moiré images for document authentication.

The well-known parallax effect has been described in U.S. Pat. No. 5,901,484 to R. B. Seder in the context of creating a display device for displaying a plurality of images. Parallax images and the parallax effect is also described in the book by R. L. Van Renesse, Optical Document Security, 2nd ed., 1998, Artech House, section 9.3.1 Parallax Images and section 9.3.2, Embossed Lens Patterns, pp. 207-210, hereinafter referenced as [VanRenesse98]. In section 9.3.2 of that book, FIG. 9.5 shows an example of embossed cylindrical microlenses (also called lenticular lenses), where the lenses have a diameter of 300 μm and are embossed on a visually transparent plastic sheet of about 400 μm thickness. Due to the focusing effect of the lenses, only small strips of the bottom layer are visible while the exact location of these strips depends on the viewing angle.

U.S. Pat. No. 6,494,491, to Zeiter et. al. "Object with an optical effect", teaches a composed layer formed by two images separated by a gap, where due to the relative phase between the two images, a given overall image is perceived at a certain viewing angle and an altered image at other angles. This invention relies on different darkness levels generated by superposed aligned or respectively non-aligned mutually rotated strokes.

SUMMARY

The present invention relates to the protection of devices which may be subject to counterfeiting attempts. Such devices comprise security documents such as banknotes, checks, trust papers, securities, identification cards, passports, travel documents, tickets, valuable business documents and valuable products such as optical disks, CDs, DVDs, software packages, medical products, watches. These devices need advanced authentication means in order to prevent counterfeiting attempts. The invention also relates to a document security computing and delivery system allowing to synthesize and deliver the security document as well as its corresponding authentication means.

The present invention relies on a band moiré image layout model capable of predicting the band moiré image layer layout produced when superposing a base band grating layer of a given layout and a revealing line grating layer of a given layout. Both the base band grating layer and the revealing line grating layer may have a rectilinear or a curvilinear layout. The resulting band moiré image layout may also be rectilinear or curvilinear. Thanks to the band moiré image layout model, one can choose the layout of two layers selected from the set of base band grating layer, revealing line grating layer and band moiré image layer and obtain the layout of the third layer by computation, i.e. automatically. In contrast to the prior art invention described in U.S. patent application Ser. No. 10/270,546 (Hersch and Chosson), there is no need to proceed according to a manual trial and error procedure in order to create a revealing line grating layer layout and a base band grating layer layout which yield upon superposition a visually attractive easily perceivable band moiré image. In the present invention, one may simply define the band moiré image layout as well as the revealing line grating layout and compute the corresponding base band grating layout, which when superposed with the specified revealing line grating layout generates the specified band moiré image layout.

The present disclosure also describes methods for computing the direction and speed at which rectilinear moiré shapes move when displacing the corresponding rectilinear revealing line grating layer on top of the rectilinear base band grating layer. Furthermore, in the case of a concentric band moiré image, base band grating layer and revealing line grating layer layouts may be produced according to geometric transformations, which yield, upon relative displacement of the position sampled by the revealing layer on the base layer, a band moiré image whose patterns move either radially, circularly or according to a spiral trajectory, depending on the orientation of the base band replication vector in the original non-transformed base layer space. In addition, it is possible to conceive a periodically varying revealing line grating layer which when translated on top of the base band grating layer, generates a band moiré image which is subject to a periodic deformation.

In addition, either the base layer or the revealing layer or both may be embodied by an electronic display such as a liquid crystal display (LCD). When the revealing layer is embodied by an electronic display, non-rigid phase transformations may be applied to the revealing layer in order to generate the successive positions of the revealing layer lines.

Furthermore, thanks to the availability of a large number of geometric transformations and transformation variants (i.e. different values for the transformation constants), one may create classes of documents where each class of documents has its own individualized document protection.

In addition, thanks to the band moire layout model, it is possible to synthesize one band moiré image partitioned into different portions synthesized each one according to a different pair of matching geometric transformations. This makes it practically impossible for potential counterfeiters to resynthesize a base layer without knowing in detail the relevant geometric transformations as well as the constants used to synthesize the authentic base layer.

Thanks to the band moire image layout model, a computing system may automatically generate upon request an individualized protected security document by creating for a given document content information a corresponding band moiré image layout information. This computing system may then upon request synthesize and issue the security document with its embedded base band grating layer, the base band grating layer or the revealing line grating layer. To further enhance the security of documents, it is possible to synthesize a base band grating layer with non-overlapping shapes of different colors, for example created with non-standard inks, such as iridescent inks, inks visible under UV light or metallic inks, i.e. inks which are not available in standard color copiers or printers.

The base band grating and revealing line grating layers may be printed on various supports, opaque or transparent materials. The revealing layer may be embodied by a line grating imaged on an transparent support or by other means such as cylindric microlenses. Such cylindric microlenses offer a high light efficiency and allow to reveal band moiré image patterns whose base band grating patterns are imaged at a high frequency on the base band layer. The base band grating layer may also be reproduced on an optically variable device and revealed either by a line grating imaged on a transparent support, by cylindric microlenses, or by a diffractive device such as Fresnel zone plates emulating cylindric microlenses.

The base band layer and the revealing line grating layer may be separated by a small gap and form a fixed composed layer, where, thanks to the well-known parallax effect, by tilting the composed layer in respect to an observer, or equivalently by moving the eyes across the revealing layer line grating of the composed layer, different successive positions of the base layer are sampled. This creates an apparent displacement between base layer and revealing layer yielding dynamically moving moiré image patterns.

The fact that the generated band moiré patterns are very sensitive to any microscopic variations in the base and revealing layers makes any document protected according to the present invention extremely difficult to counterfeit, and serves as a means to distinguish between a real document and a falsified one. The present invention offers an additional protection by allowing to produce individual layouts either for individual or for classes of security documents. In addition, thanks to the band moiré image layout model, both the base band grating layer and the revealing line grating layer may be automatically generated.

In the present disclosure different variants of the invention are described, some of which may be disclosed for the use of the general public (hereinafter: “overt” features), while other variants may be hidden (for example one of the set of base bands in a base layer combining multiple sets of base bands) and only detected by the competent authorities or by automatic devices (hereinafter: “covert” features).

BRIEF DESCRIPTION OF THE DRAWINGS

For a better understanding of the present invention, one may refer by way of example to the accompanying drawings, in which.

DETAILED DESCRIPTION OF THE INVENTION

In U.S. Pat. No. 6,249,588, its continuation-in-part U.S. Pat. No. 5,995,638, and U.S. Pat. No. 6,819,775 (to Amidror and Hersch), as well as in U.S. patent application Ser. No. 10/183,550 (to Amidror), methods are disclosed for the authentication of documents by using the moiré intensity profile. These methods are based on specially designed two-dimensional structures (dot-screens, pinhole-screens, microlens structures), which generate in their superposition two-dimensional moiré intensity profiles of any preferred colors and shapes (such as letters, digits, the country emblem, etc.) whose size, location and orientation gradually vary as the superposed layers are rotated or shifted on top of each other. In reflective mode and with a revealing layer (called master screen in the above mentioned inventions) embodied by an opaque layer with tiny transparent dots or holes (e.g. a film with tiny transparent holes), the amount of reflected light is too low and therefore the moiré shapes are nearly invisible. Therefore, in reflective mode, the revealing layer to be used in these inventions must be a microlens array. In addition, in these inventions, the base layer is made of a set (2D array) of similar dots (dot screen) where each dot has a very limited space within which tiny shapes such as characters, digits or logos must be placed. This space is limited by the 2D frequency of the dot screen, i.e. by its two period vectors. The higher the 2D frequency, the less space there is for placing the tiny shapes which, when superposed with a 2D circular dot screen as revealing layer, produce as 2D moiré an enlargement of these tiny shapes.

Figure 3:
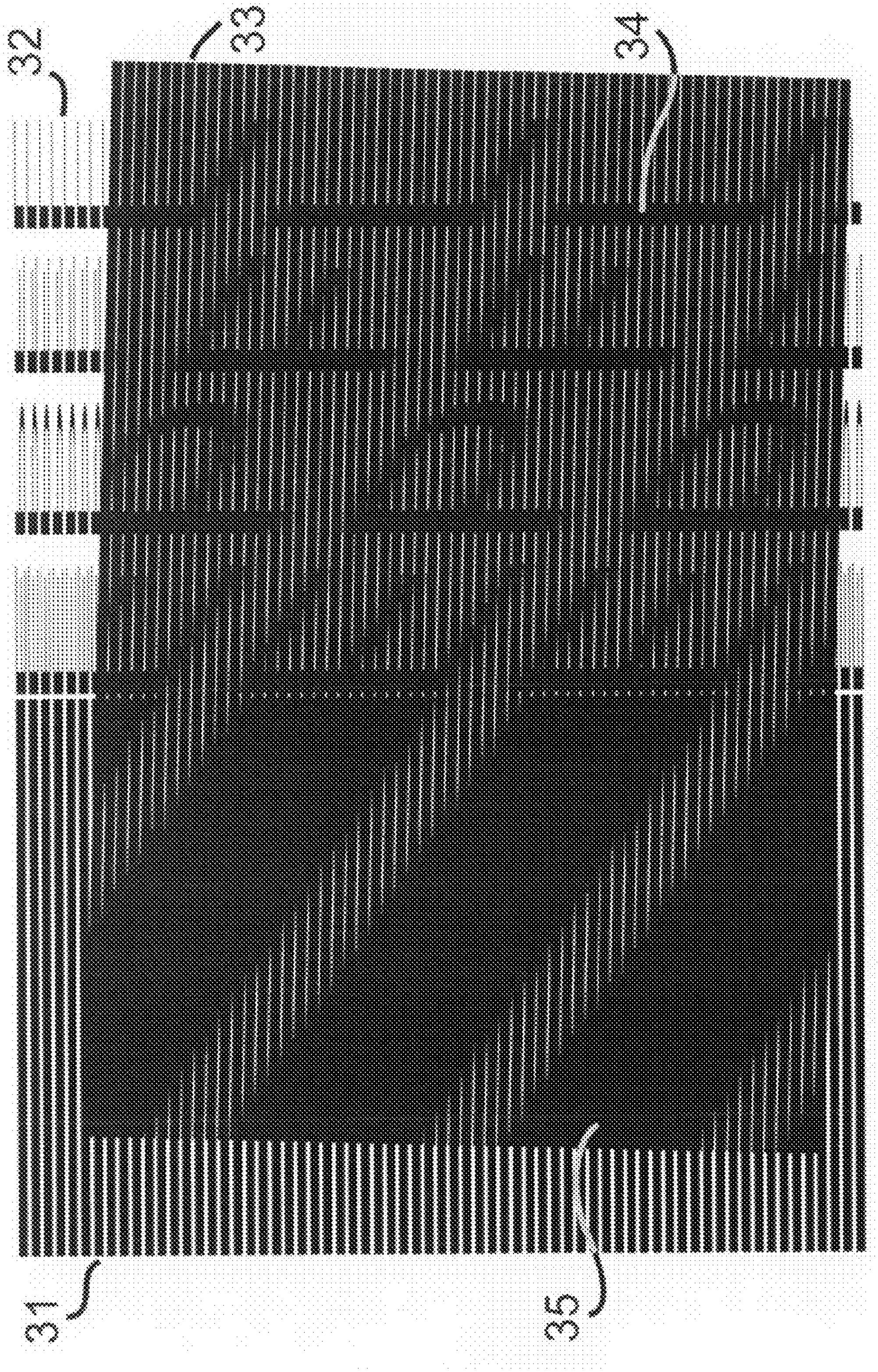
FIG. 3 shows the moiré fringes and band moiré patterns generated by the superposition of a revealing line grating and of a base layer incorporating a grating of lines on the left side and base bands with the patterns “EPFL” on the right side (U.S. patent application Ser. No. 10/270,546, Hersch & Chosson)
Figure 4:
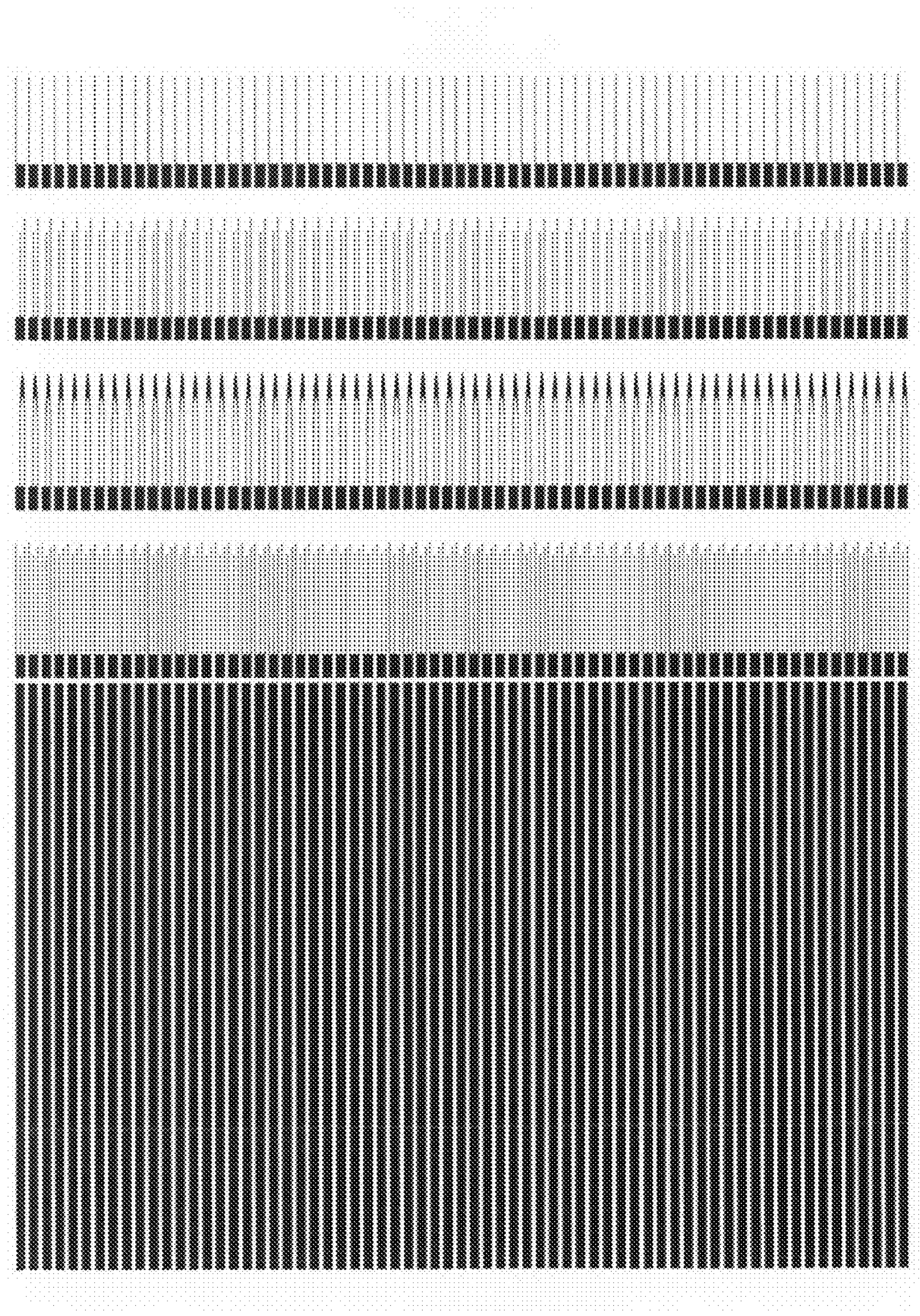
FIG. 4 shows separately the base layer of FIG. 3.
Figure 5:
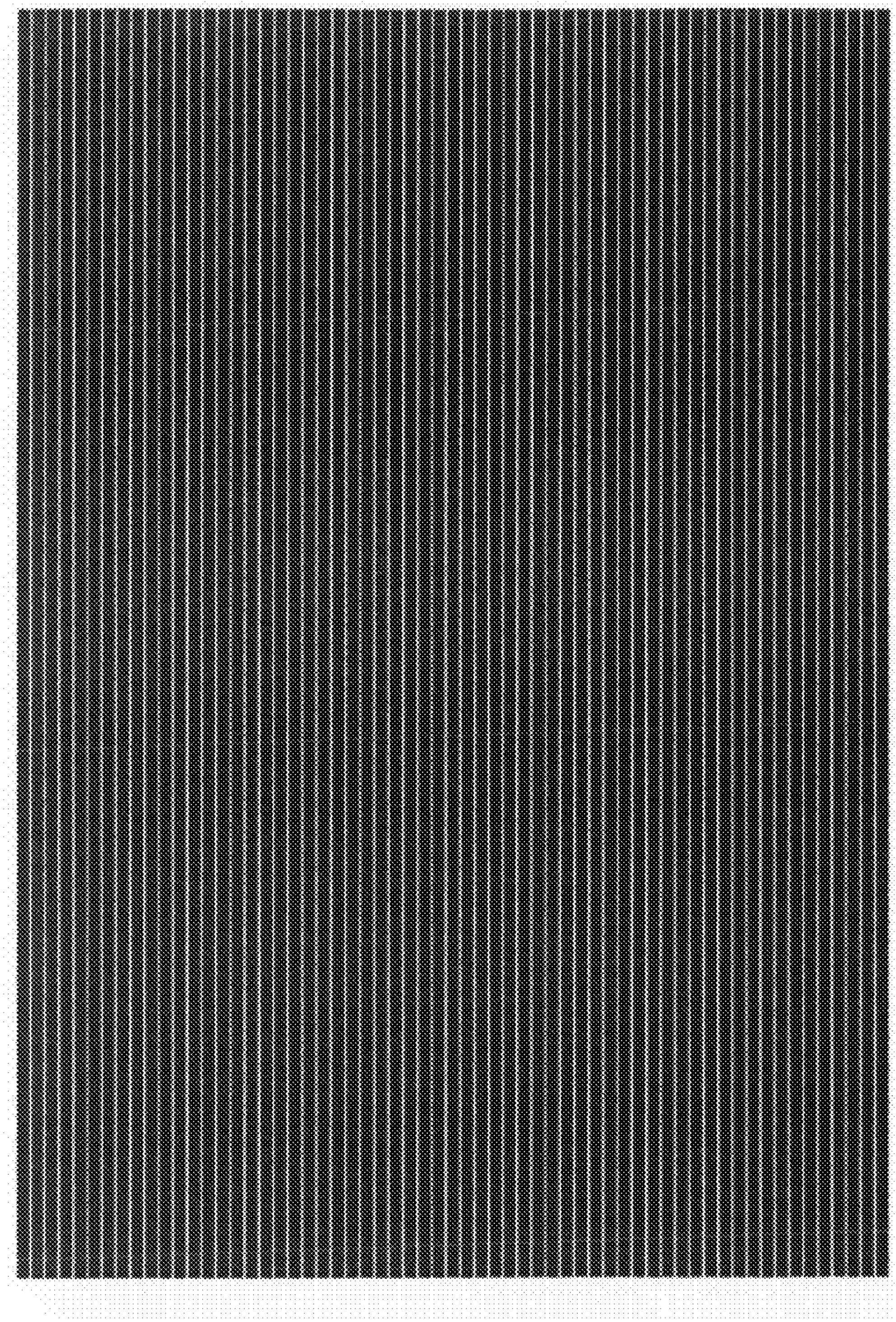
FIG. 5 shows separately the revealing layer of FIG. 3.

Since much more light passes through a line grating of a given period and relative aperture than through a dot screen of the same period and of the same relative aperture as dot diameter, band moiré images induced by line gratings have a much higher dynamic range than 2D moirés images obtained by superposing a dot screen and an array of tiny holes. In U.S. patent application Ser. No. 10/270,546 (Hersch & Chosson), the present inventors proposed to use a line grating as revealing layer and to introduce as base layer a base band grating made of replicated bands comprising freely chosen flat patterns or flat images (FIGS. 3, 4, 5).

The present disclosure provides new inventive steps in respect to U.S. patent application Ser. No. 10/270,546 (Hersch & Chosson) by disclosing a model (hereinafter called "band moire image layout model") allowing the computation of the direction and the speed in which rectilinear band moiré image shapes move when translating a rectilinear revealing layer on top of a rectilinear base layer. Furthermore, given any layout of rectilinear or curvilinear base and revealing layers, the band moire layout model computes the layout of the resulting rectilinear or curvilinear band moiré image obtained by superposing the base and revealing layers. In addition, one may specify a desired rectilinear or curvilinear band moiré image as well as one of the layers and the band moire layout model is able to compute the layout of the other layer.

A base band grating differs from a line grating by having instead of a 1D intensity profile a 2D intensity profile, i.e. an intensity profile which varies according to the current position both in the transversal and in the longitudinal line directions. A base band becomes a full 2D image of its own, which can be revealed by superposing on the corresponding base band grating a revealing layer made of thin transparent lines.

Figure 2A:
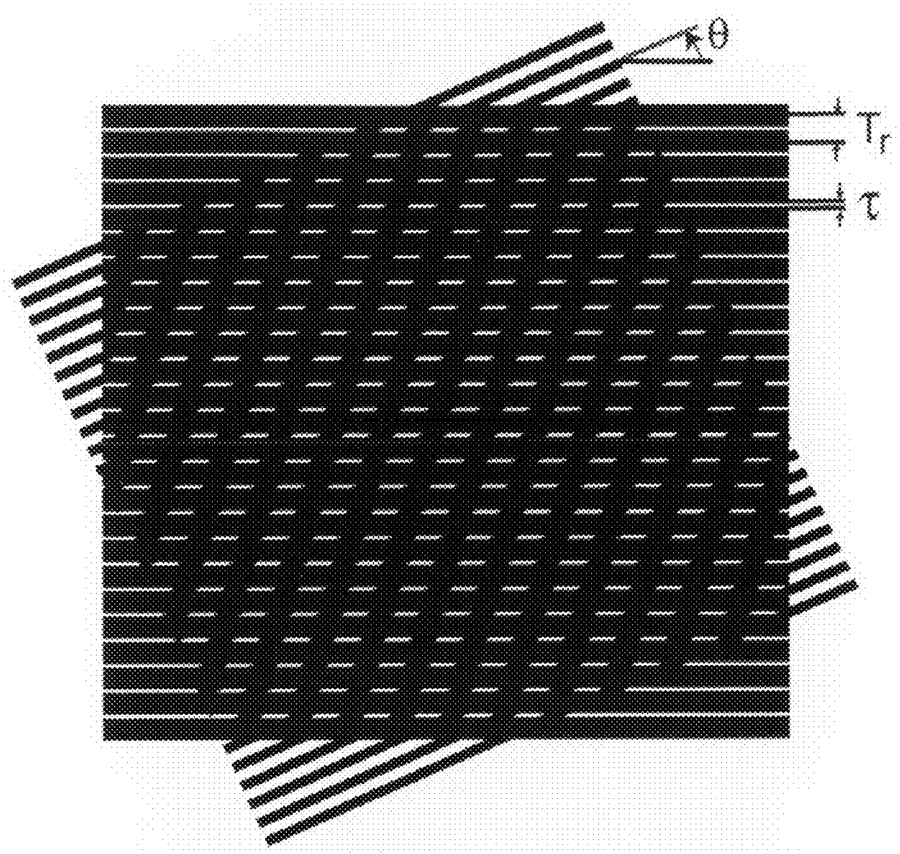
FIGS. 2A and 2B show the generation of moiré fringes when two line gratings are superposed (prior art)
Figure 2B:
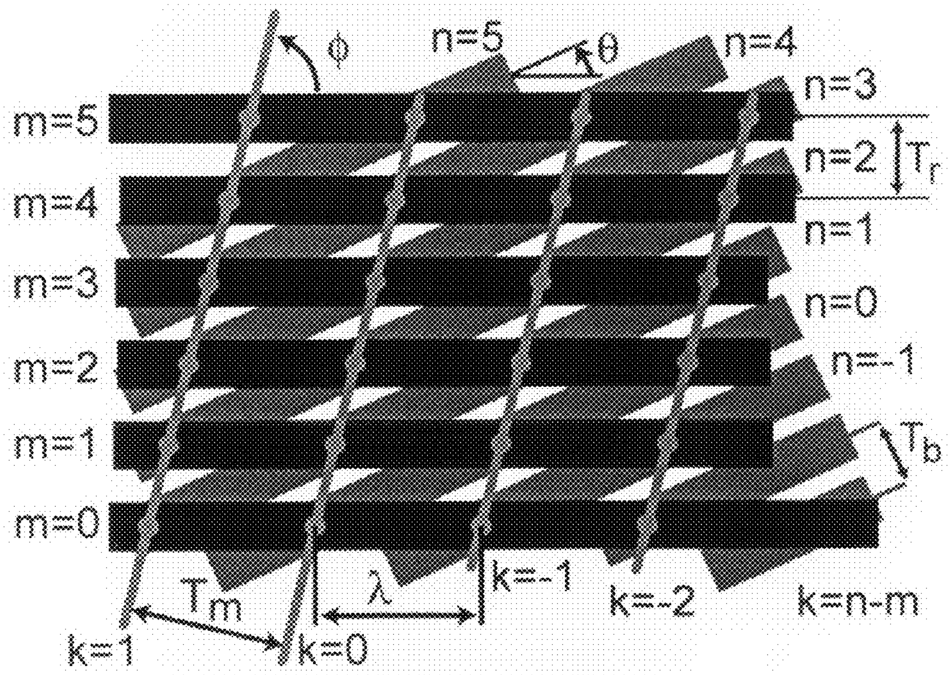

It is well known from the prior art that the superposition of two line gratings generates moiré fringes, i.e. moiré lines as shown in FIG. 2A (see for example K. Patorski, The Moiré Fringe Technique, Elsevier 1993, pp. 14-16). One prior art method of analyzing moiré fringes relies on the indicial equations of the families of lines composing the base and revealing layer line gratings. The moiré fringes formed by the superposition of these indexed line gratings form a new family of indexed lines whose equation is deduced from the equation of the base and revealing layer line families (see Oster G., Wasserman M., Zwerling C. Theoretical Interpretation of Moiré Patterns. Journal of the Optical Society of America, Vol. 54, No. 2, 1964, 169-175, hereinafter referenced as [Oster 64]). FIG. 2B shows the oblique base lines with indices n=−1, 0, 1, 2, 3, . . . , the horizontal revealing layer lines with indices m=0, 1, 2, 3, 4, . . . and the moiré lines with indices k=1, 0, −1, −2 . . . . The moiré fringes comprise highlight moiré lines connecting the intersections of oblique and horizontal base lines and dark moiré lines located between the highlight moiré lines. Each highlight moiré line can be characterized by an index $$k=n-m \tag{1}$$

The family of oblique base lines is described by $$y=\tan\theta\cdot x+n\cdot\lambda\cdot\tan\theta \tag{2}$$

where θ is the angle of the oblique base lines and λ the horizontal spacing between successive base lines (FIG. 2B).

The family of horizontal revealing lines is described by $$y=m\cdot T_r \tag{3}$$

By expressing indices n and m as a function of x and y, $$n=\frac{y-x\cdot\tan\theta}{\lambda\cdot\tan\theta} \qquad m=\frac{y}{T_r} \tag{4}$$

and by expressing k according to equation (1)

$$k=n-m=\frac{y\cdot T_r-x\cdot T_r\cdot\tan\theta-y\cdot\lambda\cdot\tan\theta}{\lambda\cdot T_r\cdot\tan\theta} \tag{5}$$

we deduce the equation describing the family of moiré lines $$y=x\cdot\frac{T_r\cdot\tan\theta}{T_r-\lambda\cdot\tan\theta}+k\cdot\frac{T_r\cdot\lambda\cdot\tan\theta}{T_r-\lambda\cdot\tan\theta} \tag{6}$$

Equation (6) fully describes the family of subtractive moiré lines: the moiré line orientation is given by the slope of the line family and the moiré period can be deduced from the vertical spacing between two successive lines of the moiré line family. In the section on curvilinear band moirés, we make use of indicial equation (6) in order to deduce the transformation of the moiré images whose base and revealing layers are geometrically transformed.

Both in U.S. patent application Ser. No. 10/270,546 and in the present invention, we extend the concept of line grating to band grating. A band of width $T_b$ corresponds to one line instance of a line grating (of period $T_b$) and may incorporate as original shapes any kind of patterns, which may vary along the band, such as black white patterns (e.g. typographic characters), variable intensity patterns and color patterns. For example, in FIG. 3, a line grating 31 and its corresponding band grating 32 incorporating in each band the vertically compressed and mirrored letters EPFL are shown. When revealed with a revealing line grating 33, one can observe on the left side the well known moiré fringe 35 and on the right side, band moiré patterns 34 (EPFL), which are an enlargement and transformation of the letters located in the base bands. These band moiré patterns 34 have the same orientation and repetition period as the moiré fringes 35. FIG. 4 shows the base layer of FIG. 3 and FIG. 5 shows its revealing layer. The revealing layer (line grating) may be photocopied on a transparent support and placed on top of the base layer. The reader may verify that when shifting the revealing line grating vertically, the band moiré patterns also undergo a vertical shift. When rotating the revealing line grating, the band moiré patterns are subject to a shearing and their global orientation is accordingly modified.

FIG. 3 also shows that the base band layer (or more precisely a single set of base bands) has only one spatial frequency component given by period $T_b$. Therefore, while the space between each band is limited by period $T_b$, there is no spatial limitation along the band. Therefore, a large number of patterns, for example a text sentence, may be placed along each band. This is an important advantage over the prior art moiré profile based authentication methods relying on two-dimensional structures (U.S. Pat. No. 6,249,588, its continuation-in-part U.S. Pat. No. 5,995,638, U.S. Pat. No. 6,819,775, Amidror and Hersch, and in U.S. patent application Ser. No. 10/183,550, Amidror).

Figure 7:
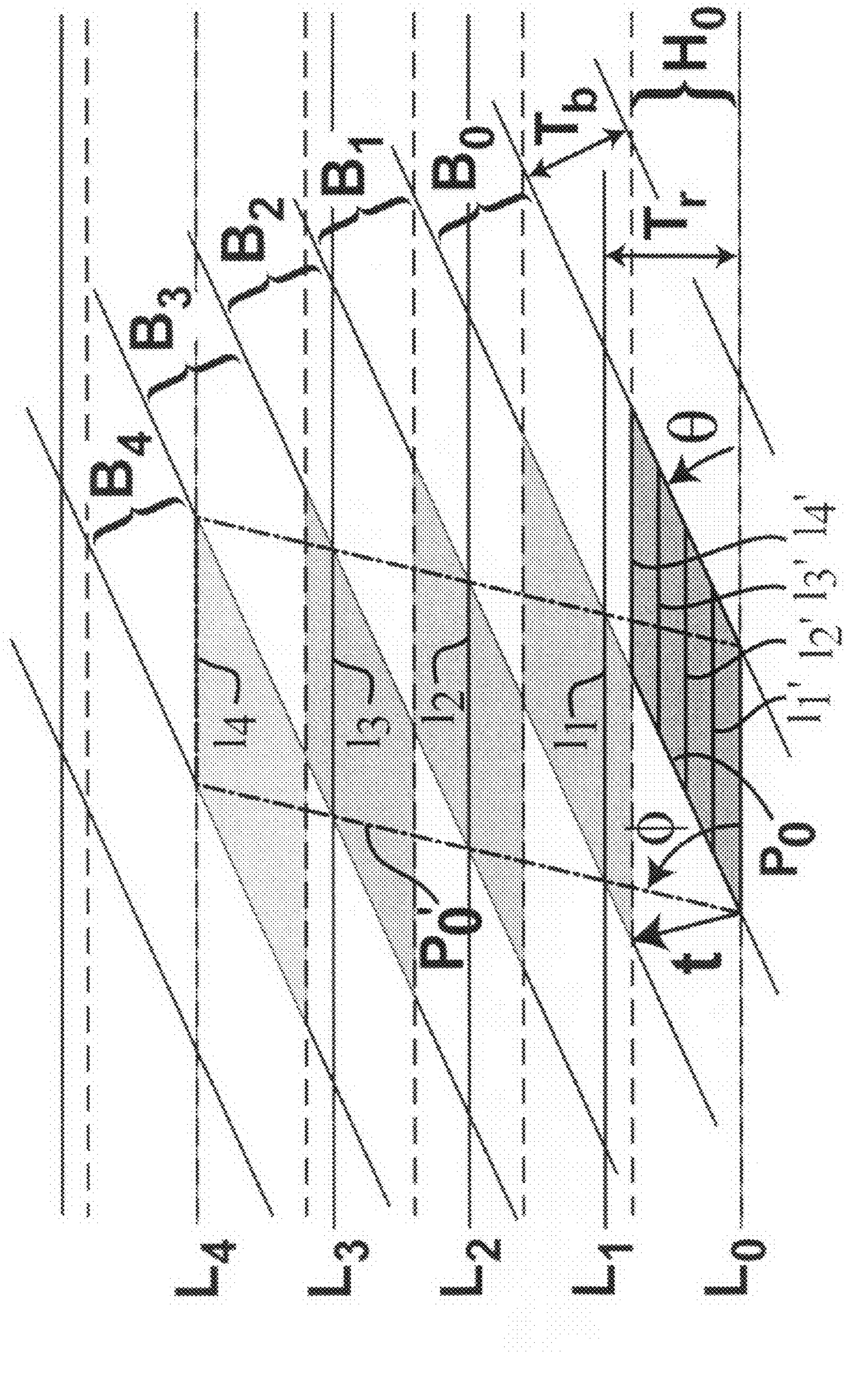
FIG. 7 shows schematically the superposition of oblique base bands and of a revealing line grating (horizontal continuous lines)

In the section "Geometry of rectilinear band grating moirés", we establish the part of the band moiré image layout model which describes the superposition of a rectilinear base band grating layer and a rectilinear revealing line grating layer. The base band layer comprises base bands replicated according to any replication vector t (FIG. 7). This part of the model gives the linear transformation between the one-dimensionally compressed image located within individual base bands and the band moiré image. It also gives the vector specifying the orientation along which the band moiré image moves when displacing the revealing layer on top of the base layer or vice-versa. The linear transformation comprises an enlargement (scaling), possibly a rotation, possibly a shearing and possibly a mirroring of the original patterns.

Note that all drawings showing base band patterns and revealing line grating layers are strongly enlarged in order to allow to photocopy the drawings and verify the appearance of the moiré patterns. However, in real security documents, the base band period $T_b$ and the revealing line grating period $T_r$ are much lower, making it very difficult or impossible to make photocopies of the base band patterns with standard photocopiers or desktop systems.

Terminology

The term "devices which may be subject to counterfeiting attempts" refers to security documents such as banknotes, checks, trust papers, securities, identification cards, passports, travel documents, tickets, valuable business documents such as contracts, etc. and to valuable products such as optical disks, CDs, DVDs, software packages, medical products, watches, etc. These devices are protected by incorporating into them or associating to them a base layer comprising a base band grating and a revealing layer comprising a line grating made of thin transparent lines. Such devices are authenticated by placing the revealing layer on top of the base layer and by verifying if the resulting band moiré image has the same layout as the original reference band moiré image or by moving the revealing layer on top of the base layer and verifying if the resulting dynamic band moiré image has the expected behavior. Expected behaviors are for example band moiré image patterns remaining intact while moving along specific orientations, band moiré image patterns moving radially, or band moiré image patterns subject to a periodic deformation.

The term "image" characterizes images used for various purposes, such as illustrations, graphics and ornamental patterns reproduced on various media such as paper, displays, or optical media such as holograms, kinegrams, etc. . . . Images may have a single channel (e.g. gray or single color) or multiple channels (e.g. RGB color images). Each channel comprises a given number of intensity levels, e.g. 256 levels). Multi-intensity images such as gray-level images are often called bytemaps.

Printed images may be printed with standard colors (cyan, magenta, yellow and black, generally embodied by inks or toners) or with non-standard colors (i.e. colors which differ from standard colors), for example fluorescent colors (inks), ultra-violet colors (inks) as well as any other special colors such as metallic or iridescent colors (inks).

The term "band moiré image" refers to the image obtained when superposing a base band grating layer and a revealing line grating layer. The terms band moiré image and band moiré image layer are used interchangeably.

Each base band (FIG. 6, 62) of a base band grating comprises a base band image. The base band image may comprise various patterns (e.g. the "EPFL" pattern in base band 62), black-white, gray or colored, with pattern shapes forming possibly typographic characters, logos, symbols or line art. These patterns are revealed as band moiré image patterns (or simply band moiré patterns) within the band moiré image (FIG. 6, 64) produced when superposing the revealing line grating layer on top of the base band grating layer.

A base layer comprising a repetition of base bands is called base band grating layer or simply base band grating, base band layer or when the context is unambiguous, base layer. Similarly, a revealing layer made of a repetition of revealing lines is called revealing line grating layer or simply revealing line grating or when the context is unambiguous, revealing layer. Both the base band gratings and the revealing line gratings may either be rectilinear or curvilinear. If they are rectilinear, the band borders, respectively the revealing lines, are straight. If they are curvilinear, the band borders, respectively the revealing lines, are curved.

In the present invention, curvilinear base band gratings and curvilinear revealing line gratings are generated from their corresponding rectilinear base band and revealing line gratings by geometric transformations. The geometric transformations transform the gratings from transformed coordinate space (simply called transformed space) to the original coordinate space (simply called original space). This allows to scan pixel by pixel and scanline by scanline the base grating layer, respectively the revealing line grating layer in the transformed space and find the corresponding locations of the corresponding original base grating layer, respectively revealing line grating layer within the original space.

Figure 1A:
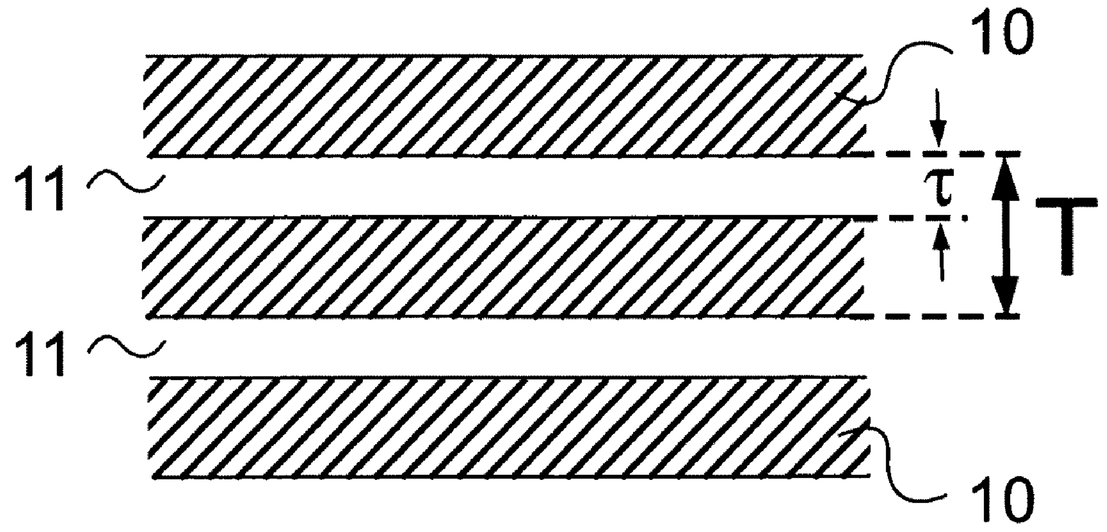
FIGS. 1A and 1B show respectively a grating of lines and a 2D circular dot screen (prior art)
Figure 1B:
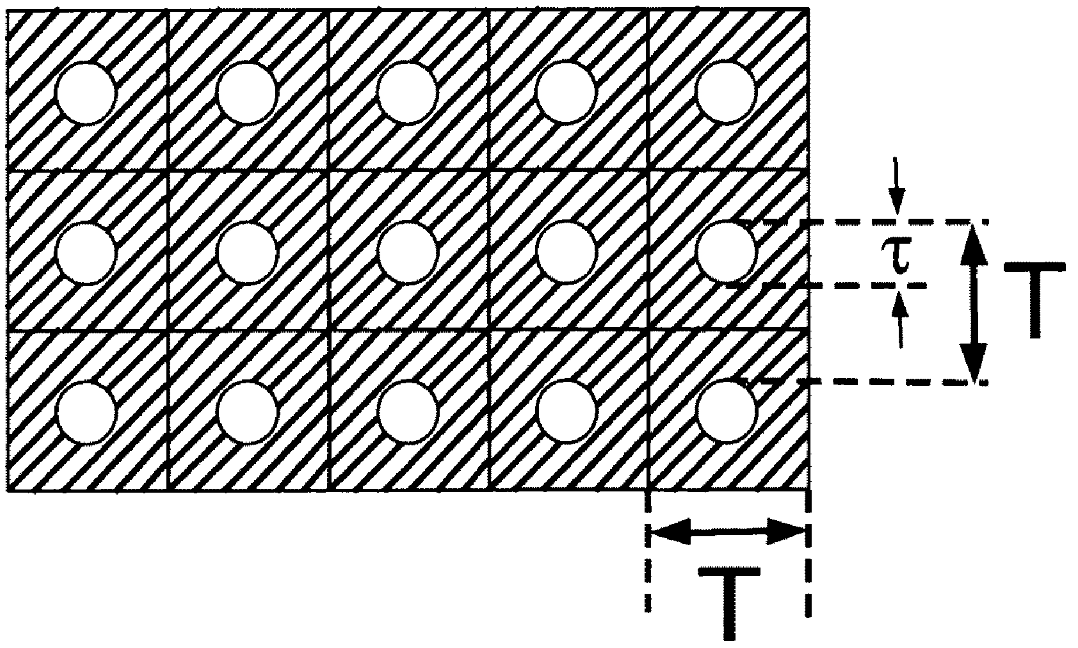

In the present invention, we use the term line gratings in a generic way: a line grating may be embodied by a set of transparent lines (e.g. FIG. 1A, 11) on an opaque or partially opaque support (e.g. FIG. 1A, 10), by cylindric microlenses (also called lenticular lenses) or by diffractive devices (Fresnel zone plates) acting as cylindric microlenses. Sometimes, we use instead of the term "line grating" the term "grating of lines". In the present invention, these two terms should be considered as equivalent. In addition, lines gratings need not be made of continuous lines. A revealing line grating may be made of interrupted lines and still produce band moiré patterns.

In the literature, line gratings are often sets of parallel lines, where the white (or transparent) part ($\tau$ in FIG. 2A) is half the full width, i.e. with a ratio of $\tau/T=1/2$. In the present invention, regarding the line gratings used as revealing layers, the relative width of the transparent part (aperture) is generally lower than ½, for example ⅕, ⅛, or 1/10.

The formulation "displacement of the revealing layer on top of the base layer" means that successive parts of the base layer are sampled at successive relative displacements of the revealing layer. It does not necessarily require a physical movement between the layers. When there is a small gap between base and revealing layer, changing the observation angle is sufficient to sample successively different parts of the base layer and therefore to induce an apparent displacement of the revealing layer on top of the base layer. Hereinafter, the term "displacement of the revealing layer" in respect to the base layer means "displacement of the position sampled by the revealing layer on the base layer". It therefore also comprises apparent displacements between revealing layer and base layer.

The term "printing" is not limited to a traditional printing process, such as the deposition of ink on a substrate. Hereinafter, it has a broader signification and encompasses any process allowing to create a pattern or to transfer a latent image onto a substrate, for example engraving, photolithography, light exposition of photo-sensitive media, etching, perforating, embossing, thermoplastic recording, foil transfer, ink-jet, dye-sublimation, etc. . . .

The Geometry of Rectilinear Band Moiré Images

Figure 6:
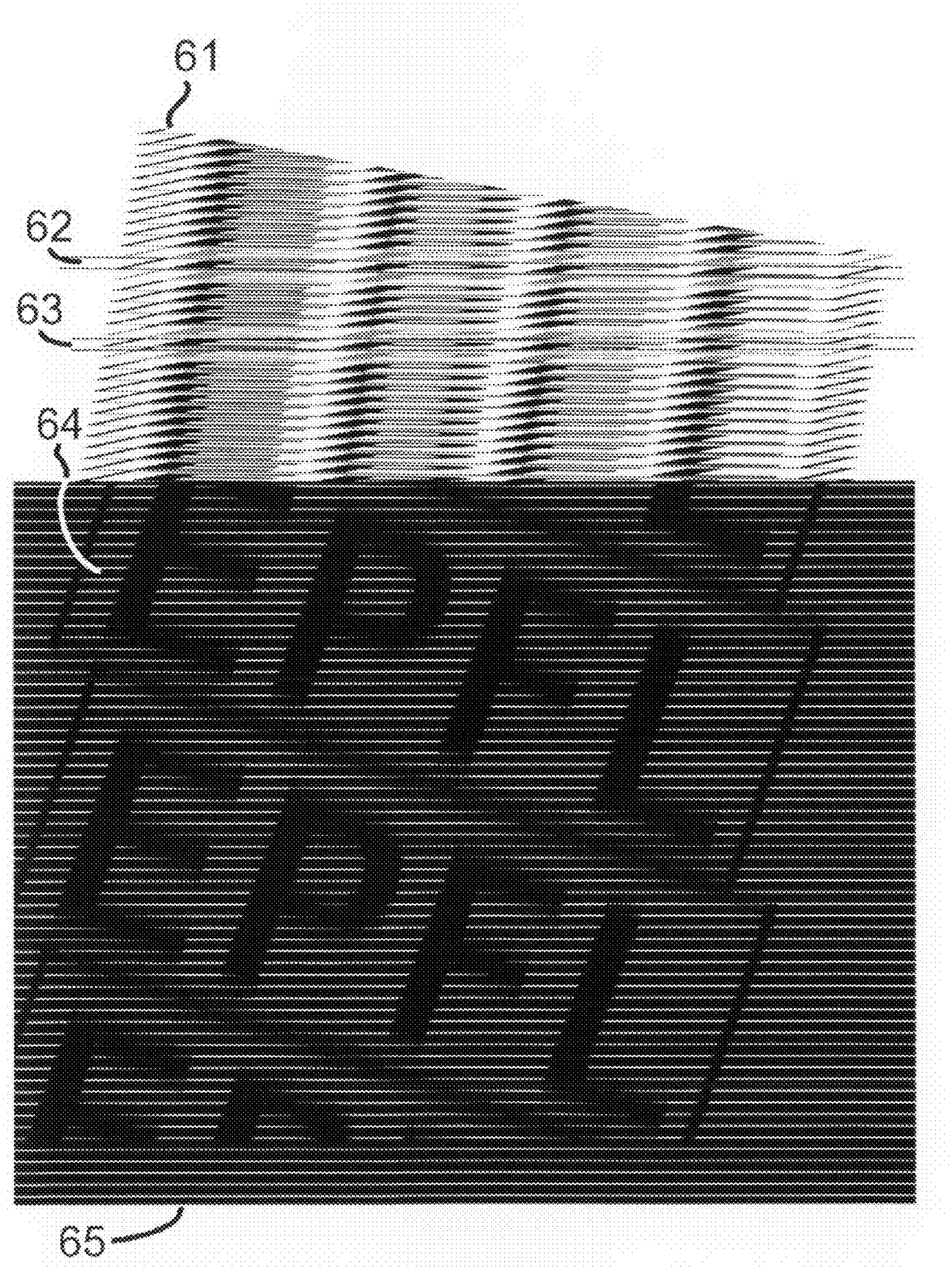
FIG. 6 shows that the produced band moiré patterns are a transformation of the original base band patterns.

FIG. 6 shows the superposition of an oblique base band grating and of a horizontal revealing line grating. Since the superposition of a base band grating and revealing line grating with any freely chosen orientations can always be rotated so as to bring the revealing line grating in the horizontal position, we will in the following explanations consider such a layout, without loss of generality. FIG. 6 shows that the moiré patterns are a transformation of the original base band patterns 61 that are located in the present embodiment within each repetition of the base bands 62 of the base band layer. FIG. 6 also shows the equivalence between the original oblique base band 61 and the derived horizontal base band 63, parallel to the horizontally laid out revealing layer 65.

The geometric model we are describing relies on the assumption that the revealing line grating is made of transparent straight lines with a small relative aperture, i.e. the revealing line grating can be assimilated to a grating of sampling lines. Let us analyze how the revealing line grating (dashed lines in FIG. 7) samples the underlying base layer formed by replications of oblique base band $B_0$, denoted as base bands $B_1$, $B_2$, $B_3$, $B_4$ (FIG. 7).

Base bands are replicated with replication vector t. Oblique base bands $B_1$, $B_2$, $B_3$, $B_4$ are by construction exact replicates of base band $B_0$. The gray parallelograms located respectively in bands $B_1$, $B_2$, $B_3$, $B_4$ (FIG. 7) are therefore exact replicates of the base parallelogram $P_0$ located in band $B_0$. The revealing line grating (revealing lines $L_0$, $L_1$, $L_2$, $L_3$, $L_4$, FIG. 7), superposed on top of the base layer samples the replicated base bands and produces a moiré image (FIG. 3). The intersections of the revealing lines (sampling lines) with replica of base band parallelogram $P_0$, i.e. the sampled line segments $l_1$, $l_2$, $l_3$, $l_4$ are identical to the sampled line segments $l_1'$, $l_2'$, $l_3'$, $l_4'$ within base band parallelogram $P_0$. We observe therefore a linear transformation mapping base band parallelogram $P_0$ to moiré parallelogram $P_0'$. The transformation depends on the relative angle θ between base bands and revealing lines, on the base band replication vector t, and on the revealing line period $T_r$ (FIG. 7).

Figure 8:
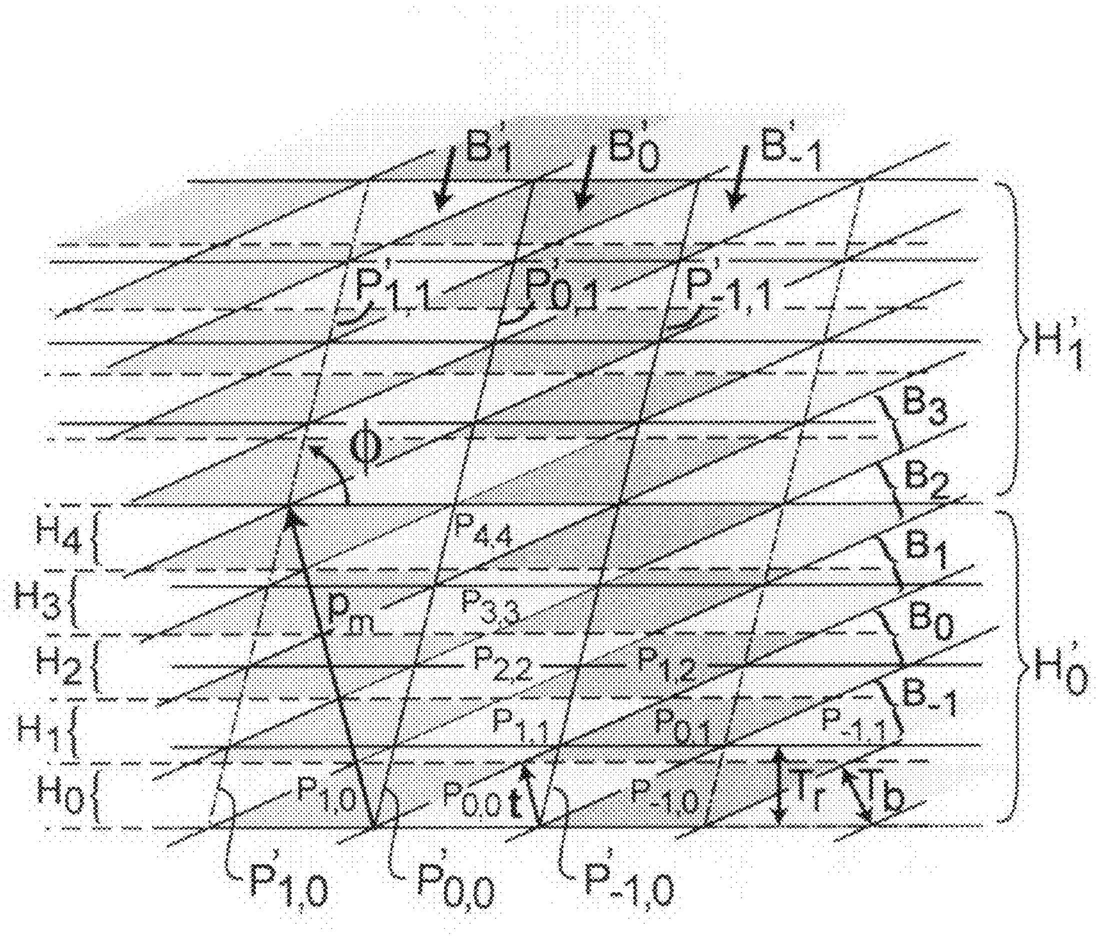
FIG. 8 shows oblique base bands $B_i$, horizontal base bands $H_i$, corresponding oblique moiré bands $B_i'$ and corresponding horizontal moiré bands $H_i'$.
Figure 10:
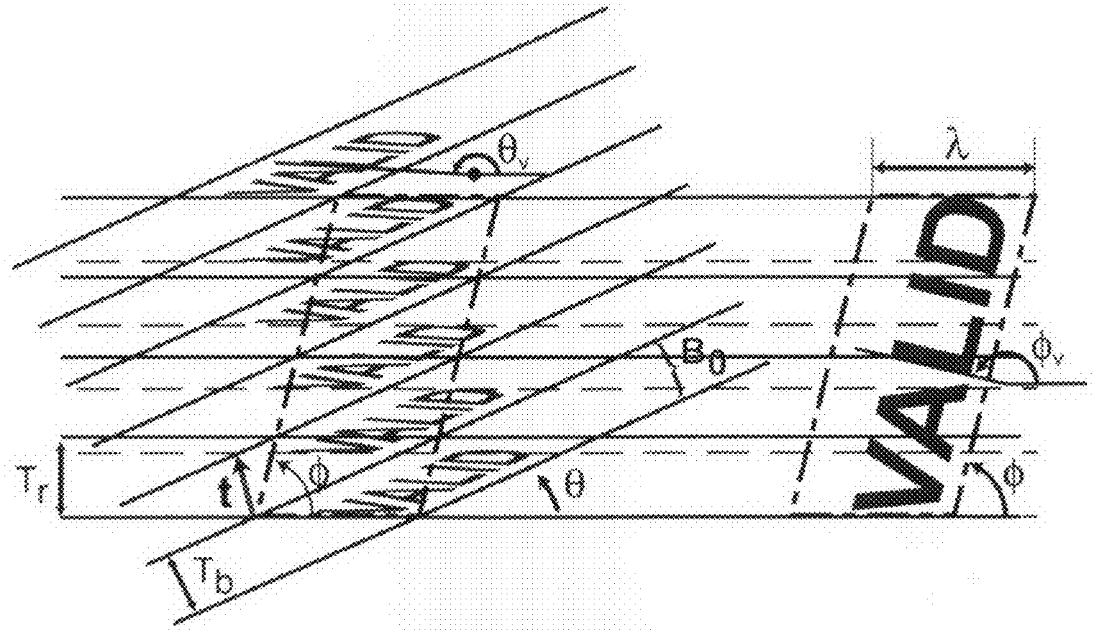
FIG. 10 shows a possible layout of text patterns along the oblique base bands and the corresponding revealed band moiré text patterns.

The observed linear transformation also applies to all other base band parallelograms which are horizontal neighbors of base band parallelogram $P_0$ and which form a horizontal band $H_0$ parallel to the revealing lines. Successive horizontal bands are labelled $H_0$, $H_1$, $H_2$, $H_3$ (FIG. 8). Base band parallelograms at the intersection of oblique base band u and horizontal band v are now denominated $P_{u,v}$. Neighboring parallelograms within a horizontal band [ . . . , $P_{1,0}$, $P_{0,0}$, $P_{-1,0}$, . . . ] are mapped to horizontal moiré neighbor parallelograms [ . . . , $P_{1,0}'$, $P_{0,0}'$, $P_{-1,0}'$, . . . ]. Neighboring parallelograms within an oblique base band [ . . . , $P_{0,0}$, $P_{0,1}$, . . . ] are mapped to oblique moiré neighbor parallelograms [ . . . , $P_{0,0}'$, $P_{0,1}'$, . . . ] Therefore, horizontal base bands $H_0$, $H_1$ are mapped onto horizontal moiré bands $H_0'$, $H_1'$ and oblique base bands $B_0$, $B_1$ are mapped onto oblique moiré bands $B_0'$, $B_1'$(FIG. 10).

Since base band parallelograms $P_{i,i}$ are replica, corresponding moiré parallelograms $P_{i,i}'$ are also replica. When displacing the revealing line grating down with a vertical translation of one period $T_r$, the moiré parallelograms $P_{u,v}'$ move to the position of the moiré parallelograms $P_{u+1,v+1}'$ (e.g. in FIG. 8, parallelogram $P_{0,0}'$ moves to the position of parallelogram $P_{1,1}'$).

Figure 9:
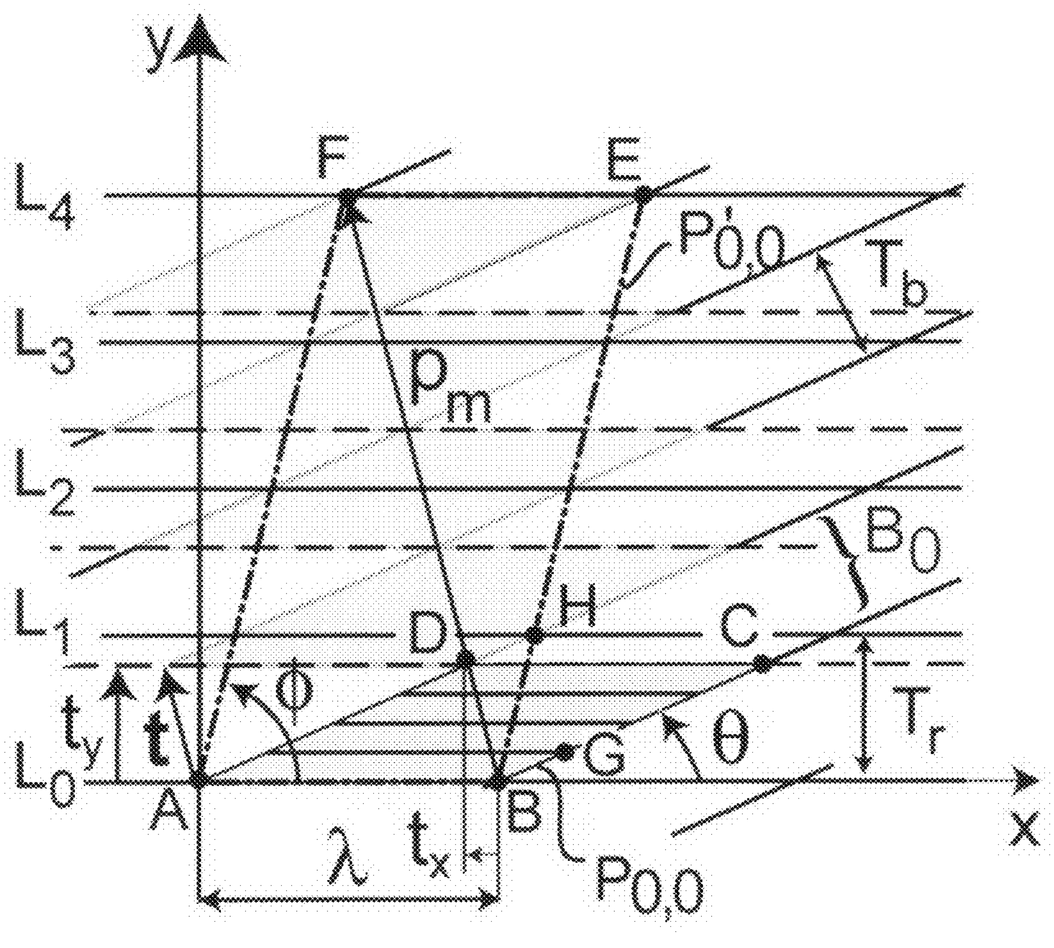
FIG. 9 shows the linear transformation between the base band parallelogram ABCD and the moiré parallelogram ABEF.

Let us establish the parameters of the linear transformation mapping base band parallelograms to moiré parallelograms. According to FIG. 9, points A and B of the base band parallelogram remain fix points and point G of the base band parallelogram $P_{0,0}$ is mapped into point H of the moiré parallelogram $P_{0,0}'$. The coordinates of point H are given by the intersection of revealing line $L_1$ and the upper boundary of oblique base band $B_0$. One obtains the coordinates of point G by subtracting from the coordinates of point H the replication vector $t=(t_x, t_y)$. We obtain $$H=(T_r/\tan\theta, T_r)$$

and $$G=(T_r/\tan\theta-t_x, T_r-t_y) \tag{7}$$

With B as fix point, i.e. (λ,0)→(λ,0), and with G→H, we obtain the linear transformation mapping base band parallelograms to moiré parallelograms $$\begin{bmatrix} x' \\ y' \end{bmatrix} = \begin{bmatrix} p & q \\ r & s \end{bmatrix} \begin{bmatrix} x \\ y \end{bmatrix} = \begin{bmatrix} 1 & \frac{t_x}{T_r - t_y} \\ 0 & \frac{T_r}{T_r - t_y} \end{bmatrix} \begin{bmatrix} x \\ y \end{bmatrix} \tag{8}$$

Interestingly, with a constant replication vector t, the linear transformation parameters remain constant when modifying angle θ between the base band and the revealing line grating. However, the orientation ϕ of the moiré parallelogram depends on θ. The moiré parallelogram angle can be derived from line segment $\overline{BH}$, where point B has the coordinates (λ,0) and where $\lambda=(t_y/\tan\theta)-t_x$. With point H given by Eq. (7), we obtain for the moiré parallelogram orientation ϕ

$$\tan\phi = \frac{T_r}{\frac{T_r}{\tan\theta} - \lambda} \tag{9}$$

One can easily verify that indeed, the slope of the moiré parallelogram obtained by the proposed linear transformation between base layer and moiré layer is identical to the slope of the moiré line described by its indicial equation (6). This can be explained by considering that moiré lines are a special case of band moiré images. If we replace the oblique base band layer with a line grating of the same orientation, period and phase, we obtain within the oblique moiré parallelogram bands the corresponding moiré lines.

Expressed as a function of its oblique base band width $T_b$, with $\lambda=T_b/\sin\theta$, the moiré parallelogram orientation $$\tan\phi = \frac{T_r\cdot\sin\theta}{T_r\cdot\cos\theta - T_b} \tag{10}$$

is identical to the familiar moiré line orientation formula developed according to geometric considerations by Tollenaar (see D. Tollenaar, Moiré-Interferentieverschijnselen bij rasterdruk, Amsterdam Instituut voor Grafische Technick, 1945, English translation: Moiré in halftone printing interference phenomena, published in 1964, reprinted in Indebetouw G. Czarnek R. (Eds.). 618-633, Selected Papers on Optical Moiré and Applications, SPIE Milestone Series, Vol. MS64, SPIE Press, 1992, hereinafter referenced as [Tollenaar 45]).

Since both the oblique and the horizontal moiré parallelogram bands are replica (FIG. 8), let us deduce the moiré band replication vector $p_m$. Since base bands are replicated by replication vector $t=(t_x, t_y)$ and since there is a linear mapping between base band parallelogram $P_{0,0}$ and moiré parallelogram $P_{0,0}'$, whose diagonal is the moiré band replication vector $p_m$ (FIG. 9), by mapping point $(t_x, t_y)$ according to the linear transformation given by the system of equations (6), we obtain replication vector $p_m$ $$p_m = \left(t_x + t_y\cdot\frac{t_x}{T_r - t_y},\ t_y\cdot\frac{T_r}{T_r - t_y}\right) = \frac{T_r}{T_r - t_y}\cdot t \tag{11}$$

The orientation of replication vector $p_m$ gives the angle along which the moiré band image travels when displacing the horizontal revealing layer on top of the base layer. This moiré band replication vector is independent of the oblique base band orientation, i.e. one may, for the same base band replication vector $t=(t_x, t_y)$ conceive different oblique base bands yielding the same moiré band replication vector. However, differently oriented oblique base bands will yield differently oriented oblique moiré bands. Corresponding moiré parallelograms will be different, but they will all have replication vector $p_m$ as their diagonal.

Again, it is possible to verify that in the special case when the oblique base band layer is replaced by a line grating having the same geometric layout, the moiré bands become moiré lines and their respective period $T_m$ (distance between two moiré lines, see FIG. 2B) can be deduced from moiré band replication vector $p_m$. For this purpose, we carry out the dot product between replication vector $p_m$ and a unit vector perpendicular to the moiré lines who have the orientation $\phi$ (Eq. 9). With $t_x=(t_y/\tan\theta)-(T_b/\sin\theta)$, and we obtain the well known formula for the moiré line period [Tollenaar 45]).

$$T_m = \frac{T_b\cdot T_r}{\sqrt{T_b^2 + T_r^2 - 2\cdot T_b\cdot T_r\cdot\cos\theta}} \tag{12}$$

When rotating either the base band layer or the revealing layer, we modify angle $\theta$ and the linear transformation changes accordingly (Eq. 6). When translating the base band layer or revealing layer, we just modify the origin of the coordinate system. Up to a translation, the band moiré patterns remain identical.

In the special case where the band grating (base layer) and the revealing layer have the same orientation, i.e. $t_x=0$ and $\theta=0$, according to Eq. (10), the moiré patterns are simply a vertically scaled version of the patterns embedded in the replicated base bands, with a vertical scaling factor of $T_r/(T_r-t_y)=1/(1-t_y/T_r)$. In that case, the width $T_b$ of the base band grating is equal to the vertical component $t_y$ of the replication vector t.

Synthesis of Rectilinear Band Moiré Images

By considering the revealing line grating as a sampling line array, we were able to define the linear transformation between the base layer and the moiré image. The base layer is formed by an image laid out within a single base band replicated with vector t so as to cover the complete base layer space. In order to better understand the various moiré image design alternatives, let us try to create a text message within the base layer according to different layout alternatives.

One may for example conceive vertically compressed microtext (or graphical elements) running along the oblique base bands at orientation $\theta$ (FIG. 10, left). In the moiré image, the corresponding linearly transformed enlarged microtext will then run along the oblique moiré bands at orientation $\phi$ (FIG. 10, right). The microtext's vertical orientation can also be chosen. With equation (9) expressing the relationship between orientations within the base band layer and orientations within the moiré image layer, one may compute the vertical bar orientation (angle $\theta_v$ of the vertical bar of letter "L" in FIG. 10, left) of the microtext which in the moiré image yields an upright text, i.e. a text whose vertical orientation (angle $\phi_v=\phi+90°$) is perpendicular to its baseline (FIG. 10, right). We first express $\theta_v$ as a function of $\phi_v$, replace $\phi_v$ by $\phi+90°$, and finally express $\phi$ as a function of $\theta$. We obtain the microtext's vertical orientation $\theta_v$ yielding an upright text in the moiré image $$\cot\theta_v = \frac{1}{\frac{\lambda}{T_r} - \cot\theta} + \frac{\lambda}{T_r} \tag{13}$$

Clearly, the orientation of the revealed moiré text baseline (angle $\phi$) is given by the orientation of the oblique band (angle $\theta$). The height of the characters depends on the oblique base band base $\lambda$ or, equivalently, on its width $T_b$. The moiré band repetition vector $p_m$ which defines how the moiré image is translated when displacing the revealing layer up and down, depends according to Eq. (11) on replication vector $t=(t_x,t_y)$. Once the moiré text baseline orientation $\theta$ and oblique band base $\lambda$ are chosen, one may still modify replication vector t by moving its head along the oblique base band border. By choosing a vertical component $t_y$ closer to $T_r$, the vertical enlargement factor s becomes larger according to Eq. (8) and the moiré image becomes higher, i.e. the text becomes more elongated.

Alternatively, instead of designing the microtext within the oblique base bands, one may design microtext within a horizontal base band (FIG. 11) whose height is given by the vertical component $t_y$ of base band replication vector $t=(t_x, t_y)$. By replicating this horizontal base band with replication vector t, we populate the base layer.

The vertical orientation of the microtext can be freely chosen. It defines the layout of the corresponding oblique bands and therefore, the vertical orientation $\phi$ of the revealed moiré text image (linearly transformed enlarged microtext). The selected replication vector t defines the vertical size of the moiré band $H_0'$ (FIG. 11), i.e. the vertical extension of the revealed moiré text image and its displacement directions $p_m$ when the revealing layer moves on top of the base layer (Eq. 11).

The choice of the revealing line period $T_r$ depends on the base layer resolution. Generally the period $T_r$ of the revealing line grating is between 5% to 10% smaller or larger than the horizontal base band layer width $t_y$. Considering equation (8), factor $s=T_r/(T_r-t_y)$ defines the vertical enlargement between the image located within a horizontal base band ($H_0$ in FIG. 11) and the moiré image located within the corresponding moiré horizontal band $H_0'$. The horizontal base band width $t_y$ should offer enough resolution to sample the vertically compressed text or graphical design (vertical compression factor: s). At 1200 dpi, a horizontal base band width of half a millimeter corresponds to 24 pixels. This is enough for displaying text or line graphics. Therefore, at a resolution between 1200 dpi and 600 dpi, we generally select a revealing line grating period between one half to one millimeter. The aperture of the revealing layer, i.e. the width of its transparent lines is between 10% to 15% of its period $T_r$.

Figure 11:
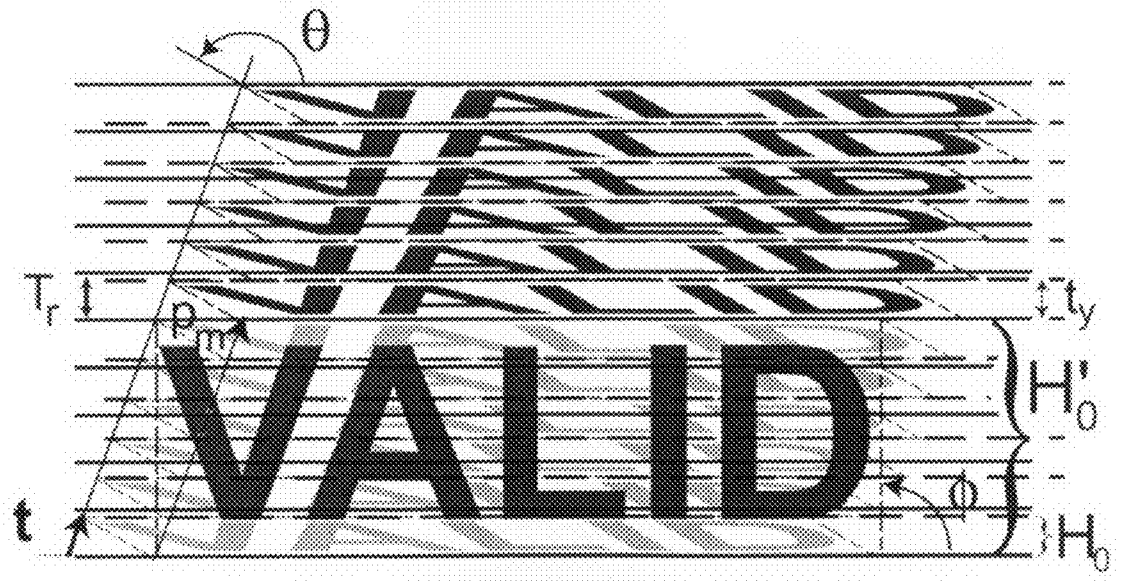
FIG. 11 shows another layout of text patterns along the horizontal base bands, and the corresponding moiré text patterns.

The creation of moiré images does not necessarily need a sophisticated computer-aided design system. Let us illustrate the moiré image creation procedure in the case of a microtext laid out within a horizontal base band. One may simply start by defining the period $T_r$ of the revealing layer. Then one creates the desired "moiré" image within a horizontal parallelogram, whose sides define the orientation $\phi$ of the oblique moiré band borders $B_i'$(FIG. 10). The horizontal parallelogram height defines the vertical size of the moiré band $H_0'$, i.e. the vertical component of replication vector $p_m$ and therefore according to Eq. (11) the vertical component $t_y$ of replication vector t. One needs then to linearly transform the horizontal moiré image parallelogram in order to fit it within a horizontal band of height $t_y$. This "flattening" operation has one degree of freedom, i.e. point F (FIG. 9) may be freely mapped to a point D located at the top border of the horizontal base band. The mapping between point F and point D yields the value of $\lambda$ and the horizontal component $t_x$ of replication vector t. By modifying the position of point D along the top border of the horizontal base band, one modifies the horizontal component $t_x$ of vector t and therefore the orientation $p_m$ along which the moiré parallelogram moves when translating the revealing layer on top of the base layer (FIG. 11).

Examples of Rectilinear Moiré Images

Figure 12A:
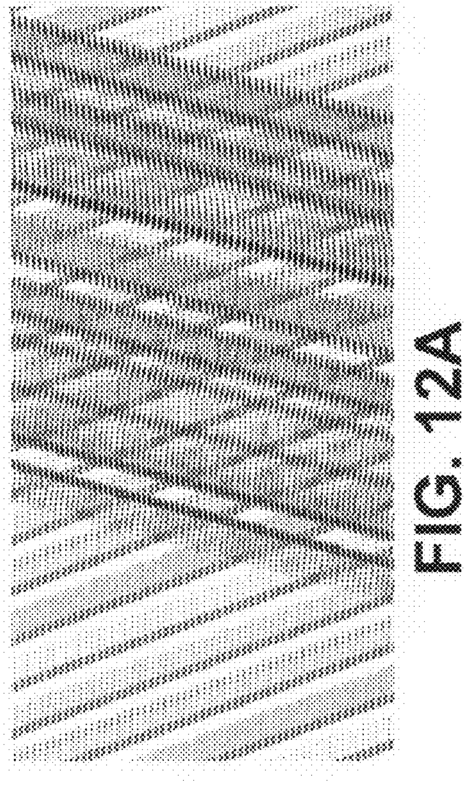
FIG. 12A shows a base layer comprising three sets of rectilinear base bands with different periods and orientations.
Figure 12B:
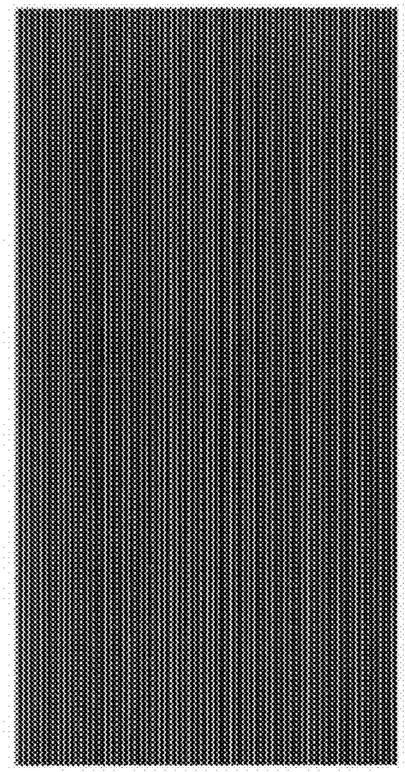
FIG. 12B shows a rectilinear revealing layer.
Figure 12C:
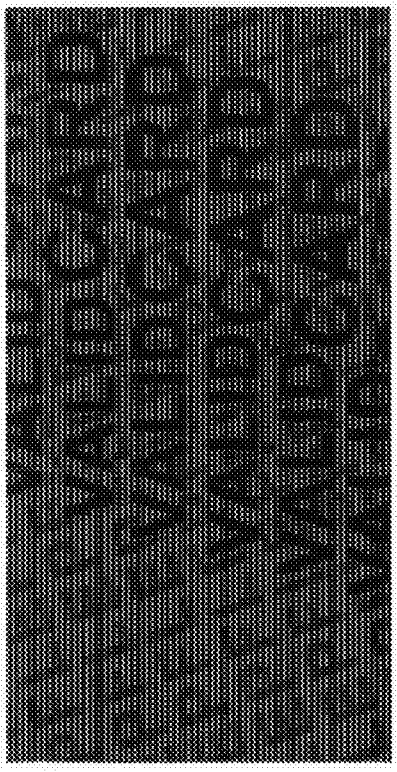
FIG. 12C shows the superposition of the rectilinear revealing layer shown in FIG. 12B and of the base layer shown in FIG. 12A.
Figure 12D:
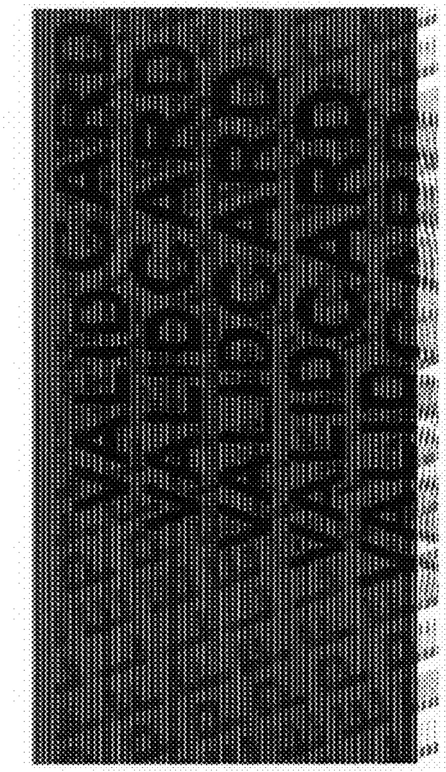
FIG. 12D shows the same superposition as in FIG. 12C, but with a translated revealing layer.

We first consider the simple text strings "EPFL", "VALID" and "CARD". Each text string has a specific layout and a specific replication vector t. All distance values are given in pixels at 1200 dpi. "EPFL" is laid out within an oblique band of orientation $\theta=-1.8°$, $t_x=-15.65$, $t_y=43$. "VALID" and "CARD" are each laid out within a horizontal band, with respective replication vectors ($t_x=9.64$, $t_y=36$) and ($t_x=11.25$, $t_y=42$) and respective character verticals at orientations $\theta=162.7°$ and $\theta=14.92°$ (FIG. 12A). The revealing layer has a period $T_r=39$ (FIG. 12B, top right). The corresponding base layers superposed with the single revealing layer yield a moiré image composed of 3 differently oriented text pieces travelling up or down along different directions at different relative speeds (FIG. 12C and FIG. 12D). FIG. 12D shows that a translation of the revealing layer on top of the base layer (or vice-versa) yields, up to a vertical translation, the same band moiré image. When the revealing layer moves vertically by one period, the moire bands also move by one period along their displacement orientation given by vector $p_m$ (Eq. 11). With a revealing layer displacement speed of u revealing lines per second perpendicular to the revealing lines, the moiré displacement speed vector is therefore $u \cdot p_m$ per second. According to Eq. 11 the speed amplification a between revealing layer and moire band image displacement speeds is $a=T_r/(T_r-t_y)$.

Figure 13A:
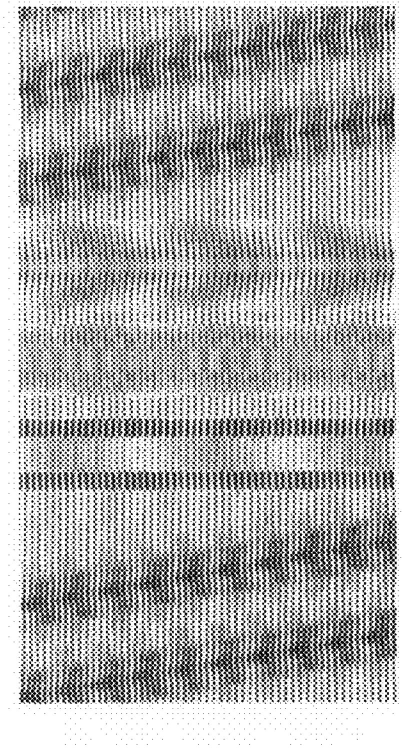
FIGS. 13A, 13B, 13C and 13D show respectively the base layer, the revealing layer and superpositions of base layer and revealing layer according to two different relative superposition positions yielding a multicomponent moiré image inspired from the US flag, where different band moiré image components move along different orientations at different speeds.
Figure 13B:
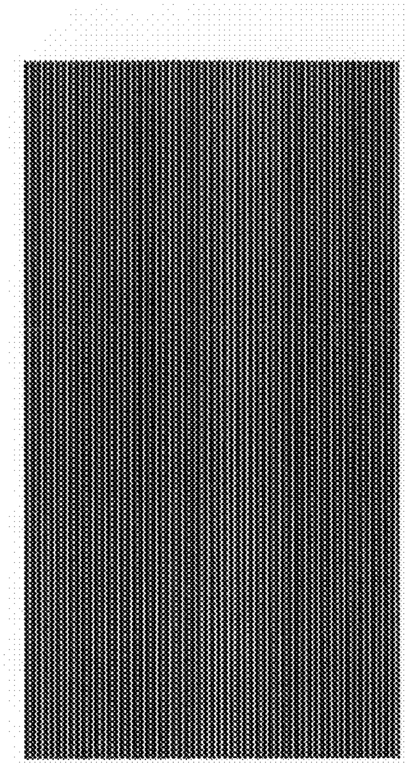
Figure 13C:
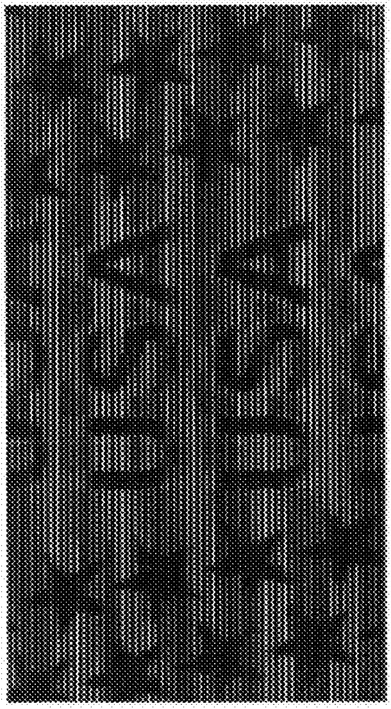
Figure 13D:
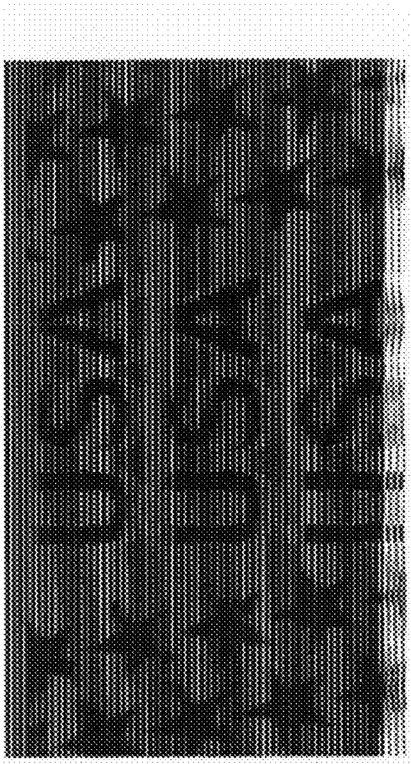

As an example, we show a dynamic design (FIG. 13) inspired by the US flag, where the three superposed independent base band gratings (FIG. 13A) generate upon superposition with the revealing layer (FIG. 13B) corresponding moiré image components moving according to their specific relative speeds and orientations (FIGS. 13C and 13D).

Figure 14:
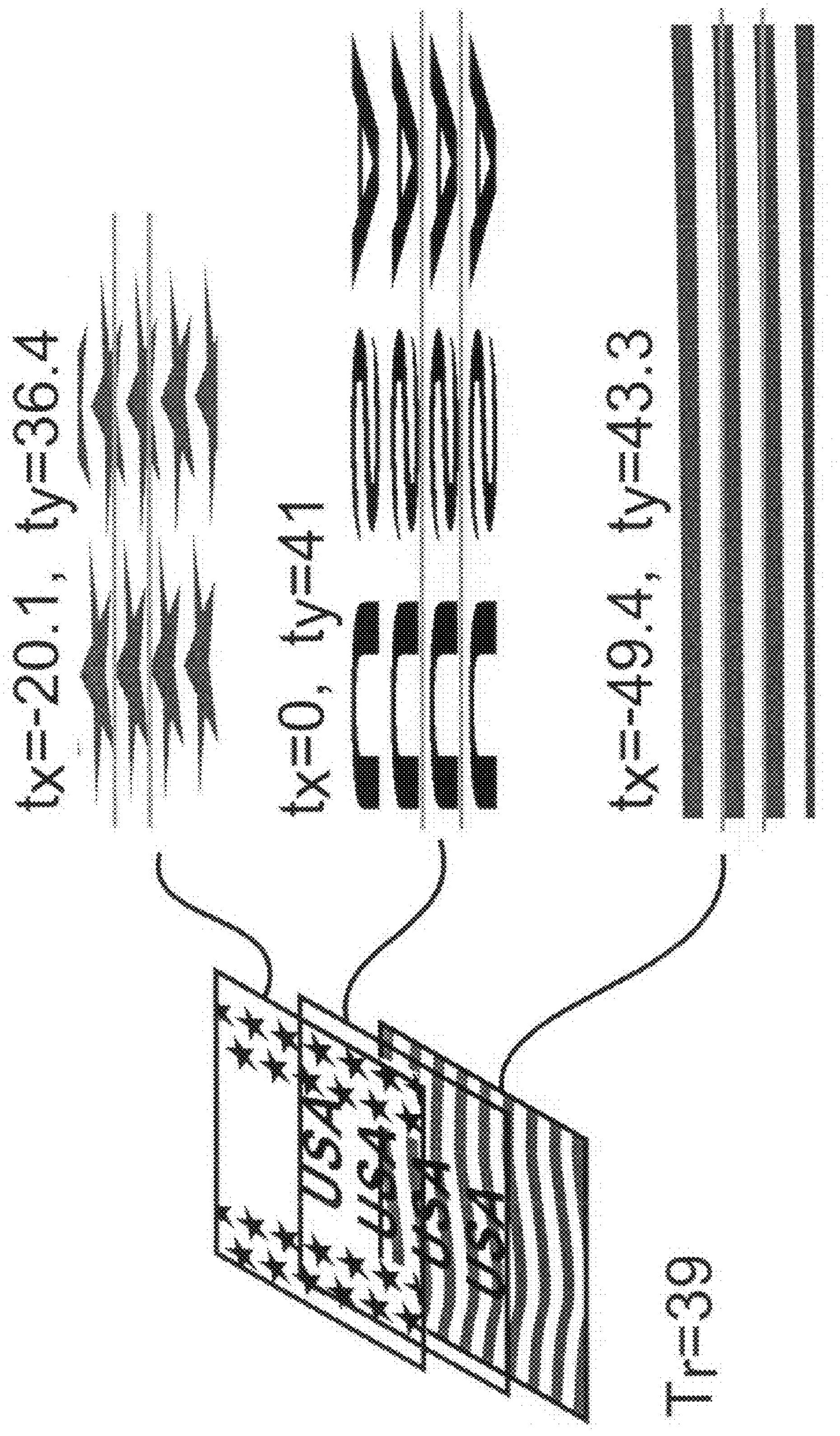
FIG. 14. shows the parameters of the base layer shown in FIG. 13A and of the revealing layer shown in FIG. 13B, expressed in pixels (e.g. at 1200 dpi)

When two layers have their patterns superposed one on top of the other, we either give priority to one layer (e.g. the USA pattern has priority over the red stripes) or simply superpose the two layers (stars and red stripes). FIG. 14 shows the three base layers and an enlargement of the corresponding base bands (the vertical enlargement factor is twice the horizontal enlargement factor). Note that when the revealing layer period $T_r$ is smaller than the horizontal base band width $t_y$, we obtain according to Eq. (8) a negative vertical enlargement factor s, i.e. a mirrored moiré image (see "USA" base band pattern in FIG. 14). In such cases, base band patterns need to be vertically mirrored to produce a non-mirrored moiré image

Curvilinear Band Moirés

In addition to periodic band moiré images, one may also create interesting curvilinear band moiré images. It is known from the Fourier analysis of geometrically transformed periodic line gratings [Amidror98] that the moiré generated by the superposition of two geometrically transformed periodic line gratings is a geometric transformation of the moiré formed between the original periodic line gratings. This result is however limited to a base layer formed by a periodic profile line grating and cannot be simply transposed to base layer formed by a band grating. In the next section "Model for the layout of geometrically transformed moiré images", we disclose the part of the band moiré image layout model which enables computing the layout of moiré images whose base and revealing layers are geometrically transformed.

FIGS. 15A, 15B, 16A and 16B give an example of a curvilinear base band grating incorporating the words "VALID OFFICIAL DOCUMENT" revealed by a curvilinear line grating. The curvilinear base band layer (FIG. 15B) as well as the curvilinear revealing line grating (FIG. 16B) in the transformed space $x_t,y_t$ are obtained from the corresponding rectilinear gratings in the (x,y) original space by the transformation $x=g_1(x_t,y_t)=h_1(x_t,y_t)$, $y=g_2(x_t,y_t)=h_2(x_t,y_t)$ $$x = h_1(x_t, y_t) = \frac{\operatorname{atan}(x_t - c_x,\ y_t - c_y)}{2 \cdot \pi} \cdot w_x \qquad (14)$$

$$y = h_2(x_t, y_t) = c_1 \cdot \sqrt{(x_t - c_x)^2 + (y_t - c_y)^2}$$

where $(c_x,c_y)$ gives the center point in the transformed coordinate space, $w_x$ gives the width of the original base layer and $c_1$ is a constant radial scaling factor. Note that the transformations yielding circular gratings may easily be modified to yield elliptic gratings by expressing $h_2$ for example as $$y = h_2(x_t, y_t) = c_1 \cdot \sqrt{\left(\frac{x_t - c_x}{a}\right)^2 + \left(\frac{y_t - c_y}{b}\right)^2}$$

where a and b are freely chosen constants.

Figure 15A:
FIG. 15A shows a rectilinear reference moiré image.
Figure 15B:
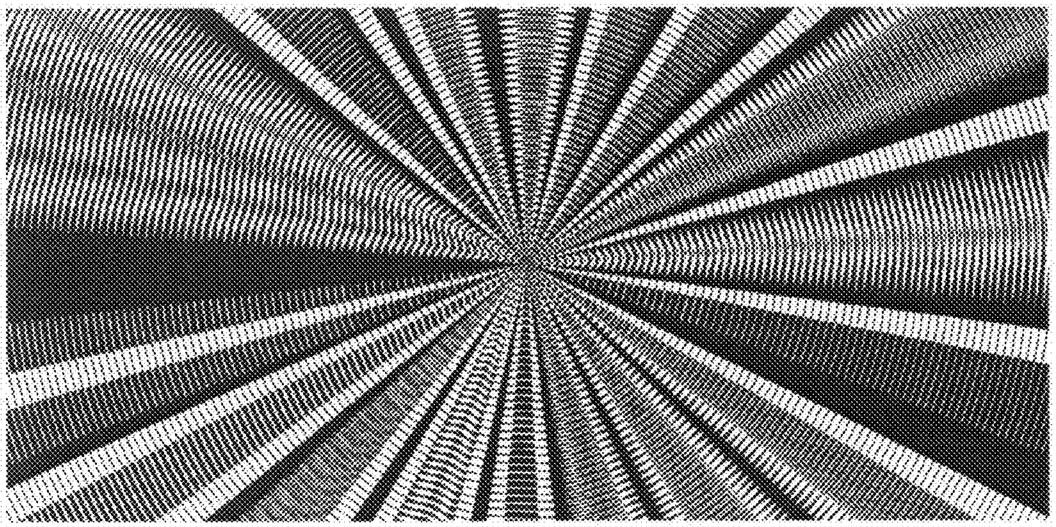
FIGS. 15B and 16B illustrate respectively the application of a same geometric transformation to both the base and the revealing layer, yielding a circular base band layer (FIG. 15B) and a circular revealing layer in the transformed space (FIG. 16B)
Figure 16A:
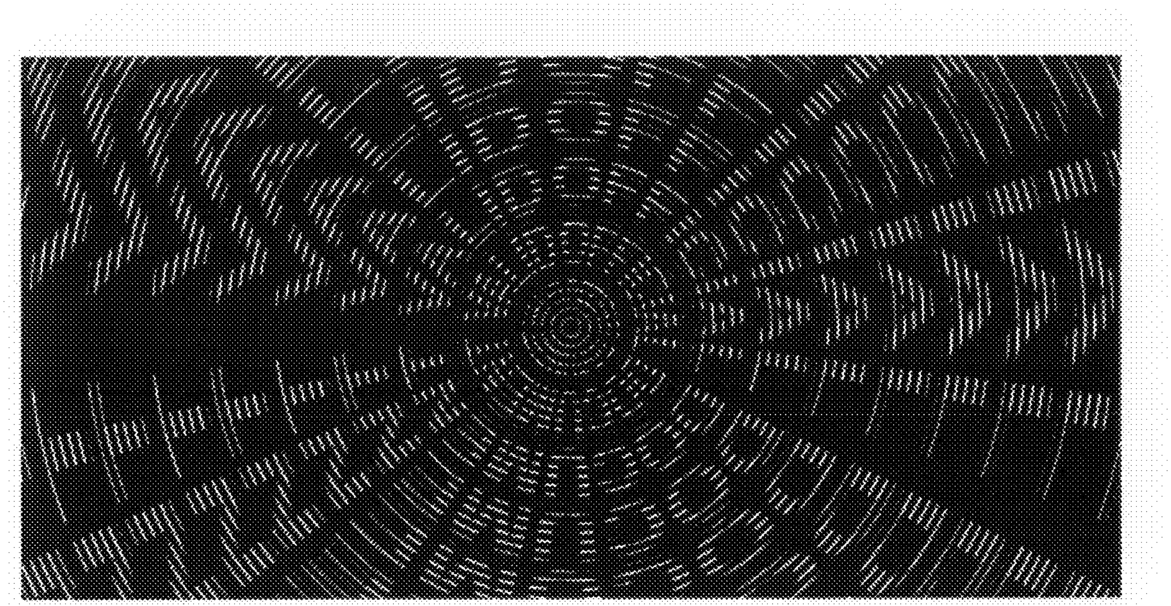
FIG. 16A shows the curvilinear circular band moiré image resulting from the superposition of the base layer shown in FIG. 15B and of the revealing layer shown in FIG. 16B.
Figure 16B:
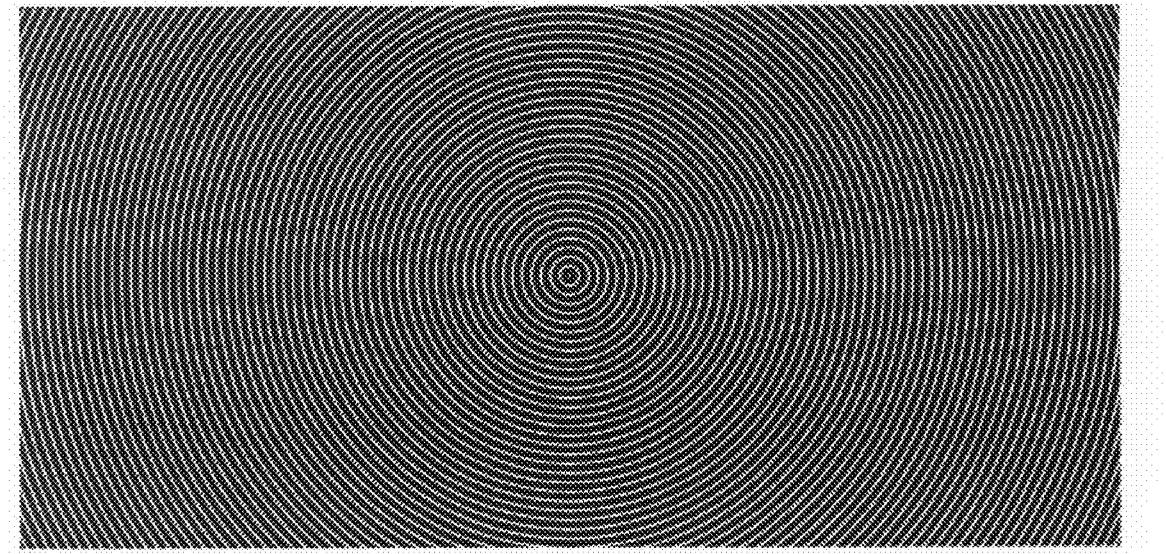

To generate the curvilinear base band layer $r_b(x_t,y_t)$, the transformed space within which the curvilinear base band grating is located is traversed pixel by pixel and scanline by scanline. At each pixel $(x_t,y_t)$, the corresponding position $(x,y)=(h_1(x_t,y_t), h_2(x_t,y_t))$ in the original rectilinear base band layer is found and its intensity (possibly obtained by interpolation of neighbouring pixels) is assigned to the current curvilinear base band layer pixel $r_b(x_t,y_t)$. As an example, FIG. 15A gives a reference original moiré image in the original coordinate space, from which the original rectilinear base band layer is derived. FIG. 15B gives the corresponding curvilinear base band layer in the transformed space and FIG. 16B the curvilinear revealing line grating in the transformed space. The curvilinear line grating can be reproduced on a transparent support. When placing the curvilinear revealing line grating on top of the curvilinear base band layer (FIG. 15B) at the exact superposition position, i.e. with the coordinate system of the base layer located exactly on top of the coordinate system of the revealing layer, the revealed moiré image shown in FIG. 16A is a circular transformation of the original moire image, i.e. the moire image formed by the superposition of the original non-transformed rectilinear base and revealing layers. When the base layer and the revealing layer are not exactly superposed at the correct relative positions and orientation, the moiré image is still visible, but deformed. By moving and rotating the revealing layer on top of the base layer, one reaches easily the exact superposition position, where the moiré image is a circularly laid out text message (FIG. 16A). In the case of a composed layer comprising a fixed setup of base and revealing layer (see Section "Embodiments of base and revealing layers"), only the exact layout of base and revealing layers and their exact superposition yields an undeformed moiré image. By slightly tilting the composed layer, either vertically or horizontally, one may observe the deformation of the moiré image.

Model for the Layout of Geometrically Transformed Moiré Images

In this section, we describe the geometric transformation that a moiré image undergoes, when its base band grating and its revealing line grating are subject to a geometric transformation. We then derive conditions and equations of the geometric transformations to be applied either to the rectilinear base band grating and/or to the revealing line grating in order to obtain a desired geometric moire image transformation.

Starting with a rectilinear base band grating and a rectilinear revealing line grating, one may apply to them either the same or different non-linear geometric transformations. The curvilinear band moiré image we obtain is a transformation of the original band moiré image obtained by superposing the rectilinear base band and revealing layers. We derive the geometric transformation which gives the mapping between the resulting curvilinear band moiré image and the original rectilinear band moiré image. This mapping completely defines the layout of the curvilinear band moiré image.

Figure 17A:
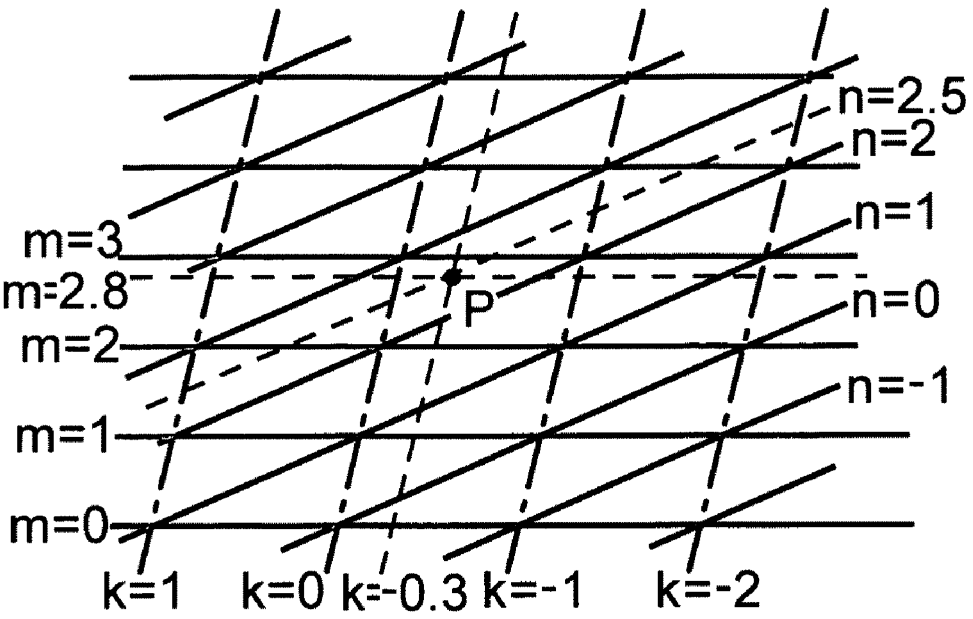
FIGS. 17A and 17B show the indices of oblique base band borders n, of revealing lines m and of corresponding moiré band border lines k before (FIG. 17A) and after (FIG. 17B) applying the geometric transformations.
Figure 17B:
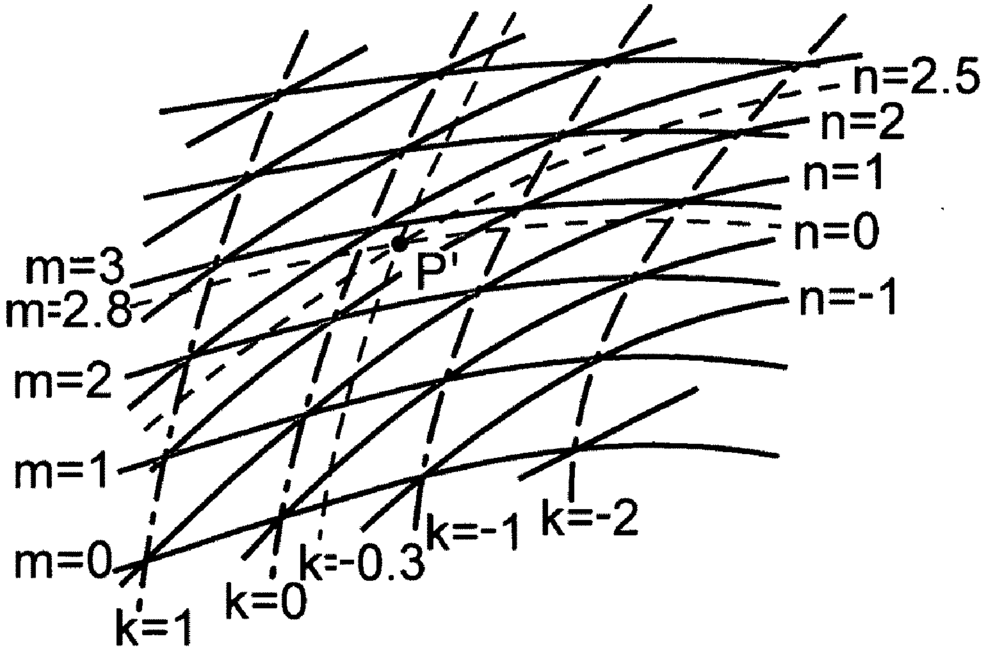

The key element for deriving the transformation between curvilinear and original moiré images is the determination of parameters within the moiré image, which remain invariant under the layer transformations, i.e. the geometric transformation of base and revealing layers. One parameter remaining invariant is the index k of the moiré parallelogram oblique border lines (FIG. 17A), which correspond to the moiré lines shown in FIG. 2B. The curved (transformed) moiré parallelograms are given by the intersections of curved base band borders and curved revealing lines (FIG. 17B). According to the indicial approach, we may describe any point within the base layer space or respectively within the revealing layer space as being located on one oblique base band line of index n (n being a real number) or respectively on one revealing grating line of index m (m being a real number). Clearly, under a geometric transformation of their respective layers, indices n and m remain constant. The intersection between the family of oblique base band lines of index n and of revealing grating lines of index m yields the family of moiré image lines of index k=n−m (k being a real number), both before applying the geometric transformations and after applying these transformations.

Eq. (4) gives the family of moiré image lines parallel to the borders of the moiré parallelogram before applying the geometric transformations. Let us define the geometric transformation between transformed base layer space $(x_t,y_t)$ and original base layer space (x,y) by $$x=h_1(x_t,y_t);\ y=h_2(x_t,y_t) \tag{15}$$

and the geometric transformation between transformed revealing layer space $(x_t,y_t)$ and original revealing layer space (x,y) by $$y=g_2(x_t,y_t) \tag{16}$$

Note that any superposition of original base and revealing layers can be rotated so as to obtain a horizontal revealing layer, whose line family equation depends only on the y-coordinate. The transformation from transformed space to original space comprises therefore only the single function $y=g_2(x_t,y_t)$.

We can insert these geometric transformations into respectively the oblique line equation (2) and the revealing line equation (3), and with equation (5), we obtain the implicit equation of the moiré lines in the transformed space according to their indices k.

$$n=\frac{h_2(x_t,y_t)-h_1(x_t,y_t)\cdot\tan\theta}{\lambda\cdot\tan\theta};\ m=\frac{g_2(x_t,y_t)}{T_r} \tag{17}$$

$$k=n-m=\frac{h_2(x_t,y_t)\cdot T_r-h_1(x_t,y_t)\cdot T_r\cdot\tan\theta-g_2(x_t,y_t)\cdot\lambda\cdot\tan\theta}{\lambda\cdot T_r\cdot\tan\theta}$$

Since the moiré line indices k are the same in the original (Eq. 5) and in the transformed spaces (Eq. 17), by equating them and bringing all terms into the same side of the equation, we obtain an implicit equation establishing a relationship between transformed and original moiré space coordinates having the form $F_k(x_t,y_t,x,y)=0$.

$$F_k(x_t,y_t,x,y)=h_2(x_t,y_t)\cdot T_r-h_1(x_t,y_t)\cdot T_r\cdot\tan\theta-g_2(x_t,y_t)\cdot\lambda\cdot\tan\theta+x\cdot T_r\cdot\tan\theta+y\cdot(\lambda\cdot\tan\theta-T_r)=0 \tag{18}$$

To completely specify the mapping between each point of the transformed moiré space and each point of the original moiré space, we need an additional implicit equation relating transformed and original moiré image layer coordinates.

We observe that replicating oblique base bands with the replication vector t is identical to replicating horizontal base bands with replication vector t (FIG. 8). We can therefore concentrate our attention on the moiré produced by superposing the horizontal revealing line grating (FIG. 18, continuous horizontal lines) and the horizontal base bands (FIG. 18, horizontal base bands separated by dashed horizontal lines).

Clearly, base band parallelogram $P_{\lambda,t}$ with base λ and with replication vector t as parallelogram sides is mapped by the linear transformation (Eq. 8) into the moiré parallelogram $P_{\lambda,t}'$ having the same base λ and parallelogram sides given by moiré band replication vector $p_m$. Note that successive vertically adjacent replica of moiré parallelogram $P_{\lambda,t}'$ are mapped by the linear transformation into identical replica of the base band parallelogram $P_{\lambda,t}$. Therefore, within the moiré image, each infinite line of orientation $p_m$, called d-line is only composed of replica of a single line segment $d_b$ parallel to t within the base band. This is true, independently of the value of the revealing grating period $T_r$.

Figure 18:
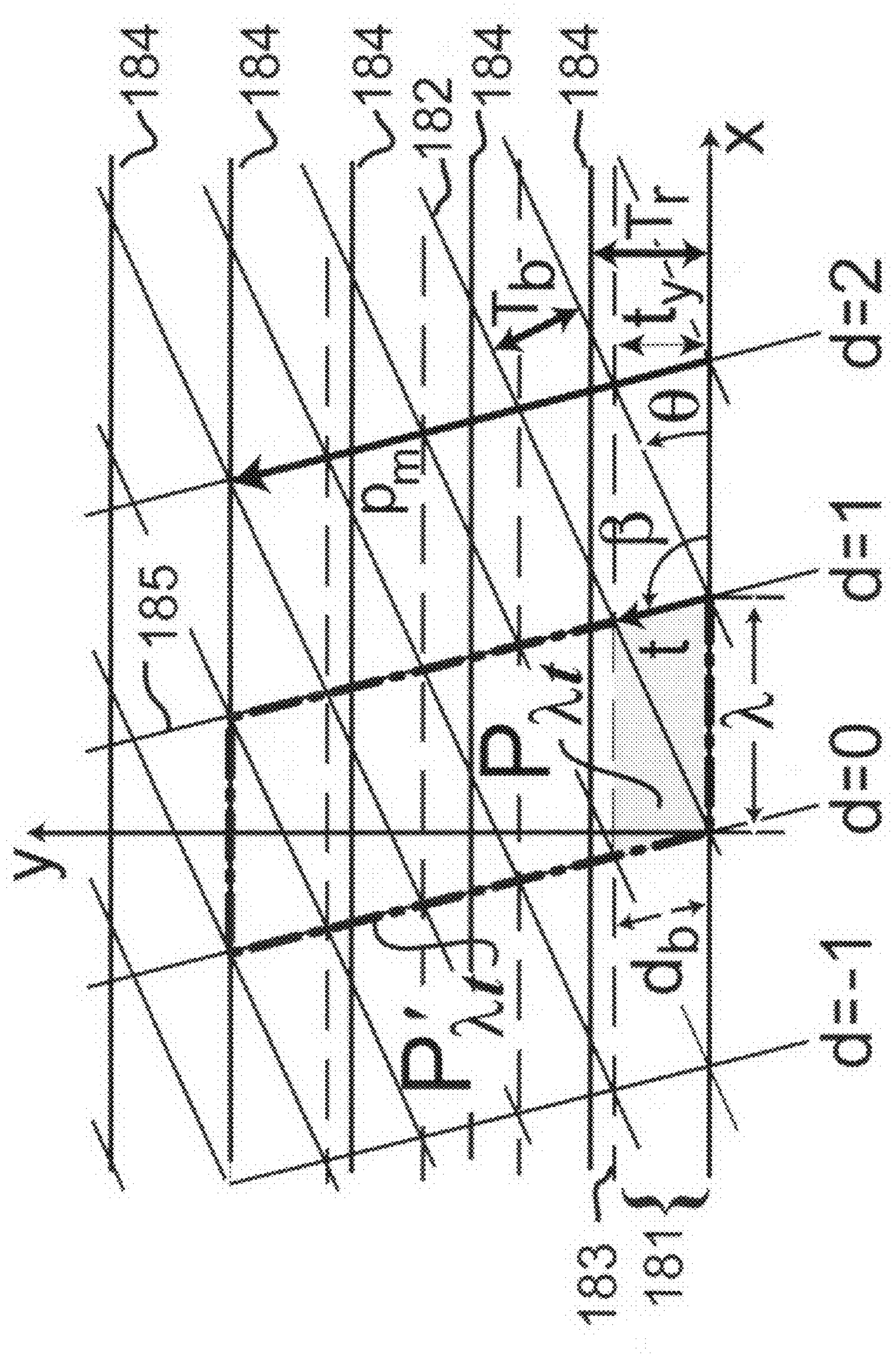
FIG. 18 shows a base band parallelogram $P_{\lambda,t}$ of orientation t linearly transformed into a moiré parallelogram $P_{\lambda,t}'$ of the same orientation.

With a given horizontal base band (e.g. FIG. 18, 181) of width $t_y$ and a base band replication vector t forming an angle β with the horizontal, we can generate an infinite number of oblique base band layouts by rotating oblique base band borders (e.g. oblique base band border 182) around their intersection points with horizontal base band border 183. The smaller the difference between angles θ and β, the smaller the base segment λ (FIG. 18). Oblique base bands oriented according to vector t, i.e. with an angle θ=β, become infinitely thin. At this orientation, an infinite number of oblique base band borders fall into a single d-line 185. This d-line becomes therefore the moiré line located at the intersections between oblique base band borders and revealing lines 184. This moiré line (d-line 185) remains identical when the oblique base band borders are intersected with a geometrically transformed revealing line layer. Therefore, d-lines within the moiré image space remain invariant under geometric transformation of the revealing layer. For example, when superposing the base layer of FIG. 12A with the revealing layer of FIG. 12B and applying to the revealing layer a rotation, a translation or any other transformation, points of the original moiré image move only along their respective d-lines.

Under geometric transformation of the base layer, straight d-lines are transformed into curved d-lines. In the moiré image space, a point located on a straight d-line will remain, after application of a geometric transformation to the revealing layer and of a (generally different) geometric transformation to the base layer, on the corresponding transformed curved d-line.

By numbering the d-lines according to d-parallelogram borders (FIG. 18), we can associate every point within the moiré image to a d-line index (real number). Since the d-line indices are the same in the original and in the transformed moiré image, we can equate them and establish an implicit equation of the form $F_d(x_t,y_t,x,y)=0$. The d-line family equations in the original and transformed spaces are respectively $$y=x\cdot\tan\beta+d\cdot\lambda\cdot\tan\theta \tag{19}$$

and $$h_2(x_t,y_t)=h_1(x_t,y_t)\cdot\tan\beta+d\cdot\lambda\cdot\tan\theta \tag{20}$$

where β is the angle of replication vector t with the horizontal and where d is the d-line index. If we extract the line index d from equation (19) and also from equation (20), by equating them, we obtain the following implicit equation $$F_d(x_t,y_t,x,y)=h_2(x_t,y_t)-h_1(x_t,y_t)\cdot\tan\beta+x\cdot\tan\beta-y=0 \tag{21}$$

We can now solve for x and y the equation system formed by $F_k(x_t,y_t,x,y)=0$ (Eq. 18) and $F_d(x_t,y_t,x,y)=0$ (Eq. 21) and obtain, by replacing respectively in equations (18) and (21)

$$\lambda=t_y\cos\theta-t_x\tan\beta=t_y/t_x \tag{22}$$

the transformation $(m_1(x_t,y_t), m_2(x_t,y_t))$ of the moiré image from transformed moiré space to original moiré space $$x=m_1(x_t,y_t)=h_1(x_t,y_t)+(h_2(x_t,y_t)-g_2(x_t,y_t))\cdot\frac{t_x}{T_r-t_y} \tag{23}$$
$$y=m_2(x_t,y_t)=h_2(x_t,y_t)\cdot\frac{T_r}{T_r-t_y}g_2(x_t,y_t)\cdot\frac{t_y}{T_r-t_y}$$

The transformation $(m_1(x_t,y_t), m_2(x_t,y_t))$ is independent of the oblique base band orientation. Relevant parameters are the revealing layer line period $T_r$ and the base band replication vector $t=(t_x, t_y)$.

Equations (23) define the transformation M: $(x_t,y_t)\rightarrow(x,y)$ of the moiré image from transformed moiré space to original moiré space as a function of the transformation of the base band grating H: $(x_t,y_t)\rightarrow(x,y)$, and of the transformation of the revealing line grating G: $(x_t,y_t)\rightarrow(x,y)$ from transformed space to the original space. In the present formulation, according to Eq. (23), $M(x_t,y_t)=(m_1(x_t,y_t, m_2(x_t,y_t))$, $H(x_t,y_t)=(h_1(x_t,y_t, h_2(x_t,y_t))$, and $G(x_t,y_t)=(x, g_2(x_t,y_t)$, where x takes all real values. However, different formula equivalent to equation (23) may be associated to the transformations M, H, and G.

Equations (23) show that when the transformations of base layer and revealing layer are identical i.e. $(h_2(x_t,y_t)=g_2(x_t,y_t)$, the moiré transformation is identical to the transformation of the base layer, i.e. $m_1(x_t,y_t)=h_1(x_t,y_t)$ and $m_2(x_t,y_t)=h_2(x_t,y_t)$. This is confirmed by FIG. 16A, which shows that the moiré obtained from the superposition of the circularly transformed base and revealing layers (respectively FIGS. 15B and 16B) is also circular, i.e. the original moiré text laid out along horizontal lines becomes, due to the resulting circular moiré transformation expressed by $m_1(x_t,y_t)$ and $m_2(x_t,y_t)$, laid out in a circular manner.

Having obtained the full expression for the induced moiré transformation when transforming base and revealing layers, we can select a given moiré transformation i.e. $m_1(x_t,y_t)$ and $m_2(x_t,y_t)$, select either the revealing layer transformation $g_2(x_t,y_t)$ or the base layer transformation given by $h_1(x_t,y_t)$, $h_2(x_t,y_t)$ and derive, by solving equation system (23) the other layer transformation. The easiest way to proceed is to freely define the moiré transformation $m_1(x_t,y_t)$ and $m_2(x_t,y_t)$ and the revealing layer transformation $g_2(x_t,y_t)$, and then deduce the base layer transformation given by $h_1(x_t,y_t)$ and $h_2(x_t,y_t)$.

$$h_1(x_t,y_t)=(g_2(x_t,y_t)-m_2(x_t,y_t))\cdot\frac{t_x}{T_r}+m_1(x_t,y_t) \tag{24}$$
$$h_2(x_t,y_t)=g_2(x_t,y_t)\cdot\frac{t_y}{T_r}+m_2(x_t,y_t)\cdot\frac{T_r-t_y}{T_r}$$

Equations (24) express the transformation H of the base band grating layer from transformed space to original space as a function of the transformations M and G transforming respectively the band moiré image and the revealing line grating from transformed space to original space.

The transformations M, G and H, embodied by the set of equations (23) or equivalently, by the set of equations (24), form a band moiré image layout model completely describing the relations between the layout of the base band grating layer, the layout of the revealing line grating layer and the layout of the resulting band moiré image layer. The layout of two of the layers may be freely specified and the layout of the third layer may then be computed thanks to this band moiré image layout model.

In some of the examples given in the next section, we freely choose a revealing layer transformation $g_2(x_t,y_t)$, and require as band moiré image transformation the identity transformation, i.e. $m_1(x_t,y_t)=x_t$ and $m_2(x_t,y_t)=y_t$. This allows us to generate the same band moiré image before and after the layer transformations. We obtain periodic band moiré images, despite the fact that both the base layer and the revealing layer are curved, i.e. non-periodic. We then show examples, where we freely chose the revealing layer and require the band moiré image transformation to be a known geometric transformation, for example a transformation yielding circularly laid out band moiré patterns.

Moiré Design Variants with Curvilinear Base and Revealing Layers

Let us now apply the knowledge disclosed in the previous section and create various examples of rectilinear and curvilinear moirés images with at least one the base or revealing layers being curvilinear.

Example A

Rectilinear Moiré Image and a Cosinusoidal Revealing Layer

Figure 19A:
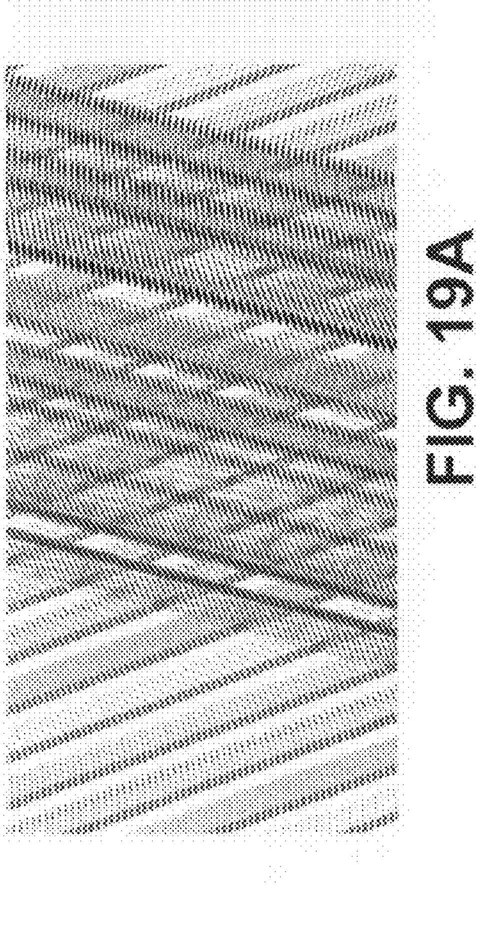
FIGS. 19A and 19B shows respectively the geometrically transformed base and revealing layers of respectively FIGS. 12A and 12B with a revealing layer transformation producing cosinusoidal revealing lines.
Figure 19B:
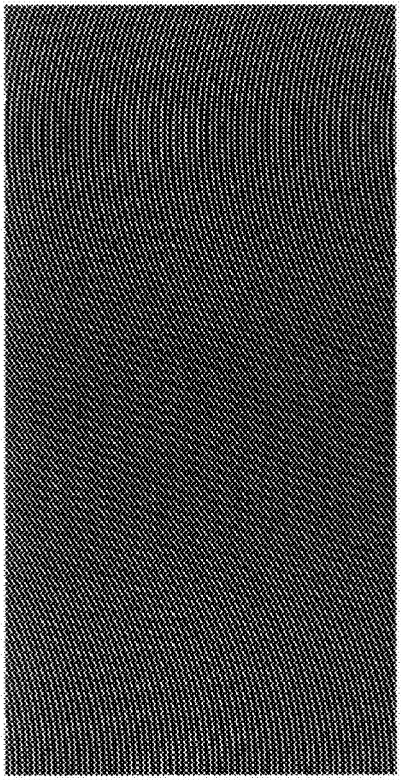
Figure 19C:
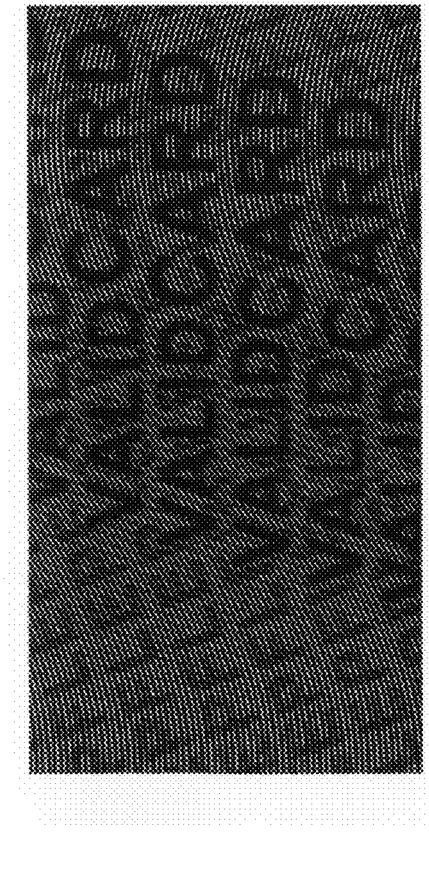
FIGS. 19C and 19D show the rectilinear moire images induced by the superposition of the transformed layers shown in FIGS. 19A and 19B for two different relative vertical positions.

In order to generate a rectilinear moiré image with a cosinusoidal revealing layer, we transform the original base and revealing layer shown in FIGS. 12A and 12B. We want the superposition of the transformed base and revealing layer to yield the same rectilinear moiré image (FIG. 19C) as the moiré image formed by the original rectilinear layers (FIG. 12C), i.e. $m_1(x_t,y_t)=x_t$ and $m_2(x_t,y_t)=y_t$. We define the revealing layer transformation $$g_2(x_t,y_t)=y_t+c_1\cos(2\pi(x_t+c_3)/c_2) \tag{25}$$

with $c_1$, $c_2$ and $c_3$ representing constants and deduce from equations (21) the geometric transformation to be applied to the base layer, i.e.

$$h_1(x_t,y_t)=x_t+c_1\cos(2\pi(x_t+c_3)/c_2)(t_x/T_r)$$

$$h_2(x_t,y_t)=y_t+c_1\cos(2\pi(x_t+c_3)/c_2)(t_yT_r) \tag{26}$$

Figure 19D:
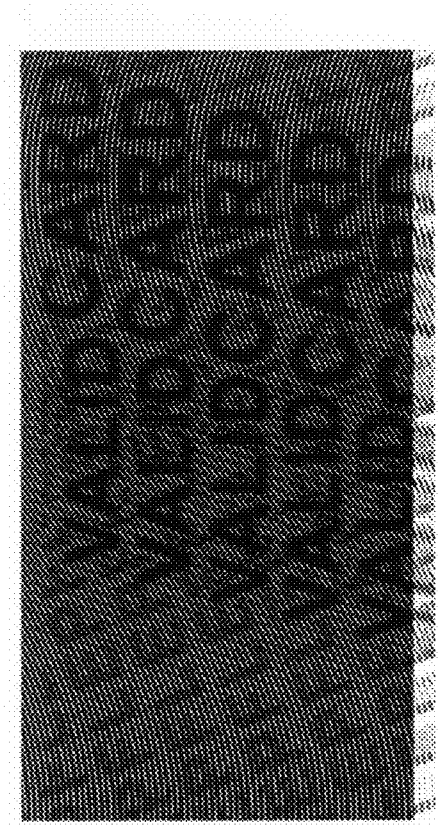

We can move the revealing layer (FIG. 19B) up and down on top of the base layer (FIG. 19A), and the moiré image shapes (FIG. 19C) will simply be translated (FIG. 19D) without incurring deformations. We can verify that such a vertical translation does not, up to a translation, modify the resulting moiré image (presently an identity) by inserting into equations (23) the transformations $g_2$ (Eq. 25) and $h_1$, $h_2$ (Eqs. 26) and by replacing in $g_2(x_t,y_t)$ coordinate $y_t$ by its translated version $y_t+\Delta y_t$. We obtain $$m_1(x_t,y_t)=x_t-t_x\Delta y_t/(T_r-t_y) \text{ and}$$

$$m_2(x_t,y_t)=y_t-t_y\Delta y_t/(T_r-t_y), \tag{27}$$

i.e. the original moiré image is simply translated according to vector $t=(t_x,t_y)$, scaled by the relative vertical displacement $\Delta y_t/(T_r-t_y)$.

Example B

Rectilinear Moiré Image and a Circular Revealing Layer

Figure 20A:
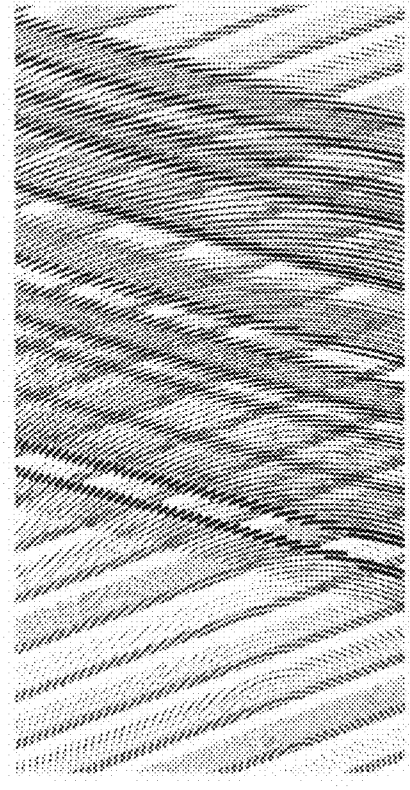
FIGS. 20A and 20B show respectively the geometrically transformed base and revealing layers of respectively FIGS. 12A and 12B with a revealing layer transformation producing a circular revealing layer.
Figure 20B:
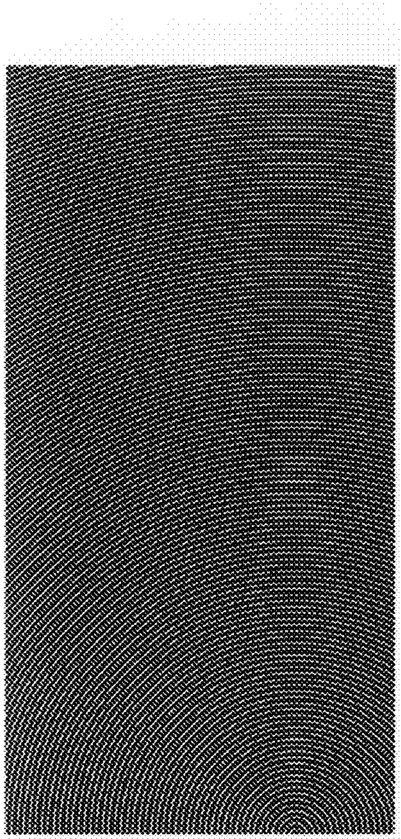

We introduce a revealing layer transformation yielding a perfectly circular revealing line grating (FIG. 20B)

$$g_2(x_t,y_t)=c_1\sqrt{(x_t-c_x)^2+(y_t-c_y)^2} \tag{28}$$

where $c_x$ and $c_y$ are constants giving the center of the circular grating and $c_1$ is a scaling constant. In order to obtain a rectilinear moiré image, we define the base layer transformations according to Eq. 24

$$h_1(x_t,y_t)=x_t+\left(c_1\sqrt{(x_t-c_x)^2+(y_t-c_y)^2}-y_t\right)\cdot\frac{t_x}{T_r} \tag{29}$$

$$h_2(x_t,y_t)=c_1\sqrt{(x_t-c_x)^2+(y_t-c_y)^2}\cdot\frac{t_y}{T_r}+y_t\cdot\frac{T_r-t_y}{T_r}$$

Figure 20C:
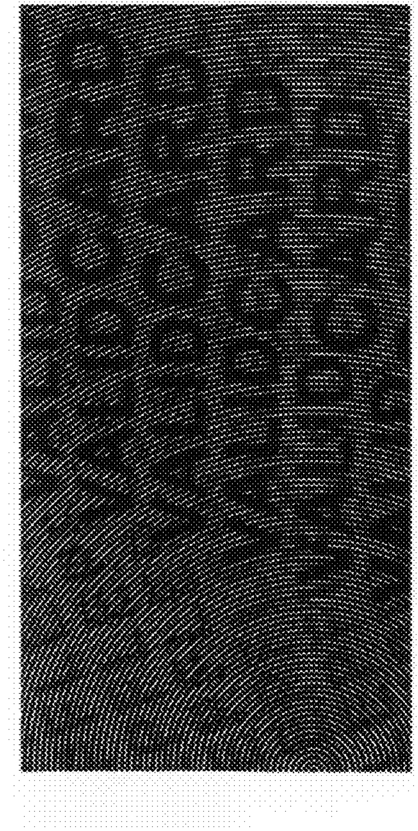
FIG. 20C shows the band moire image induced by the exact superposition of the transformed layers shown in FIGS. 20A and 20B.
Figure 20D:
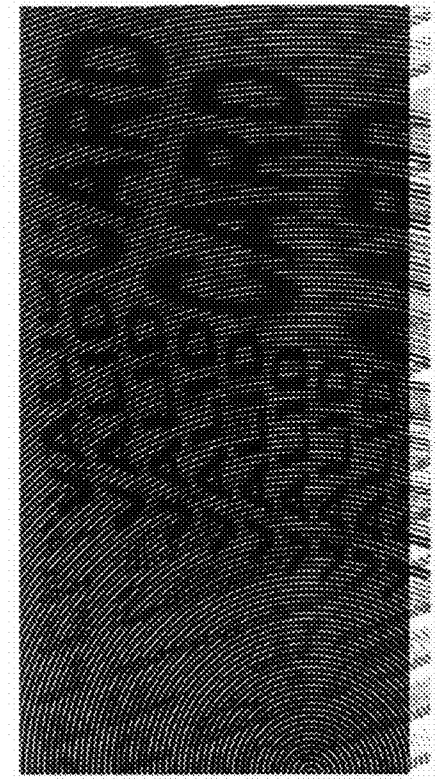
FIG. 20D shows the deformed moire image induced by the superposition, when slightly translating the revealing layer (FIG. 20B) on top of the base layer (FIG. 20A)

The resulting base layer is shown in FIG. 20A. FIG. 20C, shows that the superposition of a strongly curved base band grating and of a perfectly circular revealing line grating yields the original rectilinear moiré image. However, as shown in FIG. 20D, a small displacement of the revealing layer, or equivalently a small relative displacement of the position sampled by the revealing layer on the base layer yields a clearly visible deformation (i.e. distortion) of the resulting band moiré image. Note that by varying parameters $c_1$, $c_x$ and $c_y$ one may create a large number of variants of the same transformation. Furthermore, by replacing in the preceding equations (28) and (29) beneath the square root $x_t-c_x$ with $(x_t-c_x)/a$ and $y_t-c_y$ by $(y_t-c_y)/b$, where a and b are freely chosen constants, one may extend this example to concentric elliptic revealing line gratings.

Examples A and B show that rectilinear moiré images can be generated with curvilinear base and revealing layers. Let us now show examples where thanks to the band moire image layout model, we can obtain curvilinear moiré images which have the same layout as predefined reference moiré images.

Example C

Circular Band Moiré Image and Rectilinear Revealing Layer

Figure 21A:
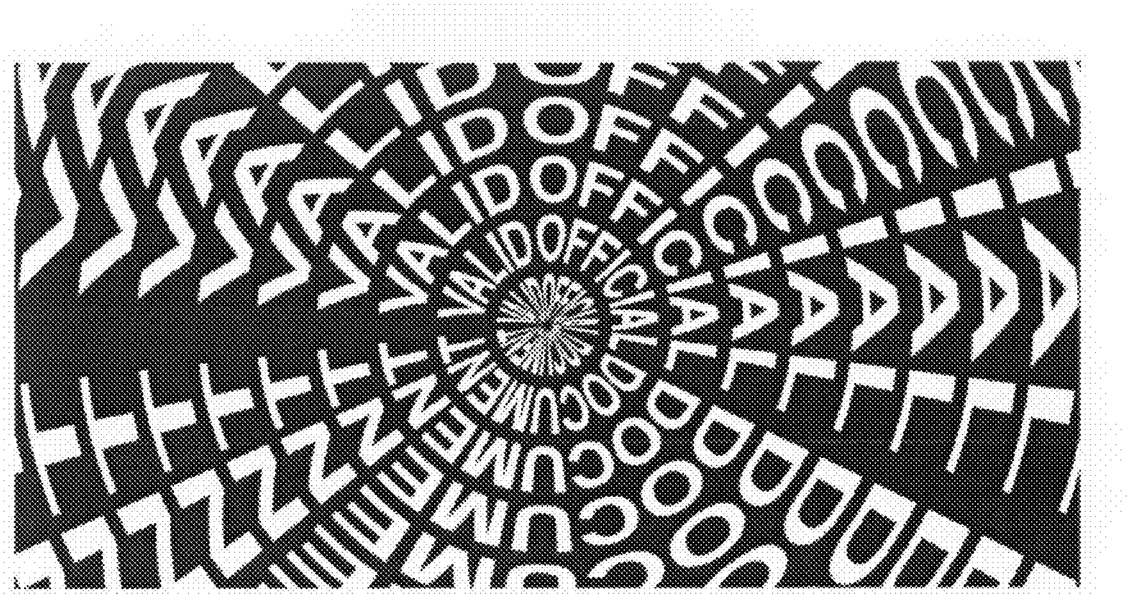
FIG. 21A shows a reference band moire image layout and FIG. 21B the corresponding band moiré image with the same layout, obtained thanks to the band moire layout model.
Figure 22A:
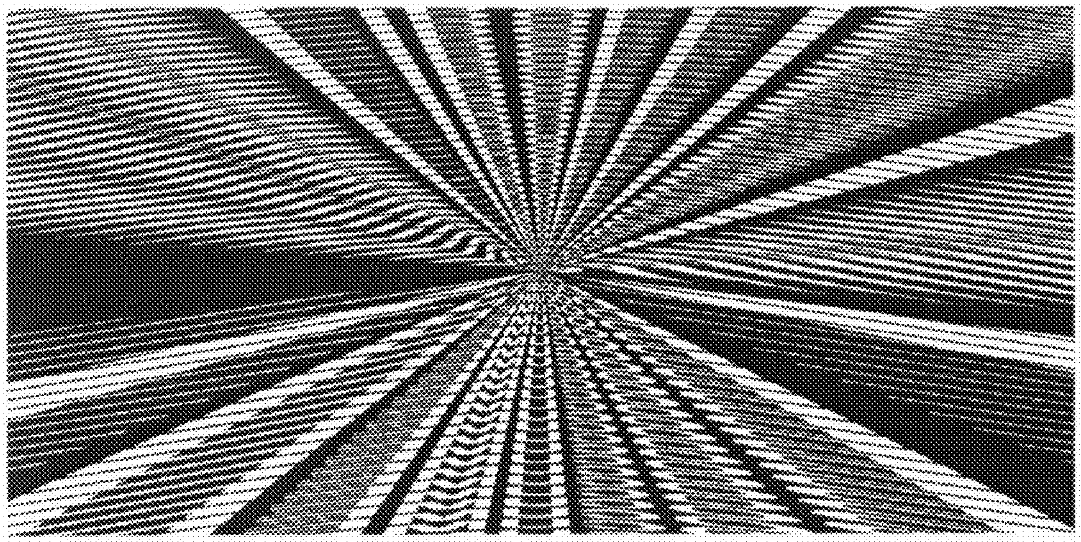
FIG. 22A shows the transformed base layer computed according to the band moire layout model and FIG. 22B the rectilinear revealing layer used to generate the moiré image shown in FIG. 21B.
Figure 22B:
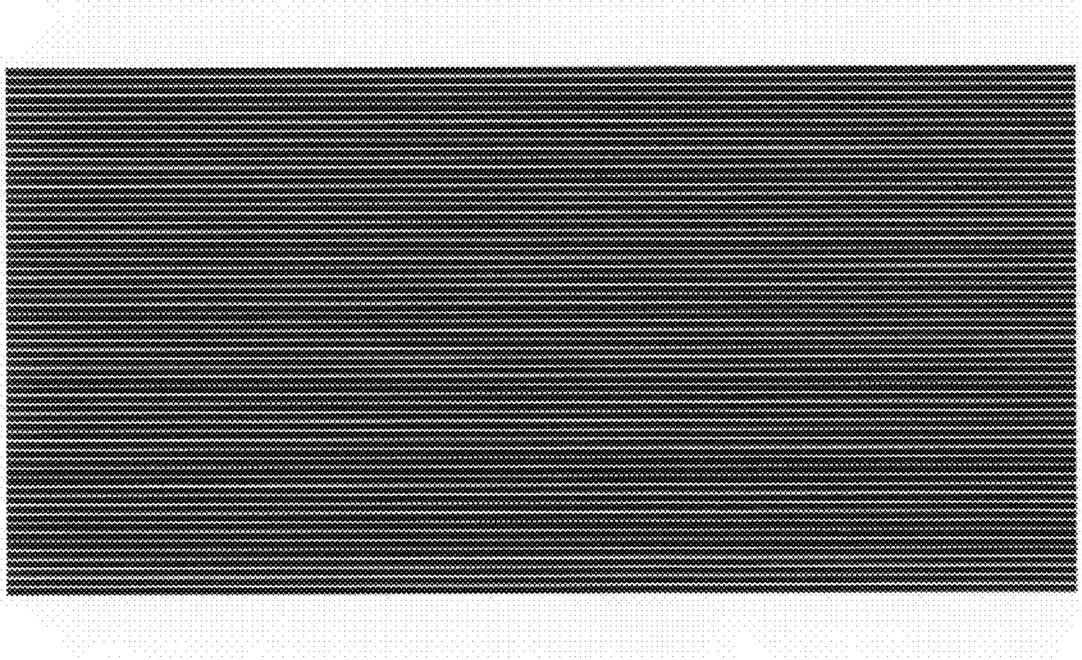

In the present example, we choose a circular moiré image and also freely choose the revealing layer layout. The desired reference circular moiré image layout is given by the transformation mapping from transformed moiré space back into the original moiré space, i.e.

$$x=m_1(x_t,y_t)=\frac{\pi-\operatorname{atan}(y_t-c_y,x_t-c_x)}{2\cdot\pi}\cdot w_x \tag{30}$$

$$y=m_2(x_t,y_t)=c_m\sqrt{(x_t-c_x)^2+(y_t-c_y)^2}$$

where constant $c_m$ expresses a scaling factor, constants $c_x$ and $c_y$ give the center of the circular moiré image layout in the transformed moiré space, $w_x$ expresses the width of the original rectilinear reference band moiré image and function atan (y,x) returns the angle $\alpha$ of a radial line of slope y/x, with the returned angle $\alpha$ in the range ($-\pi<=\alpha<=\pi$). The corresponding desired reference circular moiré image is shown in FIG. 21A. We take as revealing layer a rectilinear layout identical to the original rectilinear revealing layer, i.e. $g_2(x_t,y_t)=y_t$. This rectilinear revealing layer is shown in FIG. 22B. By inserting the curvilinear moiré image layout equations (30) and the curvilinear revealing layer layout equation $g_2(x_t,y_t)=y_t$ into the band moire layout model equations (24), one obtains the deduced curvilinear base layer layout equations $$h_1(x_t, y_t) = \left(y_t - c_m\sqrt{(x_t-c_x)^2+(y_t-c_y)^2}\right)\cdot\frac{t_x}{T_r} + \frac{\pi - a\tan(y_t-c_y, x_t-c_x)}{2\cdot\pi}\cdot w_x \quad (31)$$

$$h_2(x_t, y_t) = c_m\sqrt{(x_t-c_x)^2+(y_t-c_y)^2}\cdot\frac{T_r-t_y}{T_r} + y_t\cdot\frac{t_y}{T_r}$$

Figure 21B:
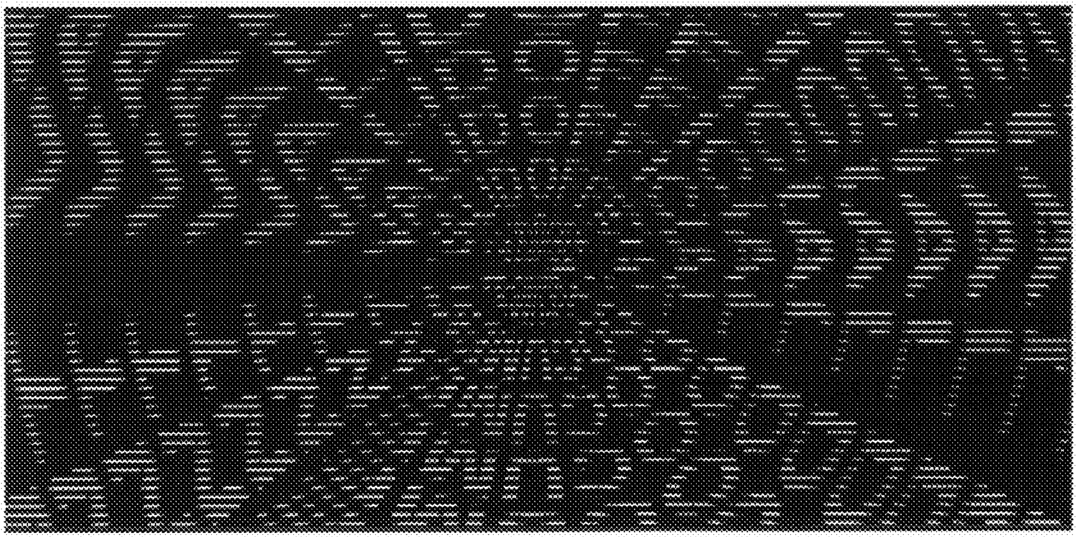

These curvilinear base layer layout equations express the geometric transformation from transformed base layer space to the original base layer space. The corresponding curvilinear base layer in the transformed space is shown in FIG. 22A. The resulting moiré image formed by the superposition of the base layer (FIG. 22A) and of the revealing layer (FIG. 22B) is shown in FIG. 21B. When the revealing layer (FIG. 22B) is moved over the base layer (FIG. 22A), the corresponding circular moiré image patterns move radially and change their shape correspondingly. In the present example, the text letter width becomes larger or smaller, depending if the letters move respectively towards the exterior or the interior of the circular moiré image. In a similar manner as in example B, the present example may be easily generalized to elliptic band moiré images.

Example D

Curvilinear Moire Image and Cosinusoidal Revealing Layer

Figure 23A:
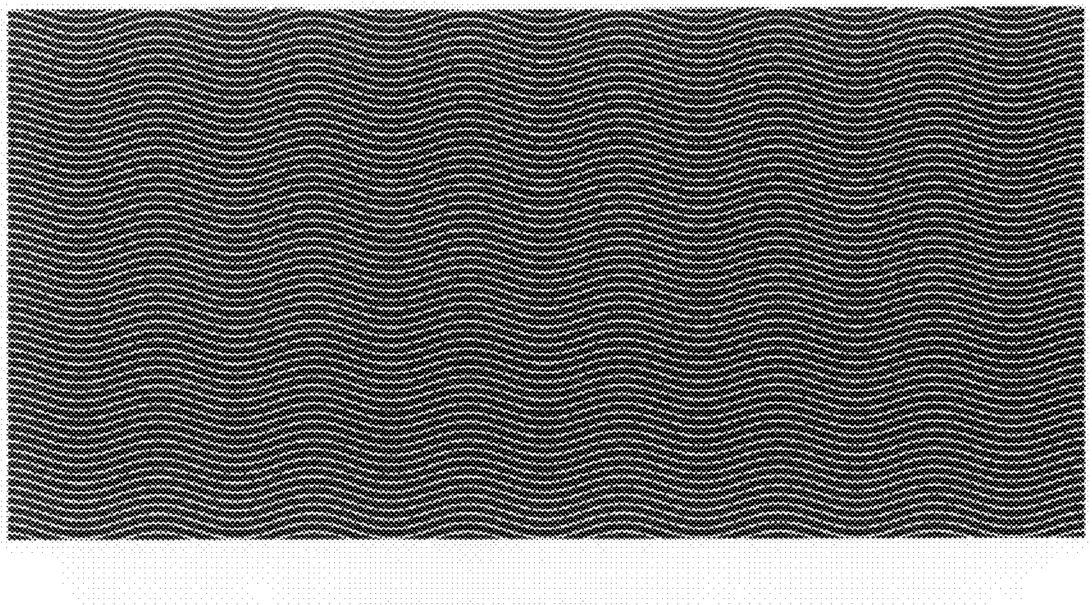
FIG. 23A shows a cosinusoidal revealing layer and FIG. 23B a base layer transformed according to the band moire layout model.

Let us now take a curvilinear revealing layer and still generate the same desired curvilinear moiré image as in the previous example (reference band moiré image shown in FIG. 21A). As example, we take as curvilinear revealing layer a cosinusoidal layer whose layout is obtained from the rectilinear revealing layer by a cosinusoidal transformation $$g_2(x_t, y_t) = y_t + c_1\cos(2\pi x_t/c_2) \quad (32)$$

where constants $c_1$ and $c_2$ give respectively the amplitude and period of the cosinusoidal transformation. The corresponding cosinusoidal revealing layer is shown in FIG. 23A. By inserting the curvilinear moiré image layout equations (30) and the curvilinear revealing layer layout equation (32) into the band moire layout model equations (24), one obtains the deduced curvilinear base layer layout equations $$h_1(x_t, y_t) = \left(y_t - c_1\cos\left(\frac{2\pi x_t}{c_2}\right) - c_m\sqrt{(x_t-c_x)^2+(y_t-c_y)^2}\right)\cdot\frac{t_x}{T_r} + \frac{\pi - a\tan(y_t-c_y, x_t-c_x)}{2\cdot\pi}\cdot w_x \quad (33)$$

$$h_2(x_t, y_t) = c_m\sqrt{(x_t-c_x)^2+(y_t-c_y)^2}\cdot\frac{T_r-t_y}{T_r} + \left(y_t + c_1\cos\left(\frac{2\pi x_t}{c_2}\right)\right)\cdot\frac{t_y}{T_r}$$

Figure 23B:
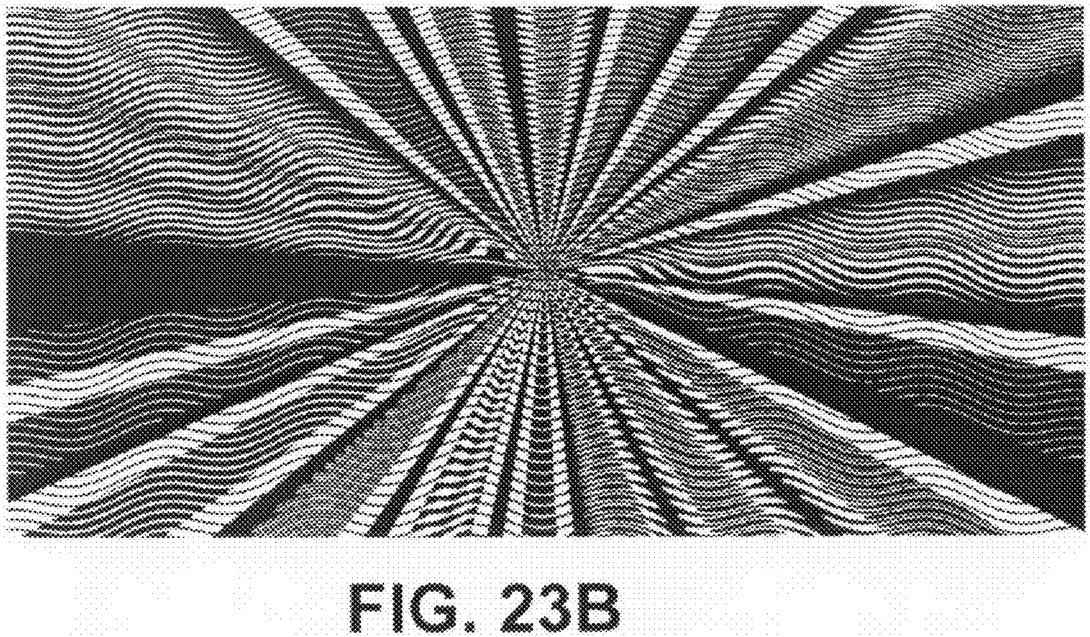
Figure 24:
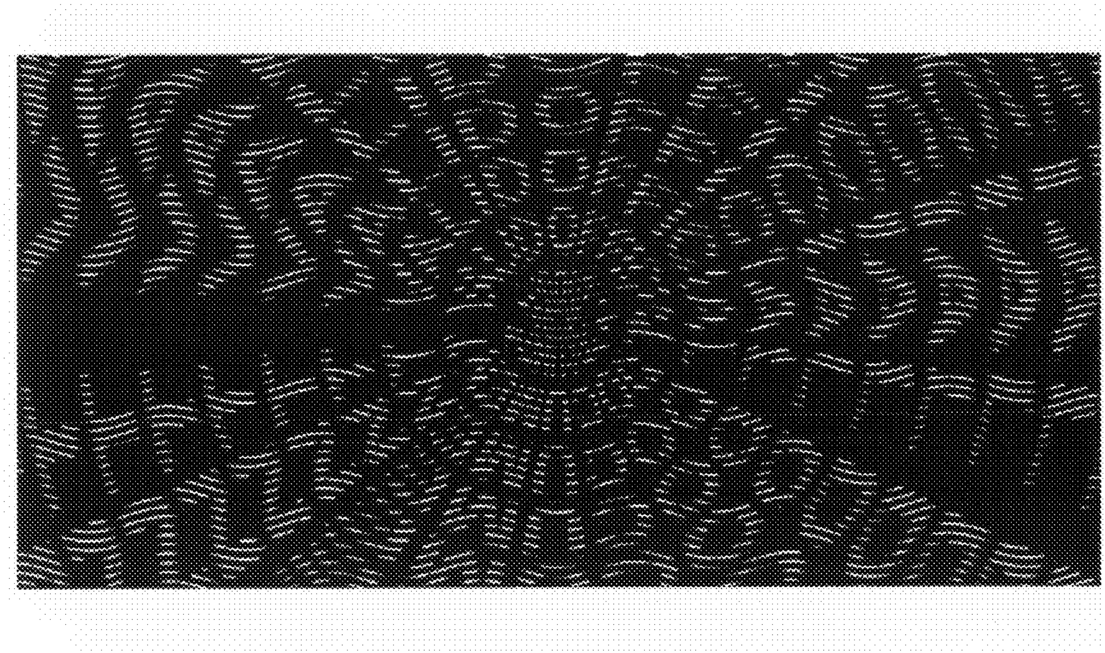
FIG. 24 shows the resulting band moiré image which has the same layout as the desired reference moiré image shown in FIG. 21A.

These curvilinear base layer layout equations express the geometric transformation from the transformed base layer space to the original base layer space. The corresponding curvilinear base layer is shown in FIG. 23B. The superposition of the curvilinear base layer (FIG. 23B) and curvilinear revealing layer (FIG. 23A) is shown in FIG. 24. When the revealing layer (FIG. 23A) is moved vertically over the base layer (FIG. 23B), the corresponding circular moiré image patterns move radially and change their shape correspondingly, as in example C. However, when the revealing layer (FIG. 23A) is moved horizontally over the base layer (FIG. 23B), the circular moiré patterns become strongly deformed. After a horizontal displacement equal to the period $c_2$ of the cosinusoidal revealing layer transformation, the circular moiré patterns have again the same layout and appearance as in the initial base and revealing layer superposition, i.e the deformation fades away as the revealing layer reaches a horizontal position close to an integer multiple of period $c_2$. This yields a moiré image which deforms itself periodically upon horizontal displacement of the revealing layer on top of the base layer. Note that the dynamicity of the band moiré image patterns relies on the types of geometric transformations applied to generate the base and revealing layer in the transformed space and not, as in U.S. patent application Ser. No. 10/270,546 (Hersch, Chosson) on variations of the shapes embedded within the base band layer. The present example may also easily be generalized to elliptic band moiré images.

Example E

Figure 25:
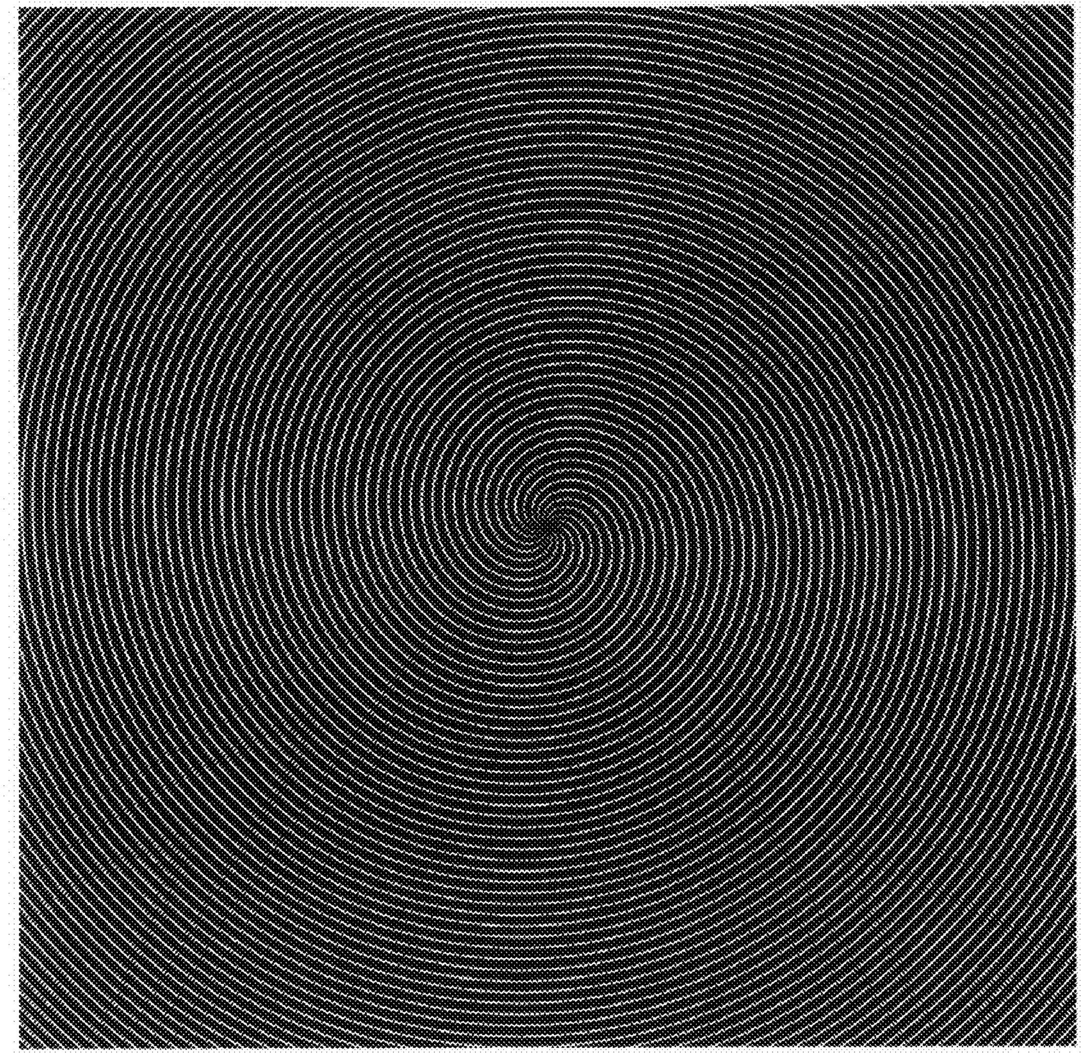
FIG. 25 shows a spiral shaped revealing layer.

Circularly Transformed Moiré Image Generated with a Spiral Shaped Revealing Layer Let us show a further example relying on the band moire layout model in order to obtain a circularly transformed moiré image. We choose as revealing layer layout a spiral shaped revealing layer. The desired reference circular moiré image layout is given by the geometric transformation described by Eqs. (30) which transform from transformed moiré space back into the original moiré space. The spiral shaped revealing line grating layout (FIG. 25) comprising multiple spirals is expressed by the following transformation mapping from transformed space to original space $$y = g_2(x_t, y_t) = c_m\sqrt{(x_t-c_x)^2+(y_t-c_y)^2} + \frac{\pi + a\tan(y_t-c_y, x_t-c_x)}{2\cdot\pi}T_r\cdot n_s \quad (34)$$

where $c_x$ and $c_y$ are constants giving the center of the spiral line grating, $c_m$ is the scaling factor (same as in Eq. 30), $T_r$ is the revealing line grating period in the original space and $n_s$ is the number of spirals leaving the center of the spiral line grating. By inserting the curvilinear moiré image layout equations (30) and the spiral shaped revealing layer layout equation (34) into the band moire layout model equations (24), one obtains the deduced the curvilinear base layer layout equations $$h_1(x_t, y_t) = \frac{\pi + a\tan(y_t-c_y, x_t-c_x)}{2\cdot\pi}\cdot(w_x + t_x\cdot n_s) \quad (35)$$

$$h_2(x_t, y_t) = c_m\sqrt{(x_t-c_x)^2+(y_t-c_y)^2} + \frac{\pi + a\tan(y_t-c_y, x_t-c_x)}{2\cdot\pi}\cdot t_y\cdot n_s.$$

Figure 26:
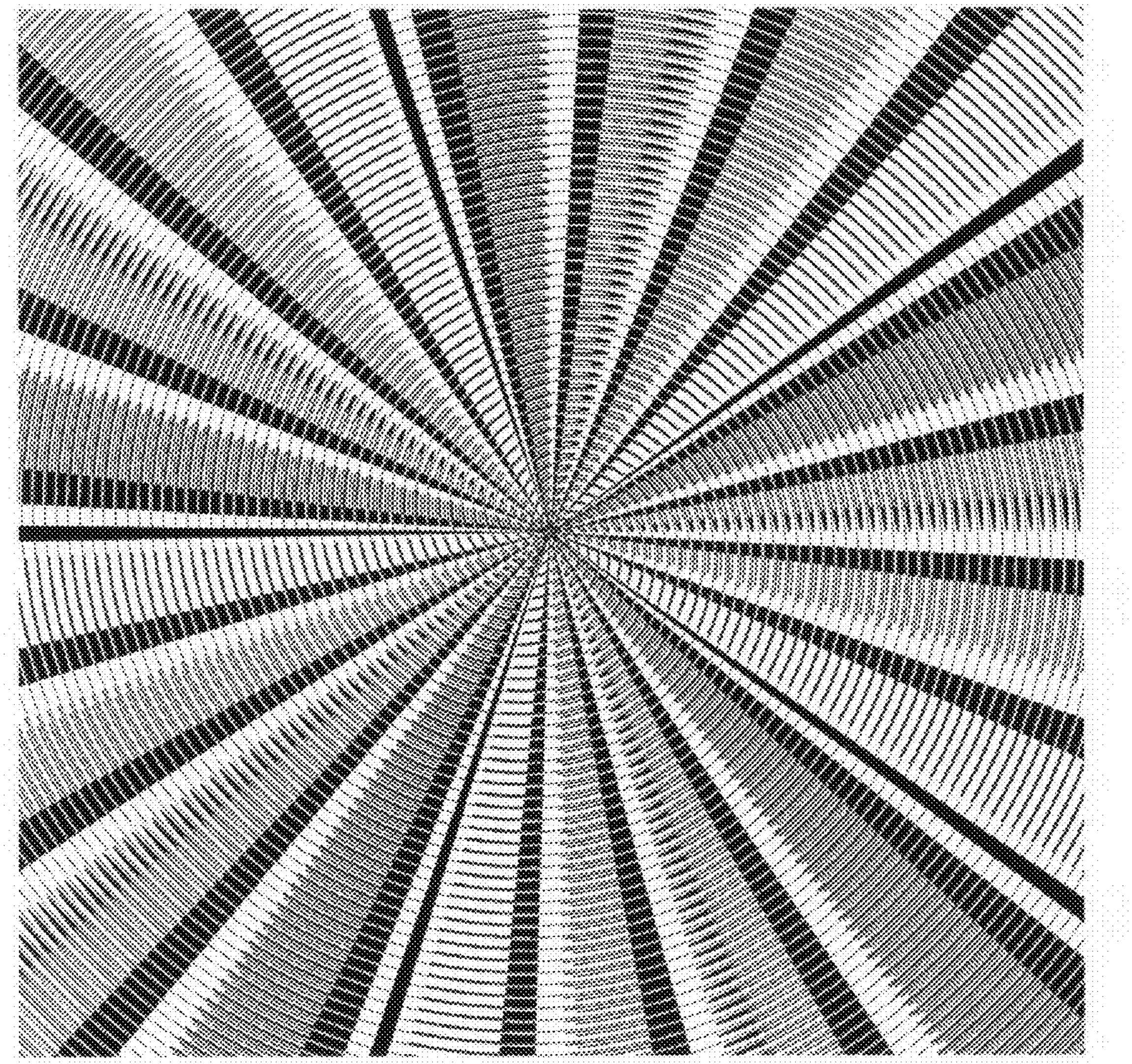
FIG. 26 shows the curvilinear base layer computed so as to form, when superposed with the spiral shaped revealing layer of FIG. 25 a circular band moiré image.
Figure 27:
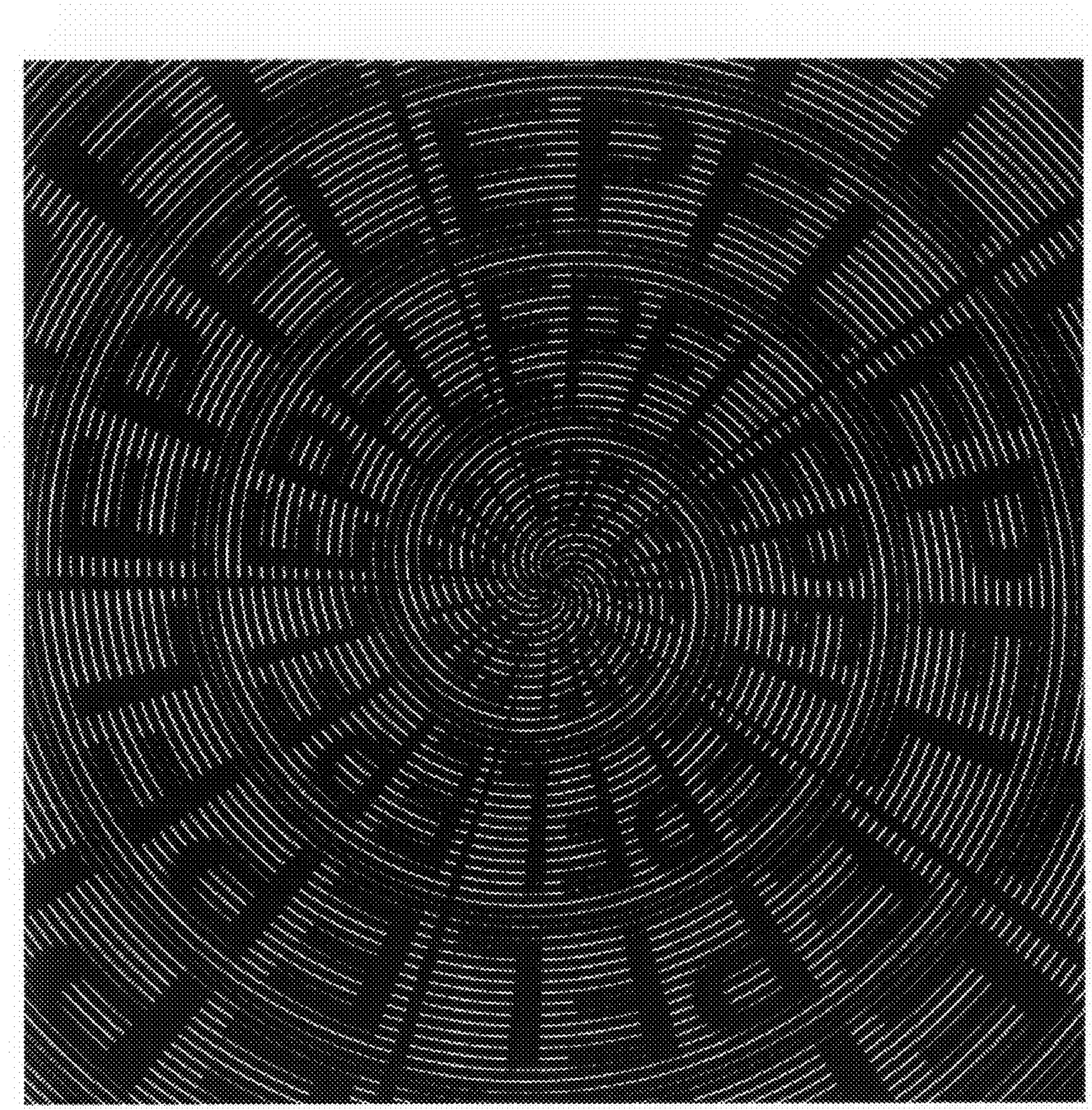
FIG. 27 shows the circular band moiré image obtained when superposing the revealing layer of FIG. 25 and the base layer of FIG. 26.

These curvilinear base layer layout equations express the geometric transformation from the transformed base layer space to the original base layer space. They completely define the layout of the base band grating layer (FIG. 26) which, when superposed with the revealing layer (FIG. 25) whose layout is defined by Eq. (34) yield a circular band moiré image (FIG. 27), with a layout defined by Eq. (27). FIG. 27 shows the curvilinear moiré image obtained when superposing exactly the origin the coordinate system of the revealing layer on the origin of the coordinate system of the base layer. When rotating the revealing layer on top of the base layer around its center point given by coordinates $(c_x,c_y)$ a dynamic band moiré image is created with band moiré image patterns moving toward the exterior or the interior of the circular band moiré image, depending if respectively a positive or a negative rotation is applied.

For the sake of simplicity, we considered in the preceding examples mainly transformations yielding circular revealing, base or moiré image layers. As described in some of the examples, by inserting into the formula instead of the radius of a circle $$\sqrt{(x_t-c_x)^2+(y_t-c_y)^2}$$

the corresponding distance from the center to a point $(x_t,y_t)$ of an ellipse $$\sqrt{\left(\frac{x_t-c_x}{a}\right)^2+\left(\frac{y_t-c_y}{b}\right)^2}$$

where a and b are freely chosen constants, the considered concentric circular layers may be extended to form concentric elliptic layers. We therefore call "concentric layouts" both the circular and the elliptic layouts.

Example F

Circularly Transformed Moiré Image Moving Circularly

Figure 38:
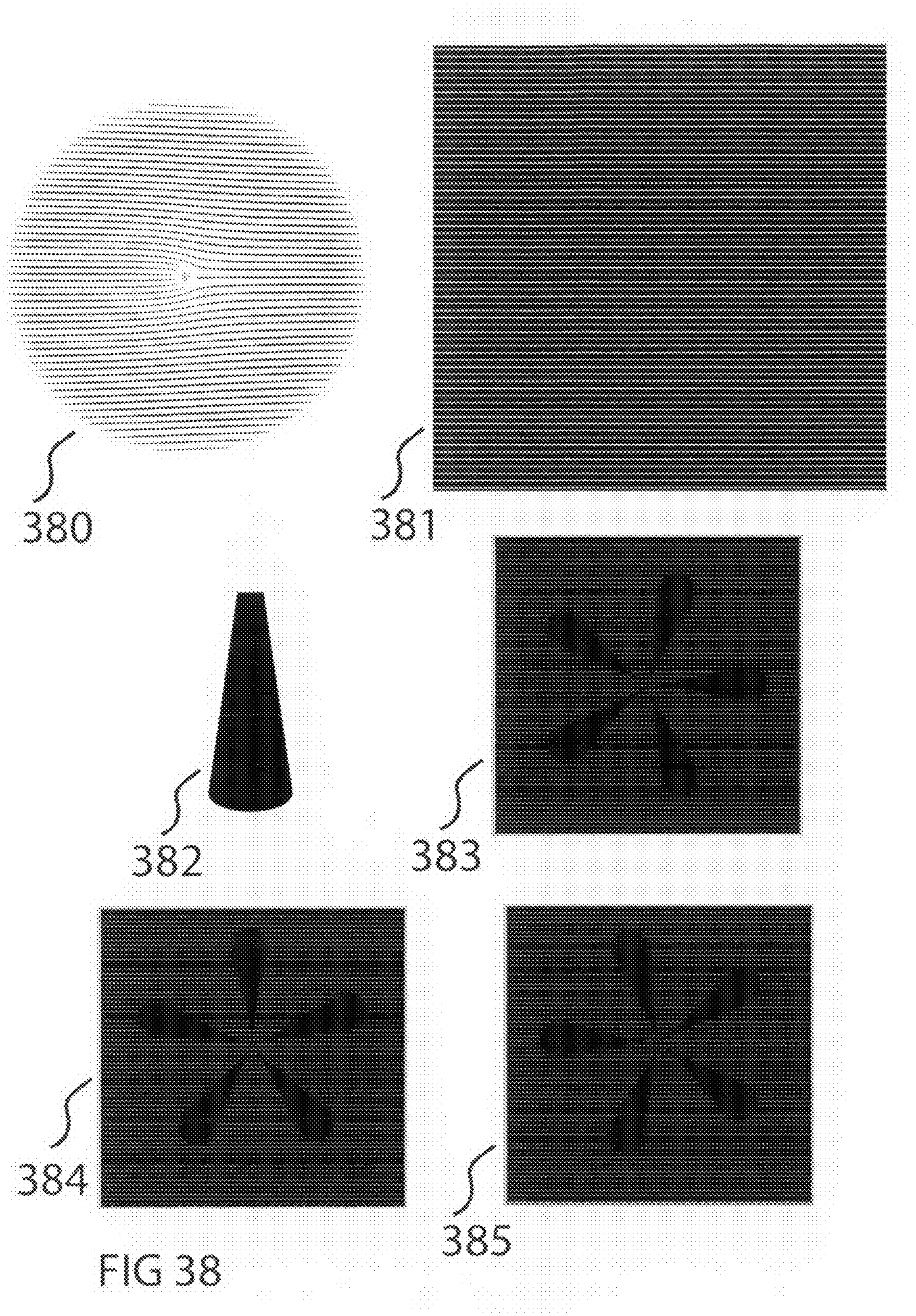
FIG. 38 illustrates a base layer 380 and a revealing layer 381, which, when displacing the position sampled by the revealing layer on the base layer yields flower petals (382) moving circularly across positions 383, 384 and 385, i.e. tangentially to the circular flower petal layout.

One may generate a moire image having for example the same circular layout as in Examples C and D, but which, instead of moving radially when displacing the revealing layer on top of the base layer, moves circularly, i.e. along the tangent of the circular moiré layout. When displacing the revealing layer (e.g. FIG. 38, 381) on top of the base layer (e.g. FIG. 38, 380), e.g. vertically, the replicated flower petal (382) moiré image pattern moves circularly, as shown in snapshots 383, 384 and 385. In that example, the moiré image moves in counter-clockwise rotation around the center of the circular transformation. To generate the base layer, we apply respectively the same geometric transformations as in examples C (rectilinear revealing layer) and D (cosinusoidal revealing layer). However, in the present case, the initial non-transformed base layer is generated so as to yield a horizontal moire displacement when displacing vertically the horizontally laid out revealing line grating layer on top of the non-transformed base layer. This is carried out with a horizontal base band replication vector $t=(\lambda,0)$, see section "The geometry of rectlinear Band Moiré Images". A horizontal moiré displacement in the original non transformed space corresponds in the present example to a circular displacement, i.e. a rotation, in the circularly transformed moiré space. Similar considerations apply for the generation of elliptic moiré layouts, i.e. for moirés displacing themselves along elliptic trajectories, i.e. tangential to the elliptic moiré layout. By choosing slightly oblique displacement vectors $t=(\lambda, t_y)$, with $t_y>0$, in the non-transformed base layer space, one may generate moiré patterns moving along spiral trajectories, i.e. trajectories which are in between a radial trajectory and a trajectory which is tangential to the geometrically transformed moiré layout (e.g. tangential to a circle for a circular layout, tangential to an ellipse for an elliptic layout, etc. . . . ).

The previous examples shows that thanks to the band moire layout model, we are able to compute the exact layout of curvilinear base and revealing layers so as to generate a desired rectilinear or curvilinear moiré image of a given predefined layout. They also show that unexpected, surprising moiré displacements occur, such as radial or circular moiré displacements, when displacing the revealing layer on top of the base layer. Note that as described in the section below "Embodiments of base and revealing layers", the displacement between base and revealing layer may be an apparent displacement induced by the movement of the eyes across a composed layer whose revealing layer and base layer are separated by a small gap. The movement of the eyes across the composed layer, or equivalently, tilting the composed layer in respect to an observer, yields a relative displacement of the position sampled by the revealing layer on the base layer.

Base and Revealing Layers Partitioned into Different Portions Synthesized with Different Pairs of Base and Revealing Layers Transformations One may freely choose the curvilinear revealing layer layout and deduce from a desired rectilinear or curvilinear moiré image layout the corresponding curvilinear base layer layout or vice-versa. Let us denote the base layer and revealing layer geometric transformations producing a desired rectilinear or curvilinear moiré image layout as a "pair of matching geometric transformations" and the corresponding layer layouts in the transformed space as a "pair of matching base and revealing layer layouts".

In order to provide additional security and make counterfeiting even harder, one may partition the desired moiré image into several portions and render each portion with a specific pair of matching geometric transformations. Corresponding portions of both the base layer and the revealing layer will be rendered with different pairs of geometric transformations.

Figure 28A:
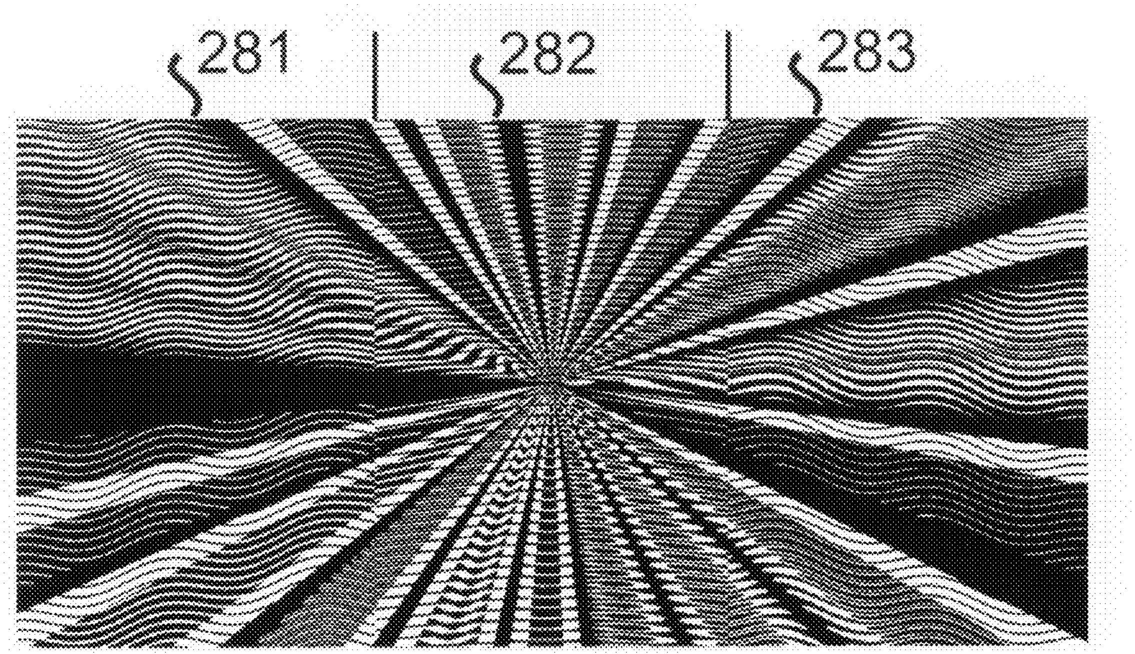
FIGS. 28A and 28B show respectively a base and a revealing layer partitioned into different portions created according to different pairs of matching geometric transformations, laid out into distinct areas.
Figure 28B:
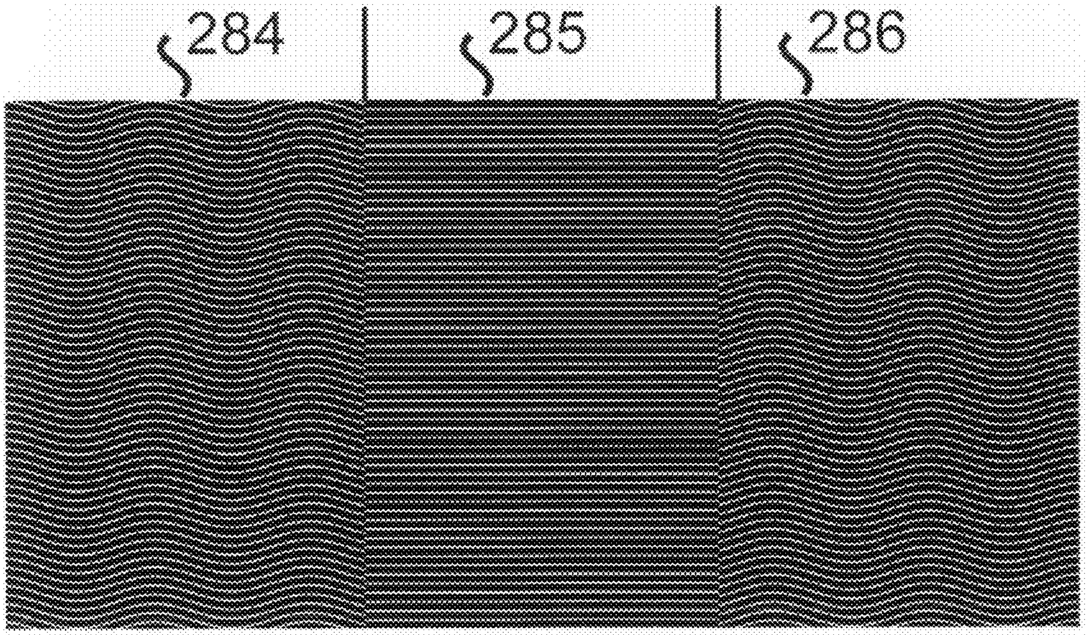
Figure 29:
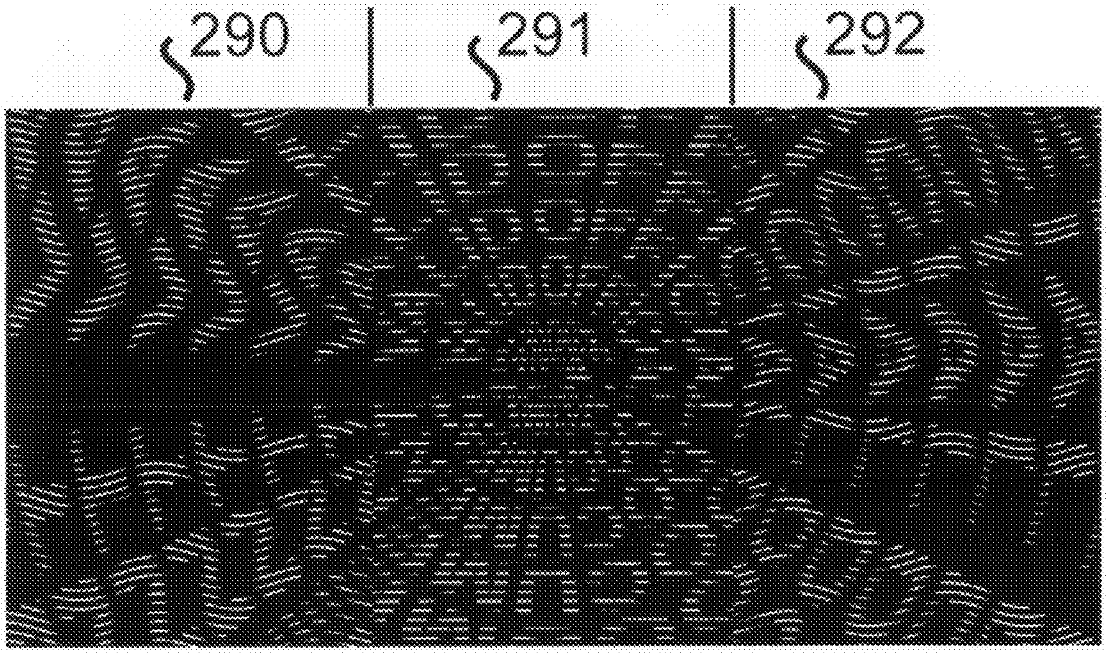
FIG. 29 shows the band moiré image obtained by superposing the base layer shown in FIG. 28A and the revealing layer shown in FIG. 28B, which, despite being composed of several distinct moiré portions, has the same layout as the desired reference moiré image shown in FIG. 21A.

For example, we can generate the desired reference circular band moiré image shown in FIG. 21A by specifying two different moiré image portions, each one generated with a different pair of matching geometric transformations. Examples in FIGS. 28A and 28B show respectively the base layer and the revealing layer with different portions created according to different pairs of matching geometric transformations. The image portions at the left and right extremity of the image (base layer 281 and 283, revealing layer 284 and 286) are generated with the matching transformations described in Example D (cosinusoidal revealing layer). The image portion at the center of the image (base layer 282, revealing layer 285) is generated with the matching transformation described in Example C (rectilinear revealing layer). FIG. 29 shows the curvilinear moiré image obtained by superposing the base layer of FIG. 28A and the revealing layer of FIG. 28B. One may verify that thanks to the band moire layout model, despite the partition of the base layer and revealing layer into different portions laid out differently, according to different pairs of matching geometric transformations, the band moiré image induced by the superposition of the partitioned base and revealing layers has the same layout as the desired reference band moiré image.

Perspectives Offered by the Band Moiré Layout Model

The relationships between geometric transformations applied to the base and revealing layers and the resulting geometric transformation of the band moiré image (see Eqs.

(23) and (24)), represent a model for describing the layout of the band moiré image as a function of the layouts of the base band grating and of the revealing line grating. By applying this model one may compute the base and/or the revealing layer layouts, i.e. the geometric transformations to be applied to the original rectilinear base and/or revealing layers in order to obtain a reference moiré image layout, i.e. a moiré image layout according to a known geometric transformation applied to the original rectilinear band moiré image.

The examples presented in the previous sections represent only a few of the many possible transformations that may be applied to the moire layer, to the base layer and/or to the revealing layer. Many other transformations can be applied, for example transformations which may produce zone plate gratings [Oster 64], hyperbolic sine gratings, or gratings mapped according to conformal transformations.

In more general terms, any continuous function of the type $f(x_t,y_t)$ is a candidate function for the functions $g_2(x_t,y_t)$, $h_2(x_t,y_t)$, and/or $m_2(x_t,y_t)$. Only a more detailed analysis of such candidate functions enables verifying if they are usable in the context of geometric layer transformations, i.e. if they yield, at least for certain constants and within given regions of the transformed space, base bands, revealing lines and moiré bands suitable for document authentication. A catalogue of implicit functions $f(x_t,y_t)=c$, where c represents a constant, usable as candidate geometric transformation functions can be found in the book "Handbook and Atlas of Curves", by Eugene V. Shikin, CRC Press, 1995 or on pages 319-329 of the book "Handbook of Mathematics and Computational Science" by J. W. Harris and H Stocker, published by Springer Verlag in 1998.

A library of suitable functions $f(x_t,y_t)$ with corresponding constant ranges may be established, for example for the transformation $(m_1(x_t,y_t),\ m_2(x_t,y_t))$ transforming a band moiré image from transformed space to original space and for the transformation $g_2(x_t,y_t)$ transforming a revealing line grating from transformed space to original space. Once a library of transformation functions is established, which comprises for each transformation corresponding ranges of constants, thousands of different layouts become available for the band moiré image layout, the revealing line grating layout and according to Eq. (24) for the base band layer layout.

The very large number of possible geometric transformations for generating curvilinear base band layers and curvilinear revealing line gratings allows to synthesize individualized base and revealing layers, which, only as a specific pair, are able to produce the desired reference band moiré image (e.g. a rectilinear or a curvilinear moiré image) if they are superposed according to specific geometric conditions (relative position and/or relative orientation). One of the layers, e.g. the curvilinear revealing layer may be publicly available (e.g. downloadable from a Web server) and may serve as an authentication means. It would be very difficult to create, without knowledge of the revealing layer's layout (i.e. without knowledge of the geometric transformation mapping it from transformed space to original space) a base layer which would yield in superposition with that revealing layer a rectilinear moiré image. Furthermore, since the base layer and the revealing layer may be divided into many portions each generated according to a different pair of matching geometric transformations, it becomes impossible for potential counterfeiters to resynthesize the base layer without knowing in detail the relevant geometric transformations as well as the constants and positions used to synthesize the base layer.

In addition, it is possible to reinforce the security of widely disseminated documents such as banknotes, diploma, entry tickets, travel documents and valuable products by often modifying the parameters which define the geometric layout of the base layer and of its corresponding revealing layer. One may for example have geometric transformations and their associated constants which depend on a security document's issue date or production series number. For example, each series of a document may be mapped onto a different set of geometric layouts, given by different transformations and/or transformation constants.

Multichromatic Base Band Patterns

The present invention is not limited only to the monochromatic case. It may largely benefit from the use of different colors for producing the patterns located in the bands of the base layer.

One may generate colored base bands in the same way as in standard multichromatic printing techniques, where several (usually three or four) halftoned layers of different colors (usually: cyan, magenta, yellow and black) are superposed in order to generate a full-color image by halftoning. By way of example, if one of these halftoned layers is used as a base layer according to the present invention, the band moiré patterns that will be generated with a revealing transparent line grating will closely approximate the color of this base layer. If several different colored layers are used for the base band according to the present invention, they will generate when superposed with a revealing transparent line grating a band moiré pattern approximating the color resulting from the superposition of these different colored layers.

Another possible way of using colored bands in the present invention is by using a base layer whose individual bands are composed of patterns comprising sub-elements of different colors. Color images with subelements of different colors printed side by side may be generated according to the multicolor dithering method described in U.S. patent application Ser. No. 09/477,544 filed Jan. 4, 2000 (Ostromoukhov, Hersch) and in the paper "Multi-color and artistic dithering" by V. Ostromoukhov and R. D. Hersch, SIGGRAPH Annual Conference, 1999, pp. 425-432. An important advantage of this method as an anticounterfeiting means is gained from the extreme difficulty in printing perfectly juxtaposed sub-elements of patterns, due to the high required precision in the alignment of the different colors (registration precision). Only the best high-performance security printing equipment which is used for printing security documents such as banknotes is capable of offering such a registration precision. Registration errors which are unavoidable when counterfeiting the document on lower-performance equipment will cause small shifts between the different colored sub-elements of the base layer elements; such registration errors will be largely magnified by the band moiré, and they will significantly corrupt the shape and the color of the band moiré image obtained by the revealing line grating layer.

The document protection by microstructure patterns is not limited to documents printed with black-white or standard color inks (cyan, magenta, yellow and possibly black). According to pending U.S. patent application Ser. No. 09/477,544 (Method an apparatus for generating digital halftone images by multi-color dithering, inventors V. Ostromoukhov, R. D. Hersch, filed Jan. 4, 2000), it is possible, with multicolor dithering, to use special inks such as non-standard color inks, inks visible under UV light, metallic inks, fluorescent or iridescent inks (variable color inks) for generating the patterns within the bands of the base layer. In the case of a metallic ink (see U.S. patent application Ser. No. 10/440,355, Hersch, Emmel, Collaud), for example, when seen at a certain viewing angle, the band moiré patterns appear as if they would have been printed with normal inks and at another viewing angle (specular observation angle), due to specular reflection, they appear much more strongly. A similar variation of the appearance of the band moiré patterns can be attained with iridescent inks. Such variations in the appearance of the band moiré patterns completely disappear when the original document is scanned and reproduced or photocopied.

Using special inks visible under ultra-violet light (hereinafter called UV inks) for printing the base layer allows to reveal moiré images under UV light, but may either hide them completely or partially under normal viewing conditions. If UV inks which are partly visible under day light are combined with standard inks, for example by applying the multicolor dithering method cited above, photocopiers will not be able to extract the region where the UV ink is applied and therefore potential counterfeiters will not be able to generate the base layer, even with expensive printing equipment (offset). In the resulting forgered document, under UV light, no moiré image will appear.

Another advantage of the multichromatic case is obtained when non-standard inks are used to create the pattern in the bands of the base layer. Non-standard inks are often inks whose colors are located out the gamut of standard cyan magenta and yellow inks. Due to the high frequency of the colored patterns located in the bands of the base layer and printed with non-standard inks, standard cyan, magenta, yellow and black reproduction systems will need to halftone the original color thereby destroying the original color patterns. Due to the destruction of the patterns within the bands of the base layer, the revealing layer will not be able to yield the original band moiré patterns. This provides an additional protection against counterfeiting.

Embodiments of Base and Revealing Layers

The base layer with one or several base band gratings and the revealing layer made of a revealing line grating may be embodied with a variety of technologies. Important embodiments for the base layer are offset printing, ink-jet printing, dye sublimation printing and foil stamping.

It should be noted that the layers (the base layer, the revealing layer, or both) may be also obtained by perforation instead of by applying ink. In a typical case, a strong laser beam with a microscopic dot size (say, 50 microns or even less) scans the document pixel by pixel, while being modulated on and off, in order to perforate the substrate in predetermined pixel locations. A revealing line grating may be created for example as partially perforated lines made of perforated segments of length l and unperforated segments of length m, with pairs of perforated and unperforated parts (l,m) repeated over the whole line length. For example, one may choose $l=8/10$ mm and $m=2/10$ mm. Successive lines may have their perforated segments at the same or at different phases. Different parameters for the values l and m may be chosen for different successive lines in order to ensure a high resistance against tearing attempts. Different laser microperforation systems for security documents have been described, for example, in "Application of laser technology to introduce security features on security documents in order to reduce counterfeiting" by W. Hospel, SPIE Vol. 3314, 1998, pp. 254-259.

In yet another category of methods, the layers (the base layer, the revealing layer, or both) may be obtained by a complete or partial removal of matter, for example by laser or chemical etching.

To vary the color of band moiré patterns, one may also chose to have the revealing line grating made of a set of colored lines instead of transparent lines (see article by I. Amidror, R. D. Hersch, Quantitative analysis of multichromatic moiré effects in the superposition of coloured periodic layers, Journal of Modern Optics, Vol. 44, No. 5, 1997, 883-899).

Although the revealing layer (line grating) will generally be embodied by a film or plastic support incorporating a set of transparent lines, it may also be embodied by a line grating made of cylindric microlenses. Cylindric microlenses offer a higher light intensity compared with corresponding partly transparent line gratings. When the period of the base band layer is small (e.g. less than 1/3 mm), cylindric microlenses as revealing layer may also offer a higher precision. One can also use as revealing layer curvilinear cylindric microlenses. One may also use instead of cylindric microlenses a diffractive device emulating the behavior of cylindric microlenses, in the same manner as it is possible to emulate a microlens array with a diffractive device made of Fresnel Zone Plates (see B. Saleh, M. C. Teich, Fundamentals of Photonics, John Wiley, 1991, p. 116).

In the case that the base layer is incorporated into an optically variable surface pattern, such as a diffractive device, the image forming the base layer needs to be further processed to yield for each of its pattern image pixels or at least for its active pixels (e.g. black or white pixels) a relief structure made for example of periodic function profiles (line gratings) having an orientation, a period, a relief and a surface ratio according to the desired incident and diffracted light angles, according to the desired diffracted light intensity and possibly according to the desired variation in color of the diffracted light in respect to the diffracted color of neighbouring areas (see U.S. Pat. Nos. 5,032,003 inventor Antes and 4,984,824 Antes and Saxer). This relief structure is reproduced on a master structure used for creating an embossing die. The embossing die is then used to emboss the relief structure incorporating the base layer on the optical device substrate (further information can be found in U.S. Pat. No. 4,761,253 inventor Antes, as well as in the article by J. F. Moser, Document Protection by Optically Variable Graphics (Kinegram), in Optical Document Security, Ed. R. L. Van Renesse, Artech House, London, 1998, pp. 247-266).

It should be noted that in general the base and the revealing layers need not be complete: they may be masked by additional layers or by random shapes. Nevertheless, the moiré patterns will still become apparent.

In a further embodiment, in a similar manner as disclosed in U.S. patent application Ser. No. 11/149,017, filed on the 10 Jun. 2005, by the same inventors as the present application, the base layer and the revealing layer are fixed one in respect to the other, separated by a thin, at least partly transparent layer, i.e. a layer which does not scatter light and which transmits a fraction of light at least in part of the wavelength range of interest (e.g. the visible wavelength range). When moving the eyes across the revealing layer line grating, due to the parallax effect (see [VanRenesse98], section 9.3.2), an apparent displacement between base layer and revealing layer is generated which yields the dynamic moiré effects shown in the examples above, especially in cases where the revealing layer line grating comprises straight lines or curved lines having a predominant orientation (e.g. cosinusoidal revealing layer of small amplitude and large period, elliptic revealing layer with relatively flat ellipses, or a small section of a circular line grating). In a general setup, the composed layer (fixed setup) comprising base layer and revealing layer can be observed at angles varying between $-\alpha$ (e.g. $-45$ degrees) and $\alpha$ (e.g. $+45$ degrees) in respect to the composed layer's normal vector. The corresponding part d of the base layer viewed through the revealing layer transparent lines or respectively sampled by the revealing layer lenticular lenses when varying the observation angle is therefore $$d=2h\tan\alpha \tag{36}$$

i.e. twice the distance h (also called gap) between base band layer and revealing layer multiplied by tan α, e.g. in the case of $\alpha=\pi/4$ (45 degrees), we have d=2*h. In order to see the apparent displacement of a full moiré period by tilting the composed layer from −α (e.g. −45 degrees) to α (e.g. +45 degrees), the base band width w should not be larger than 2 h tan α, i.e. not larger than twice the distance between base band layer and revealing layer multiplied by tan α. If the base band width is made equal to the distance between base band layer and revealing layer multiplied by tan α, two moiré displacement periods may be observable when tilting the composed layer from −α to α in respect to the composed layer's normal. In order to create a composed layer with a very small distance h between base band layer and revealing layer (e.g. between h=5 μm to h=100 μm), the base bands should have a width $w<2h\tan\alpha$, i.e a width smaller than the space that is scanned by the eyes when tilting the composed layer from −α to α in respect to the composed layer's normal. The base band patterns may be produced by very fine imaging technologies, such as laser engraving (see [VanRenesse98], section 9.3). A simple and cheap assembly of a composed layer consists in taking as revealing layer lenticular lenses located on a support having the desired thickness h and of fixing the base layer on the back face of the lenticular lense support. Note that the base layer can be diffusely reflecting, in order to be viewed in reflection mode, or partially transparent, in order to be viewed in transmission mode.

Figure 39:
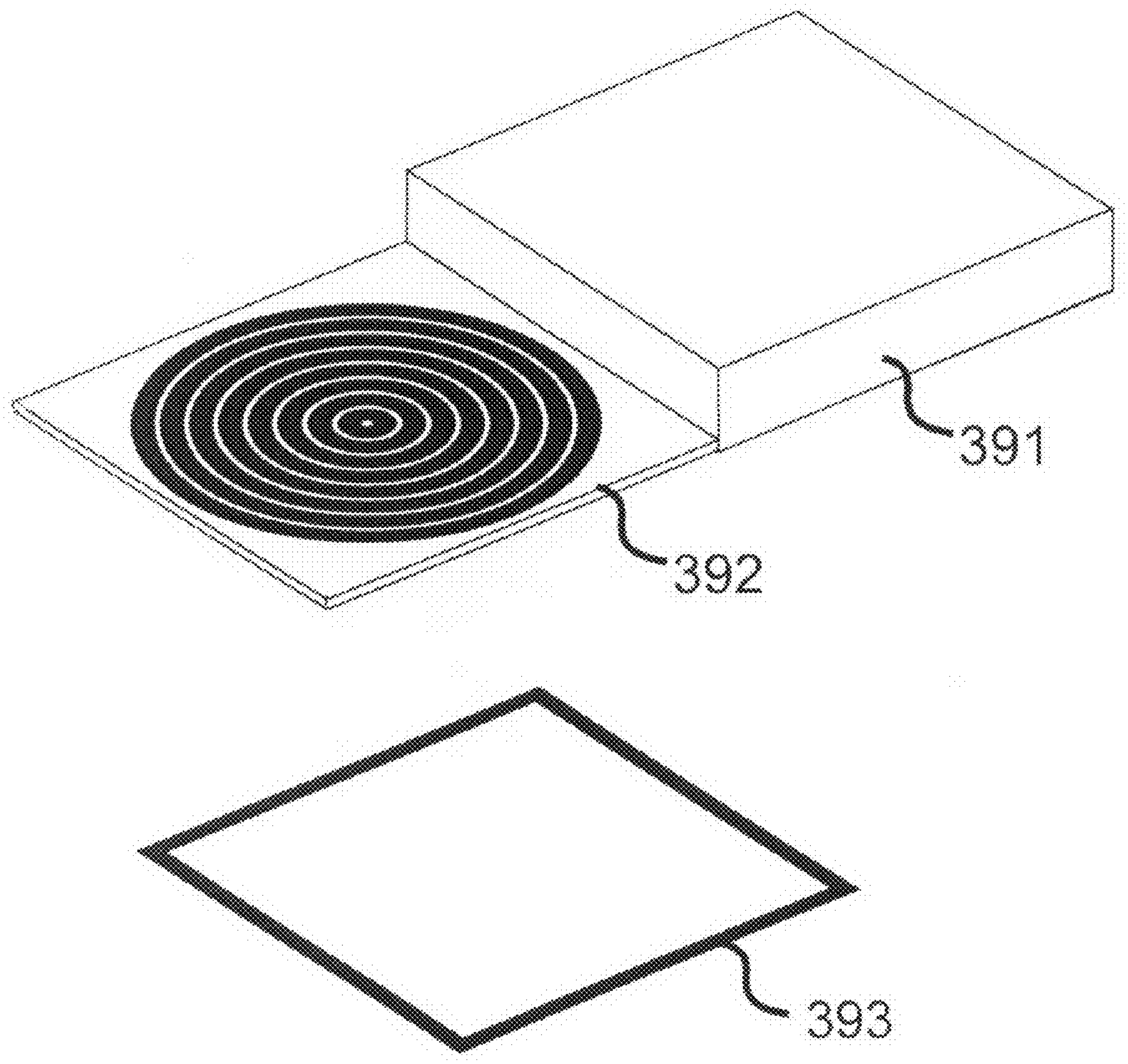
FIG. 39 illustrates an electronic display working in transmissive mode displaying as example a circularly laid out revealing line grating.

In a yet further embodiment, in a similar manner as disclosed in U.S. patent application Ser. No. 11/149,017, filed on the 10 Jun. 2005 by the same inventors as the present application, a security device may comprise as base layer, as revealing layer or for both layers an electronic display working in transmissive mode, e.g. a liquid crystal display. In An authentication device may comprise as revealing layer an electronic display working in transmissive mode, e.g. a liquid crystal display (e.g. FIG. 39, 392). The revealing layer's transformed line grating is displayed by a revealing layer display software module running on a computing device 391. By superposing the transmissive electronic display 392 displaying a geometrically transformed line grating on top of a geometrically transformed base band layer 393, one obtains a band moiré image, geometrically transformed according to Equations (23). As in the previous embodiments, by having the revealing layer sampling successively different positions within the base layer, e.g. by displacing, rotating or slightly modifying the transformation parameters of the transformed revealing line grating layer, one creates a dynamic band moiré image moving along either a certain orientation, radially, tangentially to the moiré image layout or along spiral trajectory, similarly to the examples shown in the previous paragraphs and sections. Since an electronic display is capable of generating any kind of geometrically transformed revealing layer, different relative superposition phases of the non-transformed base and revealing layers may correspond, after applying the transformation to the base and revealing layers, to revealing layer instances which cannot be brought into congruence by a simple translation and rotation, i.e the transformation from one revealing layer superposition phase to the next revealing layer superposition phase in the transformed revealing layer space may be non-rigid. For example, one may implement the geometric transformations described in section "Curvilinear band moirés", in Equations (14) and shown in FIGS. 15A and 16B for both the base layer and the revealing layer. Then, the radial coordinate ρ in the transformed space is $$\rho=\sqrt{(x_t-c_x)^2+(y_t-c_y)^2} \tag{9}$$

In this transformation, the original non-transformed base band grating is transformed into a circular base band grating and the revealing layer's original non-transformed revealing line grating is also transformed into a circular line grating. The revealing layer display software module may generate the circularly transformed revealing line grating moving concentrically in and out at different relative phases, thereby yielding a moiré image moving inwards and outwards in respect to the center ($c_x$, $c_y$) of the circular moiré layout (center of the corresponding geometric transformation of the moiré bands). The circular revealing layer grating is moved from one relative phase of a circular revealing layer grating into a second relative phase (defined as a phase transformation) by a simple increase of the radial coordinates of the circular lines of the revealing line grating, i.e. $\bar{\rho}=\rho+\Delta\rho$, where $\bar{\rho}$ expresses the new radial coordinate, ρ the old radial coordinate and where Δρ is a relative circular superposition phase shift. The relative circular superposition phase shift Δρ corresponds to an original non-transformed superposition phase shift of $\Delta\tau_r$, i.e. $\Delta\rho=(1/c_1)\cdot\Delta\tau_r$, where $c_1$ is the constant radial scaling factor of Eq. (14). The example described here may be extended to other revealing layer layouts such as elliptic layouts, hyperbolic layouts, spiral layouts, etc. i.e. layouts where the displacement of the revealing layer lines, i.e. the phase transformation, is not necessarily a rigid transformation. A second advantage of having a revealing layer embodied by an electronic display working in transmissive mode (e.g. a liquid crystal display), lies in the fact that it may create revealing line gratings for any kind of geometric transformations, i.e. the same "electronic revealing layer" may be operated to authenticate different devices (valuable articles, security documents) incorporating different geometric transformations of their base layer, for example security documents issued at different dates. In addition, one may conceive an electronic revealing layer whose revealing line grating layout automatically changes at given time intervals, by modifying the parameters of a geometric transformation or by implementing a different geometric transformation. Similarly, an "electronic base band layer" may be conceived, whose layout changes at given time intervals, again by modifying the parameters of a geometric transformation or by implementing a different geometric transformation. Both the "electronic revealing layer" and the "electronic base band layer" may be embodied in a plastic card incorporating a microprocessor drawing its energy either from a tiny battery or from external sources (magnetic field, photo-electric cells, etc. . . . ).

Authentication of Documents with Static and Dynamically Varying Band Moiré Images The present invention presents improved methods for authenticating documents and valuable products, which are based on band moiré patterns produced by base and revealing layers computed according to a band moire layout model. Several embodiments of particular interest are given here by way of example, without limiting the scope of the invention to these particular embodiments.

In one embodiment of the present invention, the band moiré image can be visualized by superposing the base layer and the revealing layer which both appear on two different areas of the same document or article (banknote, check, etc.). In addition, the document may incorporate, for comparison purposes, in a third area of the document a reference image showing the band moiré image layout produced when base layer and revealing layer are placed one on top of the other according to a preferred orientation and possibly according to a preferred relative position. Furthermore, the band moiré image can be partitioned into different portions, each corresponding base layer portion and a revealing layer portion being laid out differently according to corresponding pairs of matching geometric transformations. Nevertheless, the band moiré image resulting from the superposition of base and revealing layers should be continuous, i.e. without breaks at the boundaries between band moire image portions and have the same layout as the reference band moiré image. When moving the revealing layer on top of the base layer, or, respectively when tilting a composed layer, the moiré image may remain continuous or on the contrary, one portion of the moiré image may become strongly deformed, possibly in a periodic manner.

In a second embodiment of the present invention, only the base layer appears on the document itself, and the revealing layer is superposed on it by a human operator or an apparatus which visually or optically validates the authenticity of the document. For comparison purposes, the reference band moiré image may be represented as an image on the document or on a separate device, for example on the revealing device. As in the first embodiment, the band moiré image can be partitioned into different portions, each corresponding base layer portion and revealing layer portion being laid out differently according to corresponding pairs of matching geometric transformations. And as in the first embodiment, upon displacing of one layer on top of the other, or respectively when tilting a composed layer, different portions of the moiré image may behave differently, by either remaining without deformation or by being deformed.

In a further embodiment, document authentication is carried out by observing the dynamic band moiré image variations produced when displacing or rotating the revealing layer on top of the base layer (or vice-versa) or respectively, by tilting a composed layer. Thanks to the comprehensive band moiré image layout model, geometric transformations of the base and/or revealing layers may be computed so as to yield given predetermined dynamic moiré image variations, for example no deformation of the band moiré image patterns when displacing the revealing layer vertically on top of the base layer (respectively when tilting the composed layer vertically) and a strong periodic deformation of the band moiré image patterns when displacing the revealing layer horizontally on top of the base layer (respectively when tilting the composed layer horizontally). Examples of dynamic band moiré image variations have been described in the preceding sections. Such dynamic band moiré image variations comprise moiré patterns moving along different orientations and according to different relative speeds, concentrically laid out moiré patterns moving in a radial manner, moiré which circularly rotate and moiré patterns which deform themselves periodically upon displacement of the revealing layer on top of the base layer. This enumeration is given only by way of example. Different transformations of the base and/or revealing layers yield different types of dynamic moiré patterns.

Any attempt to falsify a document produced in accordance with the present invention by photocopying, by means of a desk-top publishing system, by a photographic process, or by any other counterfeiting method, be it digital or analog, will inevitably influence (even if slightly) the layout, shape or patterns of the base band layer incorporated in the document. Factors which may be responsible for an inaccurate reproduction of the base band layer are the following:

- use of a transformation mapping from transformed space to original space which is different from the original transformation applied to the authentic document,
- resampling effects when scanning the base layer,
- halftoning or dithering effects when reproducing the base layer, and
- dot gain or ink spreading effects when printing the base layer.

Since the band moiré image is very sensitive to any microscopic variations in the base or the revealing layers, any document protected according to the present invention becomes very difficult to counterfeit, and serves as a means to distinguish between a real document and a falsified one.

When the base band layer is printed on the document with a standard printing process, high security is offered without requiring additional costs in the document production. Even if the base band layer is imaged into the document by other means, for example by generating the base layer on an optically variable device (e.g. a kinegram) and by embedding this optically variable device into the document or article to be protected, no additional costs incur due to the incorporation of the base band layer into the optically variable device.

Authentication of Valuable Products by Dynamically Varying Band Moiré Images

In the same way as described in U.S. patent application Ser. No. 10/270,546, various embodiments of the present invention can be also used as security devices for the protection and authentication of industrial packages, such as boxes for pharmaceutics, cosmetics, etc. However, since the base band layer and revealing line layer are computed according to a band moire layout model, their respective layouts can be exactly computed in order to produce a band moiré image with the same layout and appearance as a reference moiré image. Furthermore, the possibility of partitioning the base and revealing layers into portions having different layouts but generating a same band moiré image offers a much stronger protection than the band moiré images produced according to U.S. patent application Ser. No. 10/270,546. In addition, thanks to the band moire layout model, it is possible to create specific dynamic variations of the band moiré images (see section "Authentication of documents with static and dynamically varying band moiré images"), which can serve as an authentication reference.

Let us enumerate examples of security documents protected according to the previously disclosed methods. Packages that include a transparent part or a transparent window are very often used for selling a large variety of products, including, for example, audio and video cables, connectors, integrated circuits (e.g flash memories), perfumes, etc., where the transparent part of the package may be also used for authentication and anticounterfeiting of the products, by using a part of the transparent window as the revealing layer (where the base layer is located on the product itself). The base layer and the revealing layer can be also printed on separate security labels or stickers that are affixed or otherwise attached to the product itself or to the package. A few possible embodiments of packages which can be protected by the present invention are illustrated below, and are similar to the examples described in U.S. Pat. No. 6,819,775 (Amidror and Hersch) in FIGS. 17-22. therein. However, since in the present invention, the band moiré images are clearly visible in reflective mode and since the band moiré layout model provides a strong additional protection, the incorporation of base band patterns in the base layer and the use of a line grating as the revealing layer makes the protection of valuable products more effective than with the methods described in U.S. Pat. No. 6,819,775 (Amidror and Hersch) and in U.S. patent application Ser. No. 10/270,546 (Hersch and Chosson).

Figure 30A:
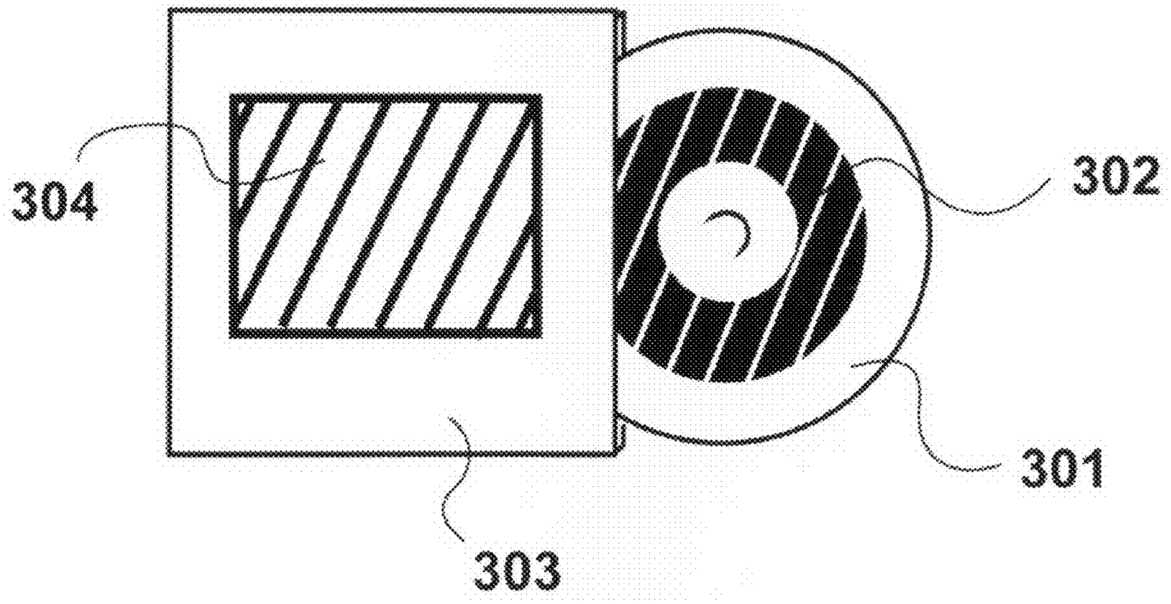
FIGS. 30A and 30B, illustrate schematically a possible embodiment of the present invention for the protection of optical disks such as CDs, CD-ROMs and DVDs.
Figure 30B:
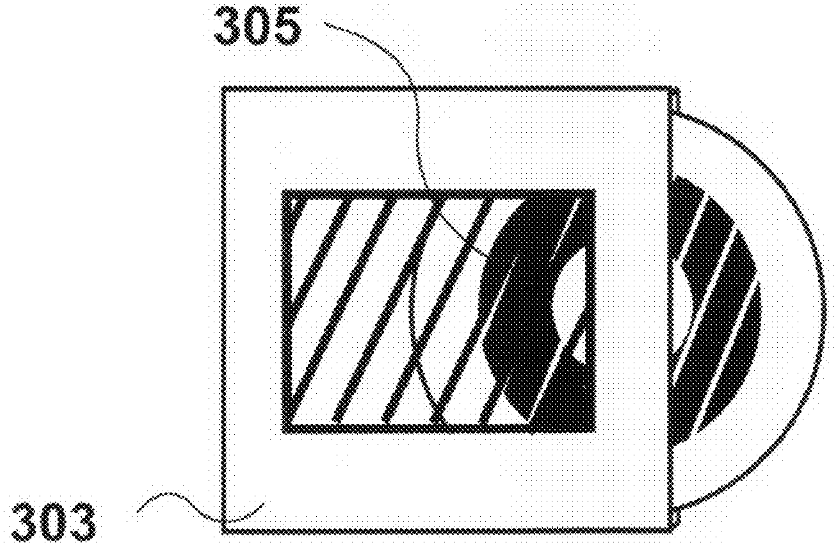

FIG. 30A illustrates schematically an optical disk 391, carrying at least one base layer 392, and its cover (or box) 393 carrying at least one revealing layer (revealing line grating) 394. When the optical disk is located inside its cover (FIG. 39B), a band moiré moire image 395 is generated between one revealing layer and one base layer. While the disk is slowly inserted or taken out of its cover 393, this band moiré image varies dynamically. This dynamically moving band moiré image serves therefore as a reliable authentication means and guarantees that both the disk and its package are indeed authentic (see section "Authentication of documents with static and dynamically varying band moiré images"). In a typical case, the band moiré image may comprise the logo of the company, or any other desired text or symbols, either in black and white or in color.

Figure 31:
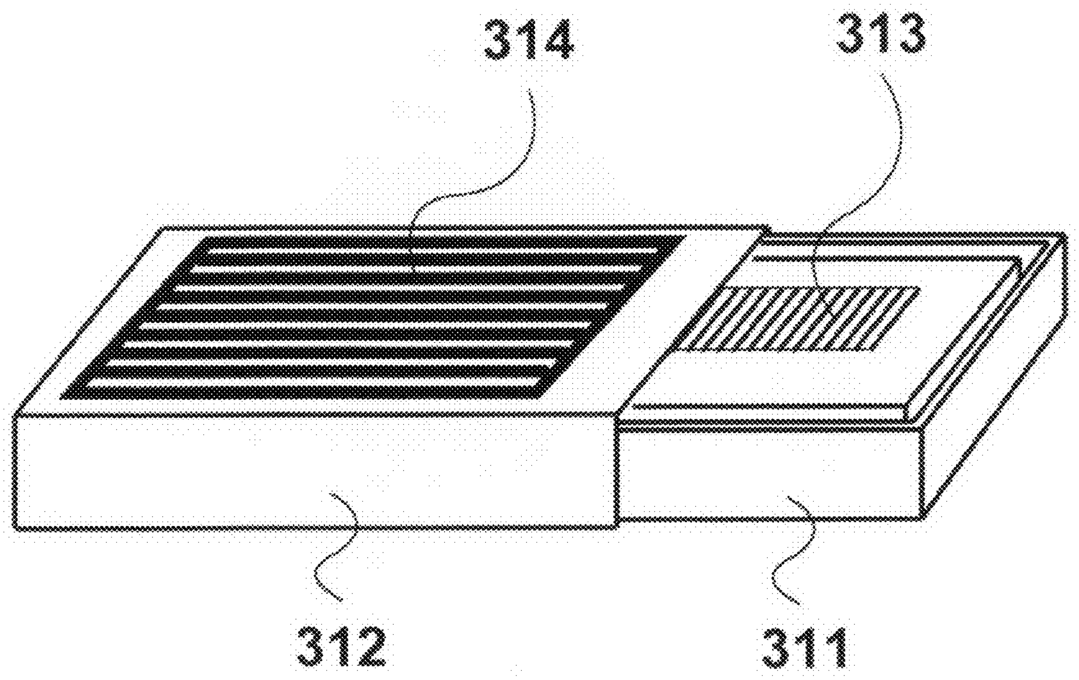
FIG. 31 illustrates schematically a possible embodiment of the present invention for the protection of products that are packed in a box comprising a sliding part.

FIG. 31 illustrates schematically a possible embodiment of the present invention for the protection of products that are packed in a box comprising a sliding part 311 and an external cover 312, where at least one element of the moving part, e.g. a product, carries at least one base layer 313, and the external cover 312 carries at least one revealing layer (revealing line grating) 314. By sliding the product into the cover, a dynamically varying band moiré image is formed.

Figure 32:
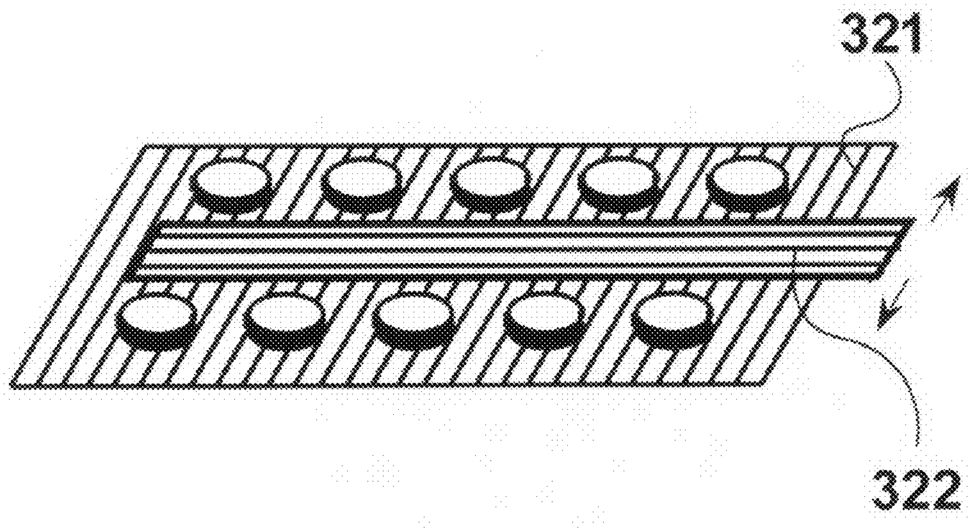
FIG. 32 illustrates schematically a possible embodiment of the present invention for the protection of pharmaceutical products.

FIG. 32 illustrates a possible protection for pharmaceutical products such as medical drugs. The base layer 321 may cover the full surface of the possibly opaque support of the medical product. The revealing layer 322 may be embodied by a moveable stripe made of a sheet of plastic incorporating the revealing line grating. By pulling the revealing layer in and out or by moving it laterally, a dynamically moving band moiré image is formed.

Figure 33:
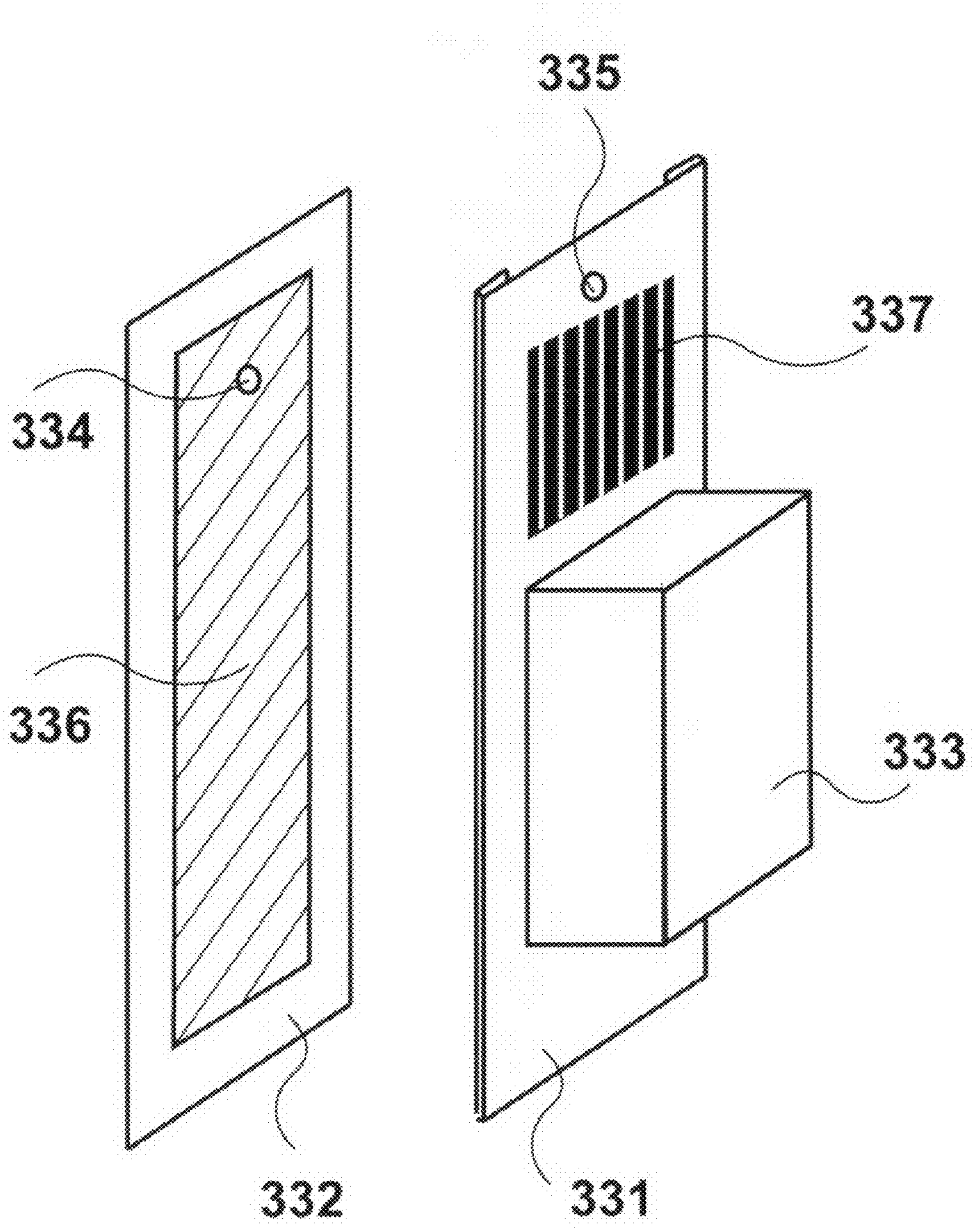
FIG. 33 illustrates schematically a possible embodiment of the present invention for the protection of products that are marketed in a package comprising a sliding transparent plastic front.

FIG. 33 illustrates schematically another possible embodiment of the present invention for the protection of products that are marketed in a package comprising a sliding transparent plastic front 331 and a rear board 332, which may be printed and carry a description of the product. Such packages are often used for selling video and audio cables, or any other products, that are kept within the hull (or recipient) 333 of plastic front 331. Often packages of this kind have a small hole 334 in the top of the rear board and a matching hole 335 in plastic front 331, in order to facilitate hanging the packages in the selling points. The rear board 332 may carry at least one base layer 336, and the plastic front may carry at least one revealing layer 337, so that when the package is closed, band moiré patterns are generated between at least one revealing layer and at least one base layer. Here, again, while the sliding plastic front 331 is slided along the rear board 332, a dynamically moving band moiré image is formed.

Figure 34:
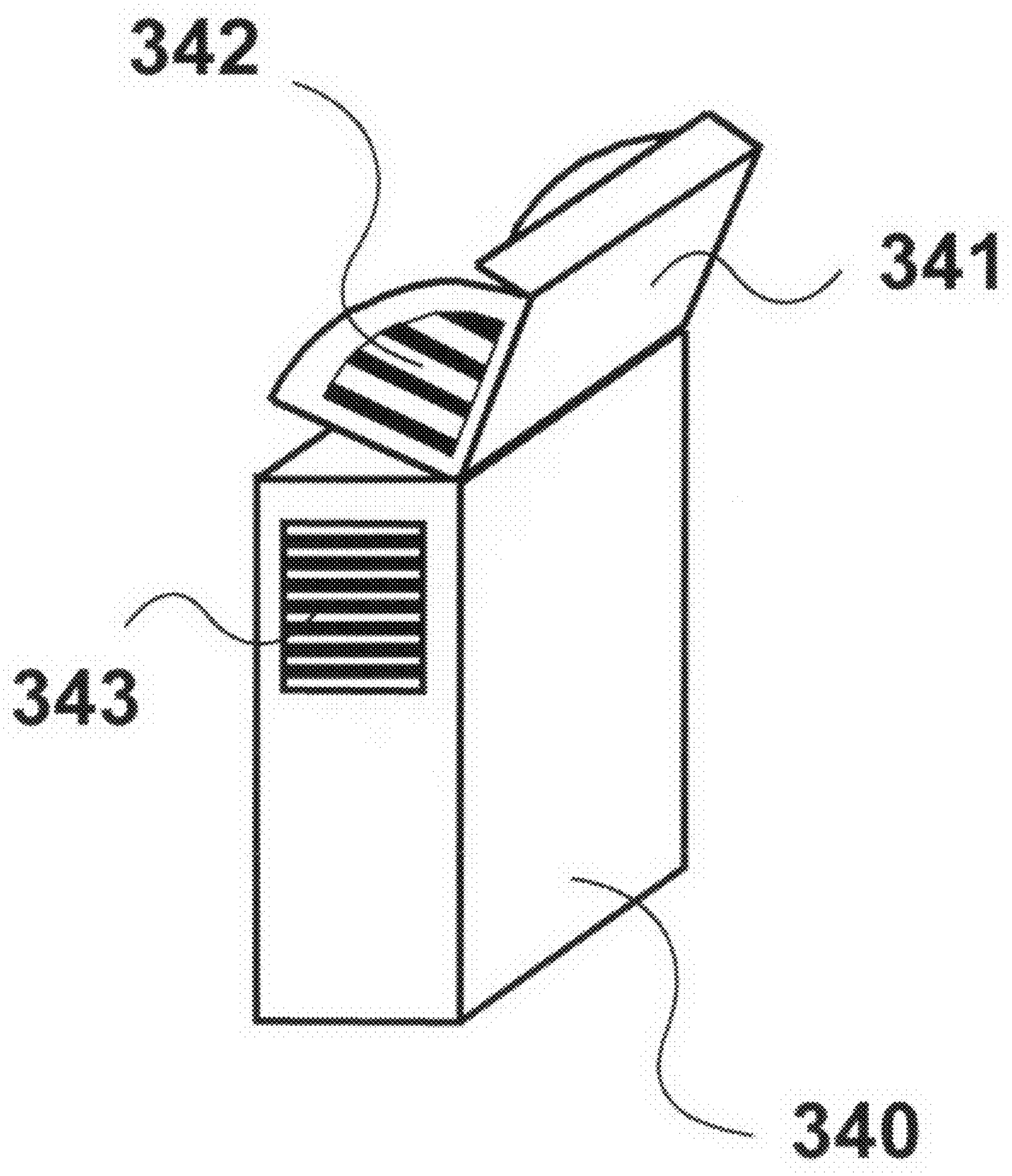
FIG. 34 illustrates schematically a possible embodiment of the present invention for the protection of products that are packed in a box with a pivoting lid.

FIG. 34 illustrates schematically yet another possible embodiment of the present invention for the protection of products that are packed in a box 340 with a rotating lid 341. The rotating lid 341 carries at least one base layer 342, and the box itself carries at least one revealing layer 343. When the box is closed, base layer 342 is located just behind revealing layer 343, so that band moiré patterns are generated. And when opening the box by rotating its lid 341, a dynamically moving band moiré image is formed. Depending on the base layer and revealing transformations, the generated band moiré image patterns may also move radially (as described in Example E).

Figure 35:
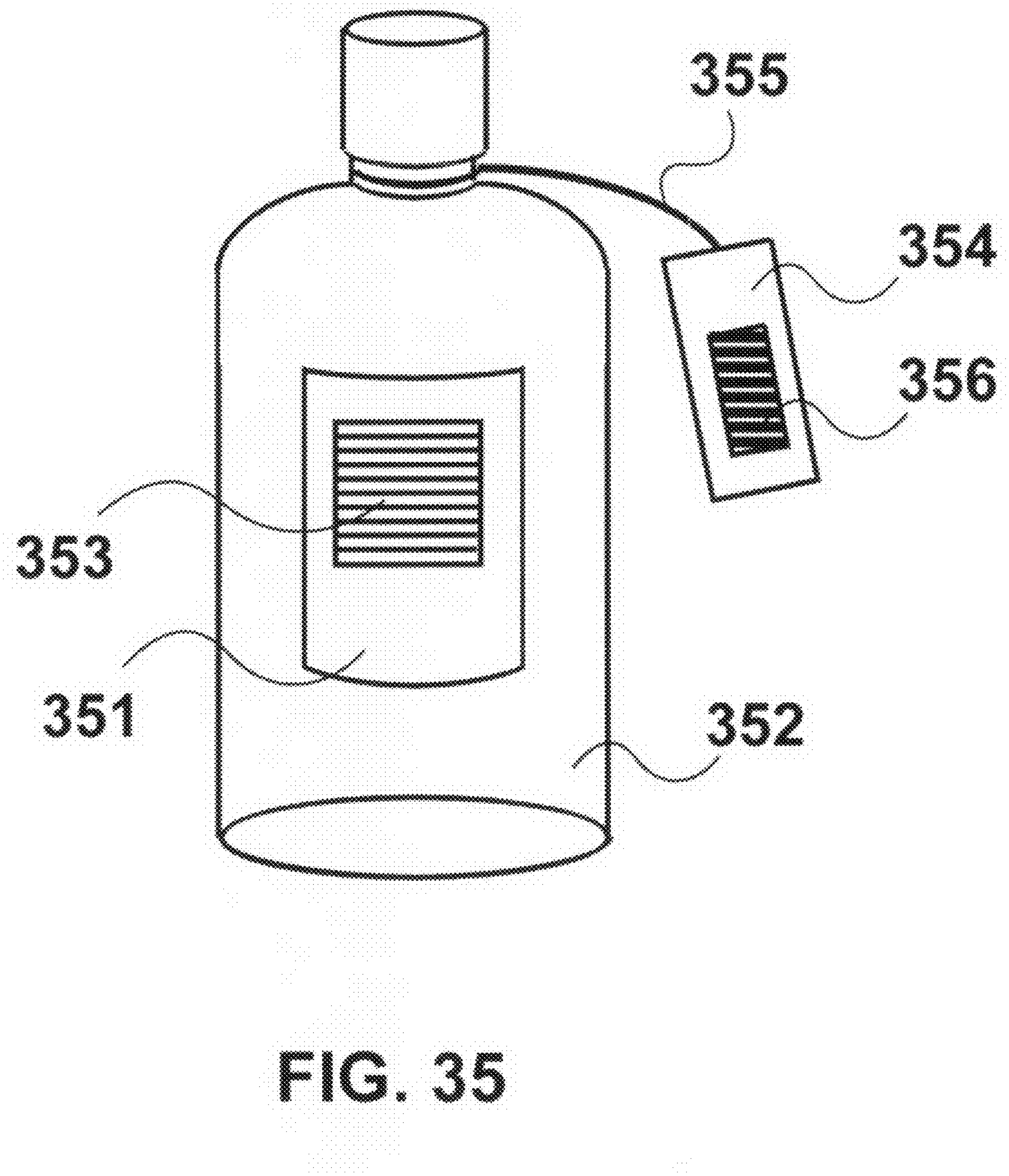
FIG. 35 illustrates schematically a possible embodiment of the present invention for the protection of products that are marketed in bottles (such as whiskey, perfumes, etc.)

FIG. 35 illustrates schematically yet another possible embodiment of the present invention for the protection of products that are marketed in bottles (such as vine, whiskey, perfumes, etc.). For example, the product label 351 which is affixed to bottle 352 may carry base layer 353, while another label 354, which may be attached to the bottle by a decorative thread 355, carries the revealing layer 356. The authentication of the product can be done in by superposing and moving the revealing layer 356 of label 354 on top of the base layer 353 of label 351. This forms a dynamically moving band moiré image, for example with the name of the product evolving in shape and layout according to the relative superposition positions of the base and revealing layers.

Figure 36:
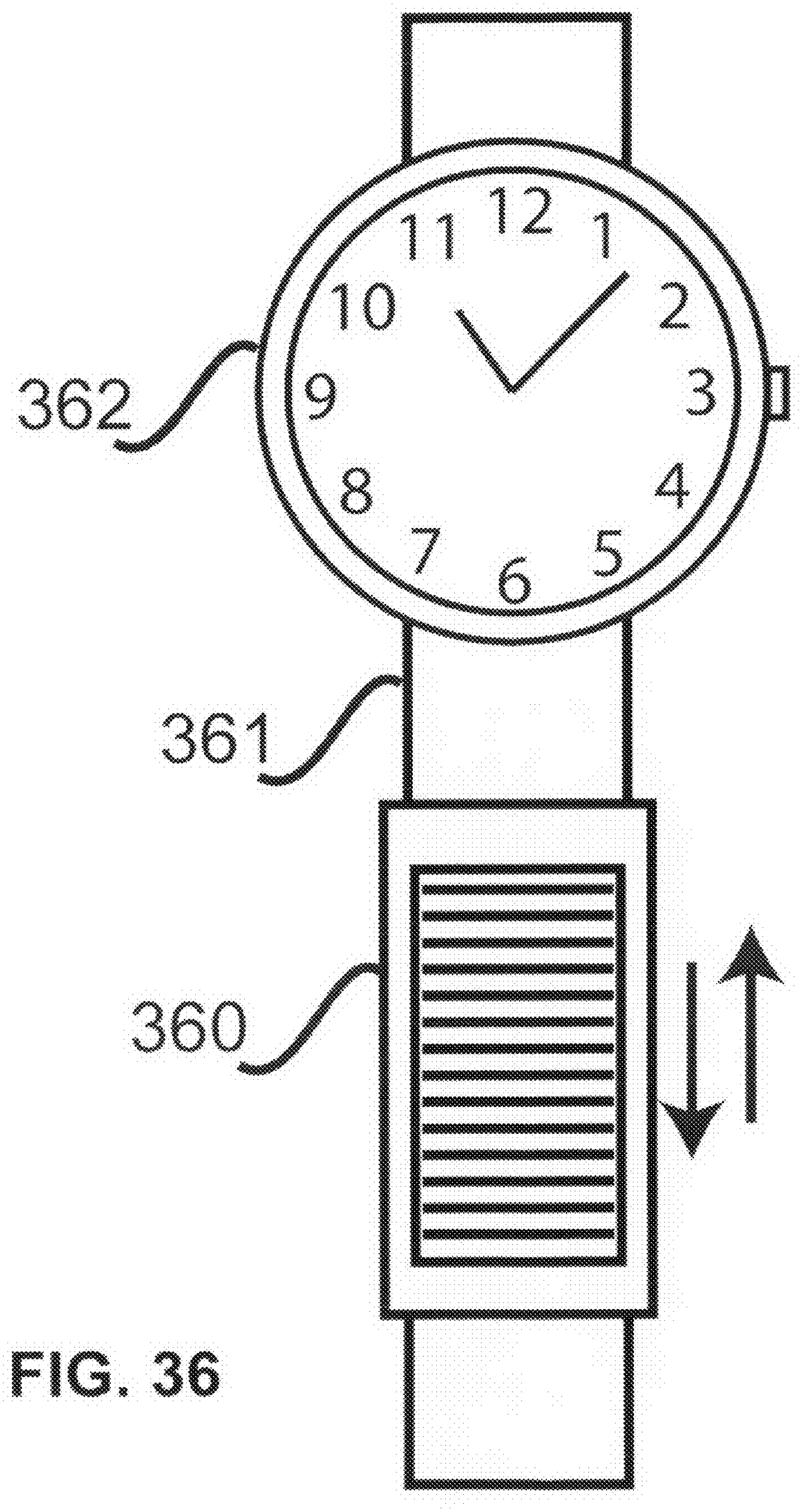
FIG. 36 shows a watch, whose armband comprises a moving revealing line grating layer yielding a band moiré image.
Figure 37:
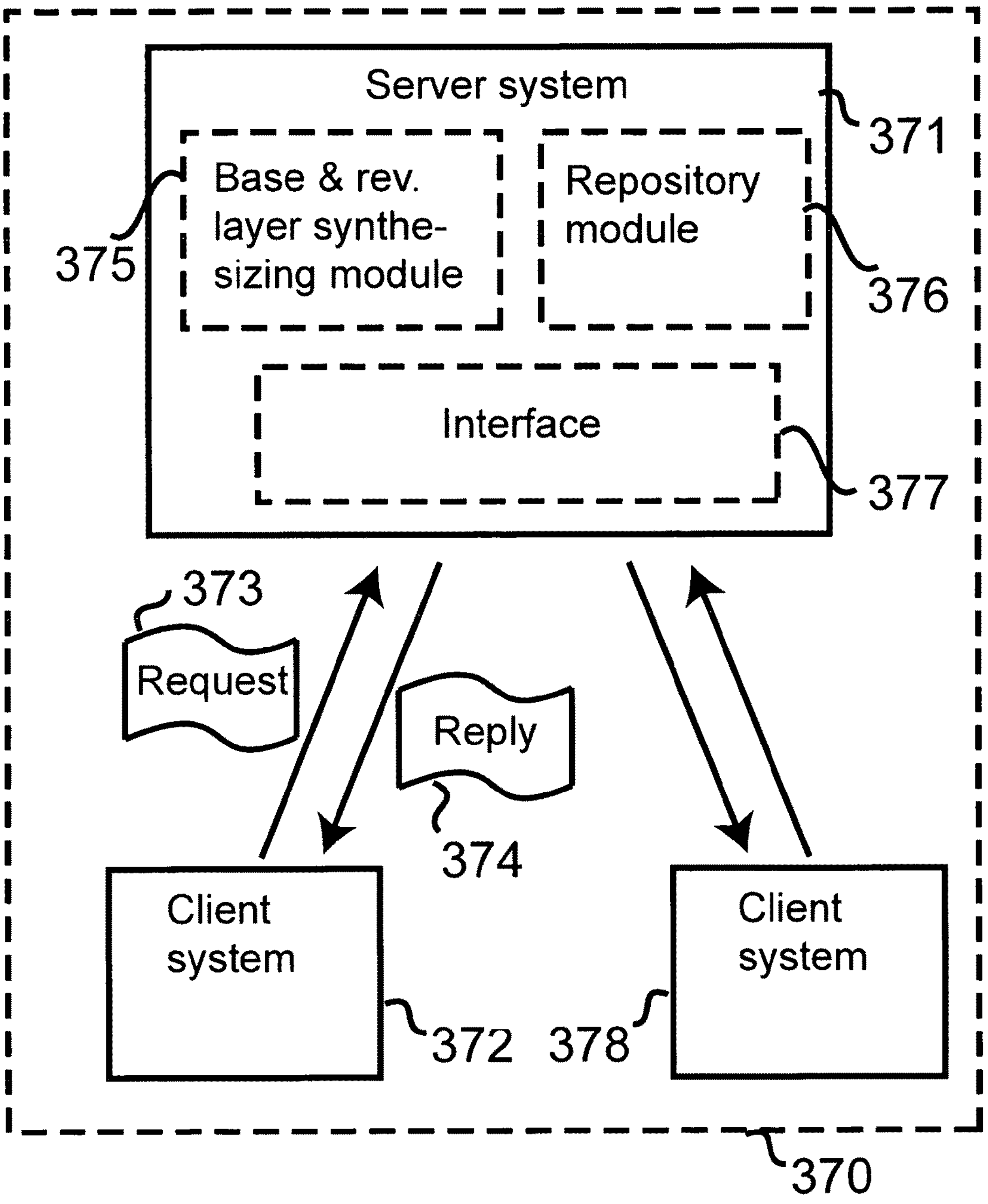
FIG. 37 illustrates a block diagram of a computing system operable for delivering base band grating and revealing line grating layers associated to the security documents to be delivered, respectively authenticated.

FIG. 36 illustrates a further embodiment of the present invention for the protection of watches 362. A base band grating layer may be created on the plastic armband 361 of a watch. The revealing line grating may be part of a second layer 360 able to move slightly along the armband. When the revealing line grating moves on top of the base band grating located on the armband, moire patterns may move in various directions and at different speeds. The moiré patterns may also move radially in and out when the revealing line grating moves on top of the base band grating located on the armband (see Example C).

Computing System for the Synthesis of Base and/or Revealing Layers

Thanks to the comprehensive band moiré image layout model, a large number of possible transformations as well as many different transformation and positioning constants can be used to automatically generate base band grating layers and revealing line grating layers yielding a large number of rectilinear or curvilinear static band moiré images or dynamic band moiré images exhibiting specific properties when moving one layer on top of the other. The large number of possible band moiré images which can be automatically generated provides the means to create individualized security documents and corresponding authentication means. Different classes or instances of documents may have individualized base layer layouts, individualized revealing layer layouts and either the same or different band moiré image layouts.

A correspondence can be established between document content information and band moiré image synthesizing information, i.e. information about the respective layouts of base band grating, revealing line grating and band moiré image layers. For example, on a travel ticket, the information may comprise a ticket number, the name of the ticket holder, the travel date, and the departure and arrival locations. On a business contract, the information may incorporate the title of the document, the names of the contracting parties, the signature date, and reference numbers. On a diploma, the information may comprise the issuing institution, the name of the document holder and the document delivery date. On a bank check, the information may comprise the number printed on the check as well as the name of the person or the company which emits the check. On a banknote, the information may simply comprise the number printed on a banknote.

One may easily create for a given document content information a corresponding band moiré image layout information, i.e. one transformation and one set of constants for the band moiré image layer layout and one transformation and one set of constants for the revealing line grating layer layout, said transformations and constants being selected from a large set of available transformations and transformation constants, for example stored within a transformation library.

Individualized security documents comprising individualized base layers and corresponding revealing layers as authentication means may be created and distributed via a document security computing and delivery system (see FIG. 36, 370). The document security computing and delivery system operable for the synthesis and delivery of security documents and of authentication means comprises a server system 371 and client systems 372, 378. The server system comprises a base layer and revealing layer synthesizing module 375, a repository module 376 creating associations between document content information and corresponding band moiré image synthesizing information and an interface 377 for receiving requests for registering a security document, for generating a security document comprising a base layer, for generating a base layer to be printed on a security document or for creating a revealing layer laid out so as to reveal the band moiré image associated to a particular document or base layer. Client systems 372, 378 emit requests 373 to the server system and get the replies 374 delivered by the interface 377 of the server system.

Within the server system, the repository module 376, i.e. the module creating associations between document content information and corresponding band moiré image synthesizing information is operable for computing from document information a key to access the corresponding document entry in the repository. The base band grating layer and revealing line grating layer synthesizing module 375 is operable, when given corresponding band moiré image synthesis information, for synthesizing the base band grating layer and the revealing line grating layer. Band moiré image synthesizing information comprises:

a desired reference band moiré image in the original space, a band moiré orientation $\phi$ in the original space (as default value, e.g. 90°), a preferred revealing layer period $T_r$ in the original space, a moiré displacement orientation $\beta$ in the original space (orientation of replication vector t, i.e. $\beta$=atan $t_y/t_x$) and the transformations $g_2(x_t,y_t)$ and $m_1(x_t,y_t)$, $m_2(x_t,y_t)$ mapping respectively the revealing layer and the band moiré image layer from the transformed space to the original space or as an alternative, the transformations $g_2(x_t,y_t)$ and $h_1(x_t,y_t)$, $h(x_t,y_t)$ mapping respectively the revealing layer and the base band layer from the transformed space to the original space.

The base band grating layer and revealing line grating layer synthesizing module is operable for synthesizing the base layer and the revealing layer from band moiré image synthesizing information either provided within the request from the client system or provided by the repository module. According to the band moiré image synthesizing information, the base band period replication vector t is computed and the base band layer is created in the original space. The module is also operable for computing from the transformation $m_1(x_t,y_t)$, $m_2(x_t,y_t)$ defining the band moiré image layout in the transformed space the corresponding transformation $h_1(x_t,y_t)$, $h_2(x_t,y_t)$ defining the base band layer layout in the transformed space.

The server system's interface module 377 may receive from client systems (a) a request comprising document content information for creating a new document entry;

(b) a request to register in a document entry band moiré image synthesis information delivered within the request message;

(c) a request to generate band moiré image synthesis information associated to a given document and to register it into the corresponding document entry;

(d) a request to issue a base layer for a given document;

(c) a request to issue a revealing layer for a given document;

Upon receiving a request 373, the server system's interface module interacts with the repository module in order to execute the corresponding request. In the cases of requests to issue a base or a revealing layer, the server system's interface module 377 transmits the request first to the repository module 376 which reads from the document entry the corresponding band moiré image synthesis information and forwards it to the base and revealing grating layer synthesizing module 375 for synthesizing the requested base or revealing layer. The interface module 377 delivers the requested base or revealing layer to the client system. The client system may print the corresponding layer or display it on a computer. Generally, for creating a new document, the interface module will deliver the printable base layer which comprises the base band grating. For authenticating a document, the interface module will deliver the revealing layer which comprises the line grating.

As an alternative, the server system may further offer two (or more) levels of protection, one offered to the large public and one reserved to authorized personal, by providing for one document at least two different revealing layers, generating each one a different type of static or dynamic band moiré image.

Thanks to the document security computing and delivery system, one may create sophisticated security document delivery services, for example the delivery of remotely printed (or issued) security documents, the delivery of remotely printed (or issued) authenticating devices (i.e. revealing layers), and the delivery of reference band moiré images, being possibly personalized according to information related to the security document to be issued or authenticated.

Further Advantages of the Present Invention

The advantages of the new authentication and anticounterfeiting methods disclosed in the present invention are numerous.

1. The comprehensive band moiré layout model disclosed in the present invention enables computing the exact layout of a band moiré image generated by the superposition of a base band grating and of a revealing line grating to which known geometric transformations are applied. The comprehensive band moiré layout model also allows specifying a given revealing line grating layout and computing a base band grating layout yielding, when superposed with the revealing line grating, a desired reference band moiré image layout.

2. An unlimited number of geometric transformations being available, a large number of base band grating and revealing line grating designs can be created according to different criteria. For example, the triplet formed by base band grating layout, revealing line grating layout and band moiré image layout may be different for each individual document, for each class of documents or for documents issued within different time intervals. The immense number of variations in base band grating layout, revealing line grating layout and band moiré image layout makes it very difficult for potential counterfeiters to forger documents whose layouts may vary according to information located within the document or according to time.

3. Since the same band moiré image may be generated when superposing different revealing layers on top of correspondingly computed base layers, base and revealing layers may be divided into several portions, each yielding the same band moiré image layout, but with different layouts of base and revealing layers. Since the shape of the masks determining the different portions within the base and revealing layers may be freely chosen, one may create revealing line and base band layers having a complex interlaced structure. Furthermore, the number of different portions may be freely chosen, thereby enabling the generation of very complex base layer and revealing layer layouts, which are extremely hard to forger.

4. Since the comprehensive band moiré layout model allows, for a given band moiré image layout, to freely chose the layout of the revealing line grating, one may optimize the layouts of the base and the revealing layers so as to reveal details which are only printable at the high resolution and with the possibly non-standard inks of the original printing device. Lower resolution devices or devices which do not print with the same inks as the original printing device will not be able to print these details and therefore no valid band moire image will be generated when superposing the revealing layer on top of a counterfeited base layer.

5. The band moiré layout model also allows predicting how displacing the revealing layer on top of the base layer or vice-versa affects the resulting band moiré image. Depending on the respective layouts of a pair of base band grating and revealing line grating layers and on the orientation of the base band replication vector t, the following situations may occur when displacing the revealing layer on top of the base layer (or vice-versa), or when tilting a composed layer in respect to an observer:

- no new deformations of the revealed band moiré image are induced;
- the revealed band moire image is subject to a periodic deformation;
- the revealed band moire image is subject to a radial displacement and possibly a smooth deformation of its width to height ratio;
- the revealed band moire image is subject to a tangential displacement in respect to the moiré image layout, i.e. a circular movement in case of a circular moiré image layout;
- when displacing the revealing layer on top of the base layer, the revealed band moire image is subject to a spiral displacement in respect to the moiré image layout, i.e. a curved movement from the center to the exterior or vice-versa;
- a relative displacement of the positions sampled by the revealing layer on the base layer along one predetermined direction does not deform the revealed band moiré image; in all other directions, the revealed band moire image is subject to a deformation;

6. The comprehensive band moiré layout model also allows to conceive base band grating and revealing line grating layouts, which generate, when displacing the revealing layer on top of the base layer, or, equivalently, when tilting the composed layer, a desired reference dynamic transformation of the resulting band moiré image. Example C shows that a rectilinear revealing layer superposed on top of a correspondingly computed base layer yields a circularly laid out band moiré image. When displacing the rectilinear revealing layer on top of the base layer, or, equivalently, when tilting the composed layer, the moiré image patterns move radially toward the exterior or the interior of the circular moiré image layout and may possibly be subject to a smooth deformation of its width to height ratio. Example E shows another example, where rotating the revealing layer on top of the base layer, at the coordinate system origin, yields moiré image patterns which move toward the exterior or the interior of the circular moiré image layout, depending on the rotation direction. And Example F shows a last example where upon displacement of the revealing layer, or, equivalently, when tilting the composed layer, a moiré image moves tangentially to the moiré layout, i.e. in the case of a circular moiré layout, perperdicularly to the radial displacement shown in Example E. In that specific example, the moiré movement is a circular rotation.

7. A curvilinear band moiré image having the same layout as a reference band moiré image can be generated by deducing according to the band moiré layout model the geometric transformations to be applied to the base layer and to the revealing layer. Since one of the two layer transformations can be freely chosen, the curvilinear base band layer may be conceived to incorporate orientations and frequencies, which have a high probability of generating undesired secondary moirés when scanned by a scanning device (color photocopier, desktop scanner). Such orientations are the horizontal, vertical and 45 degrees orientations, as well as the frequencies close to the frequencies of scanning devices (300 dpi, 600 dpi, 1200 dpi).

8. The base band layer generated according to the band moiré layout model may be populated with opaque color patterns printed side by side at a high registration accuracy, for example with the method described in U.S. patent application Ser. No. 09/477,544 (Ostromoukhov, Hersch). Since the band moiré patterns generated by the superposition of the base grating and of the revealing line grating are very sensitive to any microscopic variations of the pattern residing in the base bands of the base layer, any document protected according to the present invention is very difficult to counterfeit. The revealed band moiré patterns serve as a means to easily distinguish between a real document and a falsified one.

9. A further important advantage of the present invention is that it can be used for authenticating documents by having the base band or the revealing line layer placed on any kind of support, including paper, plastic materials, diffractive devices (holograms, kinegrams) etc., which may be opaque, semi-transparent or transparent. Furthermore, the present invented method can be incorporated into the background of security documents (for example by placing the base layer in the background and by allowing to write or print on top of it). Because it can be produced using standard original document printing processes, the present method offers high security without additional cost.

10. A further advantage is the possibility of generating the described diversity of moiré effects, both static and dynamic, with a fixed setup, i.e. with a base band grating layer and a revealing line grating layer separated by a gap, as described in the section “Embodiments of base and revealing layers”.

11. A further advantage of the proposed model-based band moiré generation relies on the fact that modifying the relative superposition phase of the revealing layer in respect to the base layer may require a non-rigid relative superposition phase transformation of the revealing layer, i.e. a transformation different from a translation and/or a rotation. Such a non-rigid relative superposition phase transformation can be performed with a revealing layer embodied by an electronic transmissive display driven by a revealing layer display software module. Since its functionalities, i.e. mainly the geometric transformation and the relative superposition phase transformation that are carried out by the display software module in order to generate on the display a transformed revealing layer line grating whose relative superposition phase varies dynamically, are not known to potential counterfeiters, they will not be able to create the corresponding matching base layer.

12. A further advantage relies on the fact that model-based synthesis of band moiré images enables generating a huge number of base layer variants, and revealing layer variants and band moiré image variants. Many different base layer and revealing layer layout pairs may be conceived so as to generated, upon superposition of base and revealing layer, the same band moiré image layout. A same band moiré image layout may however behave completely differently upon displacement of the revealing layer on top of the base layer. The band moiré image patterns may either remain as they are, undergo a smooth attractive transformation or be subject to a deformation which seems to destroy them, possibly in a periodic manner. Both the properties of static band moiré images (no revealing layer movement) or/and the properties of dynamic band moiré images may serve as authentication means.

13. A further advantage lies on the fact that both the base layer and the revealing layer can be automatically generated by a computer. A computer program generating automatically the base and revealing layers needs as input an original desired reference band moiré image, parameters of the base band grating and of the revealing line grating in the original space as well as geometric transformations and related constants enabling to create the base band grating layer and the revealing line grating layer in the transformed space. It is therefore possible to create a computer server operable for delivering both base layers and revealing layers. The computer server may be located within the computer of the authenticating personal or at a remote site. The delivery of the base and revealing layers may occur either locally, or remotely over computer networks.

14. Based on the computer server described in the section "Computing server for the synthesis of base and/or revealing layers" one may create sophisticated security document delivery services, for example the delivery of remotely printed (or issued) security documents and the delivery of remotely printed (or issued) authenticating devices, being possibly personalized according to information related to the security document to be issued or authentified.

REFERENCES CITED

U.S. Patent Documents

U.S. Pat. No. 5,995,638 (Amidror, Hersch), November 1999. Methods and apparatus for authentication of documents by using the intensity profile of moiré patterns, assignee EPFL.

U.S. Pat. No. 6,249,588 (Amidror, Hersch), June 2001. Method and apparatus for authentication of documents by using the intensity profile of moiré patterns, assignee EPFL.

U.S. Pat. No. 6,819,775 (Amidror and Hersch), November 2004, Authentication of documents and valuable articles by using the moire intensity profile, assignee EPFL.

U.S. Pat. No. 5,018,767 (Wicker), May 28, 1991. Counterfeit protected document.

U.S. Pat. No. 5,396,559 (McGrew), Mar. 7, 1995. Anti-counterfeiting method and device utilizing holograms and pseudorandom dot patterns.

U.S. Pat. No. 5,708,717 (Alasia), Jan. 13, 1998. Digital anti-counterfeiting software method and apparatus U.S. Pat. No. 5,999,280 (Huang), Dec. 7, 1999, Holographic anti-imitation method and device for preventing unauthorized reproduction, U.S. Pat. No. 5,694,229, (Drinkwater, B. W. Holmes), Dec. 2, 1997, Holographic Security Device U.S. Pat. No. 6,494,491, (Zeiter, Lüthi, and Lohwasser), Dec. 17, 2002, Object with an optical effect, U.S. Pat. No. 5,712,731 (Drinkwater et. al.), Jan. 27, 1998, Security device for security documents such as bank notes and credit cards.

U.S. Pat. No. 5,901,484 (R. B. Seder), May 11, 1999, Manually operated moveable display device U.S. Pat. No. 5,032,003, (Antes), Jul. 16, 1991, Optically variable surface pattern.

U.S. Pat. No. 4,984,824 (Antes and Saxer), Jan. 15, 1991, Document with an optical diffraction safety element.

U.S. Pat. No. 4,761,253 (Antes), Aug. 2, 1988, Method and apparatus for producing a relief pattern with a microscopic structure, in particular having an optical diffraction effect U.S. Pat. No. 6,273,473, Self-verifying security documents (Taylor, Hardwick, Jackson, Zientek, Hibbert), Aug. 14, 2001, U.S. patent application Ser. No. 10/995,859 (Steenblik, Hurt, Jordan), Micro-optic security and image presentation system, filed Nov. 22, 2004, U.S. patent application Ser. No. 09/477,544 (Ostromoukhov, Hersch), Method and apparatus for generating digital halftone images by multi color dithering, filed 4 Jan. 2000, due assignee EPFL.

U.S. patent application Ser. No. 10/183,550, (Amidror), "Authentication with build-in encryption by using moiré intensity profiles between random layers, filed 28 Jun. 2002, due assignee EPFL.

U.S. patent application Ser. No. 10/270,546 filed 16 Oct. 2002, "Authentication of documents and articles by moiré patterns", inventors Hersch and Chosson, due assignee EPFL U.S. patent application Ser. No. 10/440,355, filed 19 May 2003, Reproduction of security documents and color images with metallic inks, inventors Hersch, Emmel, Collaud, due assignee EPFL.

U.S. patent application Ser. No. 11/149,017, filed 10 Jun. 2005, Authentication of secure items by shape level lines, inventors Hersch and Chosson, due assignee EPFL Foreign Patent Documents United Kingdom Patent No. 1,138,011 (Canadian Bank Note Company), December 1968. Improvements in printed matter for the purpose of rendering counterfeiting more difficult.

Other Publications

I. Amidror and R. D. Hersch, Fourier-based analysis and synthesis of moirés in the superposition of geometrically transformed periodic structures, Journal of the Optical Society of America A, Vol. 15, 1998; pp. 1100-1113.

I. Amidror, The Theory of the Moiré Phenomenon, Kluwer Academic Publishers, 2000, Chapter 10, Moiré between repetitive non-periodic layer, 249-352.

I. Amidror, R. D. Hersch, Quantitative analysis of multichromatic moiré effects in the superposition of coloured periodic layers, Journal of Modern Optics, Vol. 44, No. 5, 1997, 883-899

J. W. Harris and H Stocker, Handbook of Mathematics and Computational Science, Springer Verlag, 1998, 319-329

R. D. Hersch and S. Chosson, Band Moiré Images", SIGGRAPH'2004, ACM Computer Graphics Proceedings, Vol. 23, No. 3, August 2004, pp. 239-248.

W. Hospel, Application of laser technology to introduce security features on security documents in order to reduce counterfeiting, SPIE Vol. 3314, 1998, pp. 254-259.

J. Huck, Mastering Moirés. Investigating Some of the Fascinating Properties of Interference Patterns, 2003, paper available by contacting the author, see http://pages.sbcglobal.net/joehuck/Pages/kit.html O. Mikami, New imaging functions of Moiré by fly's eye lenses, Japan Journal of Applied Physics, Vol. 14, No. 3, 1975; pp. 417-418.

O. Mikami, New image-rotation using Moiré lenses, Japan Journal of Applied Physics, Vol. 14, No. 7, 1975; pp. 1065-1066.

J. F. Moser, Document Protection by Optically Variable Graphics (Kinegram), in Optical Document Security, Ed. R. L. Van Renesse, Artech House, London, 1998, pp. 247-266

K. Patorski, The moiré Fringe Technique, Elsevier 1993, pp. 14-21

G. Oster, M. Wasserman and C. Zwerling, Theoretical Interpretation of Moiré Patterns. Journal of the Optical Society of America, Vol. 54, No. 2, 1964, 169-175

V. Ostromoukhov and R. D. Hersch, Multi-color and artistic dithering, SIGGRAPH Annual Conference, 1999, pp. 425-432.

R. L. Van Renesse, Optical Document Security, 2nd ed., 1998, Artech House, section 9.3.1 Parallax Images and section 9.3.2, Embossed Lens Patterns, pp. 207-210, B. Saleh, M. C. Teich, Fundamentals of Photonics, John Wiley, 1991, p. 116

D. Tollenaar, Moiré-Interferentieverschijnselen bij rasterdruk, Amsterdam Instituut voor Grafische Technick, 1945, English translation: Moiré in halftone printing interference phenomena, published in 1964, reprinted in Indebetouw G. Czarnek R. (Eds.). 618-633, Selected Papers on Optical Moiré and Applications, SPIE Milestone Series, Vol. MS64, SPIE Press, 1992,

We claim:

1. A method for authenticating a device subject to counterfeiting attempts, said device being selected from a set of security documents and valuable products, said device comprising a base layer superposed with a revealing layer sampling said base layer, the method comprising the steps of:

a) observing a superposition of said base layer comprising a base band grating and said revealing layer comprising a revealing line grating, said superposition forming a moire layer comprising a band moire image and b) comparing said band moire image with a reference band moire image and depending on the result of the comparison, accepting or rejecting the device, where said base band grating comprises in each base band a non-repetitive sequence of base band patterns having shapes derived from elements selected from a set of typographic characters, logos, symbols, signs, line art and graphical elements, where respective layouts of the base band grating, the revealing line grating and the band moiré image are related according to a band moiré image layout model, said band moiré image layout model enabling to choose the layout of said revealing line grating and of said band moiré image and obtain the layout of said base band granting by computation on a computing system, where said band moire image comprises band moire patterns whose shapes are enlarged and transformed instances of said base band pattern shapes and where said observation and comparison steps are carried out by a person.

2. The method of claim 1, where the base band grating is synthesized by carrying out the steps of i) selecting a layout for the band moiré image;

ii) selecting a layout for the revealing line grating;

iii) computing on said computing system, according to the band moiré image layout model, the layout of the base band grating layer.

3. The method of claim 2, where the revealing line grating layout is curvilinear and where the superposition of base band grating and revealing line grating yields a rectilinear band moiré image.

4. The method of claim 2, where the revealing line grating layout is selected from the set of rectilinear and curvilinear layouts, where the superposition of base band grating and revealing line grating yields a curvilinear concentric band moiré image and where a relative displacement of positions sampled by the revealing line grating on the base band grating has the effect of moving its band moire patterns along a trajectory selected from the set of radial, tangential and spiral trajectories.

5. The method of claim 2, where the revealing line grating layout is laid out along spirals, where the superposition of base band grating and revealing line grating yields a curvilinear band moiré image, where applying a rotation to positions sampled by the revealing line grating on the base band grating moves said band moire patterns along an orientation selected from the set of inwards and outwards orientations.

6. The method of claim 2, where, according to said band moiré image layout model, the layout of the band moiré image is expressed by a geometric transformation M which transforms the band moiré image from a transformed space $(x_t,y_t)$ to an original space (x,y), where the layout of the revealing line grating is expressed by a geometric transformation G which transforms the revealing line grating from the transformed space $(x_t,y_t)$ into the original space (x,y), and where the layout of the base band grating is expressed by a geometric transformation H which transforms the base band grating from the transformed space $(x_t,y_t)$ to the original space (x,y), said transformation H being a function of the transformations M and H.

7. The method of claim 6, where the transformations M, G, and H are given as $M(x_t,y_t)=(m_1(x_t,y_t, m_2(x_t,y_t))$, $G(x_t,y_t)=(x, g_2(x_t,y_t))$, and $H(x_t,y_t)=(h_1(x_t,y_t, h_2(x_t,y_t))$, and where said transformation $H(x_t,y_t)$ is given by equations $$h_1(x_t, y_t) = (g_2(x_t, y_t) - m_2(x_t, y_t)) \cdot \frac{t_x}{T_r} + m_1(x_t, y_t)$$

$$h_2(x_t, y_t) = g_2(x_t, y_t) \cdot \frac{t_y}{T_r} + m_2(x_t, y_t) \cdot \frac{T_r - t_y}{T_r}$$

where $T_r$ is a period of the revealing line grating in the original space and where $(t_x, t_y)$ is a replication vector of the base band grating in the original space.

8. The method of claim 1, where the base layer is formed by several base band gratings and where a relative displacement of positions sampled by the revealing line grating on the base band gratings generates a moiré layer formed by several band moiré images whose band moire patterns move in different orientations and at different speeds.

9. The method of claim 1, where a relative displacement of positions sampled by the revealing line grating on the base band grating in a direction different from a predetermined direction has the effect of deforming the shapes of said band moire patterns.

10. The method of claim 1, where a from starting positions, any displacement of positions sampled by the revealing line grating on the base layer has the effect of deforming the shapes of said band moire patterns.

11. The method of claim 1, where the base layer and the revealing layer are partitioned onto different portions, each portion being characterized by its specific pair of matching revealing line grating and base band grating layouts, said layouts yielding, when said pairs of matching gratings are superposed, a same band moiré image layout.

12. The method of claim 1, where said device subject to counterfeiting attempts is individualized (i) according to geometric transformations transforming the base band grating and the revealing line grating from a transformed space to an original space and (ii) according to constants present in said transformations.

13. The method of claim 1, where the revealing line grating comprises lines selected from the group of continuous lines, doffed lines, interrupted lines and partially perforated lines.

14. The method of claim 1, where the base band grating is imaged created on an opaque support and the revealing line grating is created on a transparent support.

15. The method of claim 1, where the base band grating is created by a process for transferring an image onto a support, said process being selected from the set comprising lithographic, photolithographic, photographic, electrophotographic, engraving, etching, perforating, embossing, ink jet and dye sublimation processes.

16. The method of claim 1, where the base band grating is embodied by an element selected from the set of transparent devices, opaque devices, diffusely reflecting devices, paper, plastic, optically variable devices and diffractive devices.

17. The method of claim 1, where the revealing line grating is an element selected from the set comprising an opaque support with transparent lines, cylindric microlenses and Fresnel zone lenses emulating the behavior of cylindric microlenses.

18. The method of claim 1, where the base band grating and the revealing line grating are separated by a gap and form a fixed composed layer, where, due to the parallax effect, by tilting the composed layer in respect to an observer, successive positions of the base band grating are sampled by the revealing line grating, thereby dynamically moving said band moire image patterns.

19. The method of claim 1, where the device subject to counterfeiting attempts is an element selected from the group of banknote, check, trust paper, identification card, passport, travel document, ticket, valuable document, watch, valuable product, label affixed on a valuable product, package of a valuable product.

20. The method of claim 1 where said base band patterns are printed using at least one non-standard ink, thus making their faithful reproduction difficult using the standard cyan, magenta, yellow and black printing colors available in common photocopiers and desktop systems.

21. The method of claim 1, where said base band patterns are reproduced with a metallic ink, thereby making said band moire patterns strongly visible at specular observation angles.

22. The method of claim 1, where an additional reference band moiré image printed on said device facilities verifying the authenticity of the device subject to counterfeiting attempts by comparing said reference band moiré image and the band moiré image produced by said superposition of the base band grating and of the revealing line grating.

23. The method of claim 1, where one layer selected from the set of base layer and revealing layer is embodied by an electronic display.

24. The method of claim 23, where the revealing line grating is embodied by the electronic display, thereby enabling non-rigid phase transformations between successive positions of lines of said revealing line grating.

25. A device subject to counterfeiting attempts, said device being selected from a set of security documents and valuable products, said device comprising:

a base band grating layer whose base bands comprise base band patterns, and a corresponding revealing line grating, where the base band grating and the revealing line grating are superposed with a gap between them and form a fixed composed layer, where, due to the parallax effect, by tilting the composed layer in respect to an observer, successive positions of the base band grating are sampled by the revealing line grating, yielding a band moire image whose band moire patterns move dynamically, where said base bands patterns form non-repetitive sequences and have shapes derived from elements selected from a set of typographic characters, logos, symbols, signs, line art, and graphical elements, where shapes of said band moire patterns are enlarged and transformed instances of said base band pattern shapes, and where respective layouts of said base band grating, said revealing line grating and said band moire image are related according to a band moire image layout model, said band moire image layout model enabling to choose the layout of said revealing line grating and of said band moire image and obtain the layout of said base band grating by computation.

26. The device subject to counterfeiting attempts of claim 25, where given a reference band moiré image layout and a given revealing line grating layout, the base band grating layout yielding in superposition with the revealing line grating layout the reference band moiré image layout is automatically computed according the band moiré image layout model.

27. The device subject to counterfeiting attempts of claim 25, where the revealing line grating layout is selected from the set of rectilinear and curvilinear layouts, where said band moiré image is curvilinear and and where said band moire patterns move along a pattern trajectory selected from the set of radial, tangential and spiral trajectories.

28. The device subject to counterfeiting attempts of claim 25, where, according to said band moiré image layout model, the layout of the band moiré image is expressed by a geometric transformation M which transforms the band moiré image from a transformed space $(x_t,y_t)$ to an original space (x,y), where the layout of the revealing line grating is expressed by a geometric transformation G which transforms the revealing line grating from the transformed space $(x_t,y_t)$ into the original space (x,y), and where the layout of the base band grating is expressed by a geometric transformation H which transforms the base band grating from the transformed space $(x_t, y_t)$ to the original space (x,y), said transformation H being a function of the transformations M and H.

29. The device subject to counterfeiting attempts of claim 28, where the transformations M, G, and H are given as $M(x_t,y_t)=(m_1(x_t,y_t, m_2(x_t,y_t))$, $G(x_t,y_t)=(x, g_2(x_t,y_t)$, and $H(x_t,y_t)=(h_1(x_t,y_t, h_2(x_t,y_t))$, and where said transformation $H(x_t,y_t)$ is computed according to $$h_1(x_t, y_t) = (g_2(x_t, y_t) - m_2(x_t, y_t)) \cdot \frac{t_x}{T_r} + m_1(x_t, y_t)$$

$$h_2(x_t, y_t) = g_2(x_t, y_t) \cdot \frac{t_y}{T_r} + m_2(x_t, y_t) \cdot \frac{T_r - t_y}{T_r}$$

where $T_r$ is a period of the revealing line grating in the original space and where $(t_x, t_y)$ is a replication vector of the base band grating in the original space.

30. The device subject to counterfeiting attempts of claim 28, where documents are individualized according to the geometric transformations transforming the base band grating and the revealing line grating from the transformed space to the original space and according to constants present in said transformations.

31. The device subject to counterfeiting attempts of claim 25, where a base layer is formed by several base band gratings and where said successive positions sampled by the revealing line grating on said base band gratings generate band moiré patterns which move according to different orientations and speeds.

32. The device subject to counterfeiting attempts of claim 25, where said successive positions sampled by the revealing line grating on the base band grating move said band moiré patterns and deform their shapes periodically.

33. The device subject to counterfeiting attempts of claim 25, where the base band grating and the revealing line grating are partitioned into different portions, each portion being characterized by its specific pair of matching revealing line and base band grating layouts, said layouts forming, when said pairs of matching gratings are superposed, a same band moiré image layout.

34. The device subject to counterfeiting attempts of claim 25, where the revealing line grating comprises lines selected from the group of continuous lines, dotted lines, interrupted lines and partially perforated lines.

35. The device subject to counterfeiting attempts of claim 25, where the base band grating is created on an opaque support and the revealing line grating is created on a transparent support.

36. The device subject to counterfeiting attempts of claim 25, where the base band grating is created by a process for transferring an image onto a support, said process being selected from the set comprising lithographic, photolithographic, photographic, electrophotographic, engraving, etching, perforating, embossing, ink jet and dye sublimation processes.

37. The device subject to counterfeiting attempts of claim 25, where the base band grating is embodied by an element selected from the set of transparent devices, opaque devices, diffusely reflecting devices, paper, plastic, optically variable devices and diffractive devices.

38. The device subject to counterfeiting attempts of claim 25, where the revealing line grating is an element selected from the set comprising an opaque support with transparent lines, cylindric microlenses and Fresnel zone lenses emulating the behavior of cylindric microlenses.

39. The device subject to counterfeiting attempts of claim 25, where said device is an element selected from a group of banknote, check, trust paper, identification card, passport, travel document, ticket, valuable document, watch, valuable product, label affixed on a valuable product, package of a valuable product.

40. The device subject to counterfeiting attempts of claim 25 where the base band patterns are printed using at least one non-standard ink, thus making their faithful reproduction difficult using the standard cyan, magenta, yellow and black printing inks available in common photocopiers and desktop systems.

41. The device subject to counterfeiting attempts of claim 25, where base band patterns are reproduced with a metallic ink, thereby making at specular observation angles said band moire patterns strongly visible.

42. The device subject to counterfeiting attempts of claim 25, where an additional reference moiré image printed on said device facilitates verifying its authenticity by comparing said reference moiré image and the band moiré image produced by said superposition of the base band grating and the revealing line grating.

43. The device subject to counterfeiting attempts of claim 25, where one layer selected from the set of base band grating and revealing line grating layer is embodied by an electronic display.

44. The device subject to counterfeiting attempts of claim 43, where the revealing line grating is embodied by the electronic display, thereby enabling non-rigid phase transformations between successive sampling positions of lines of the revealing line grating lines.

* * * * *